(12) United States Patent
Sano et al.

(10) Patent No.: US 6,480,187 B1
(45) Date of Patent: Nov. 12, 2002

(54) OPTICAL SCANNING-TYPE TOUCH PANEL

(75) Inventors: Satoshi Sano, Kawasaki (JP);
Fumihiko Nakazawa, Kawasaki (JP);
Atsuo Iida, Kawasaki (JP); Nobuyasu Yamaguchi, Kawasaki (JP); Fumitaka Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/061,274

(22) Filed: Apr. 17, 1998

(30) Foreign Application Priority Data

| Aug. 7, 1997 | (JP) | 9-213335 |
| Sep. 2, 1997 | (JP) | 9-254220 |
| Dec. 18, 1997 | (JP) | 9-349740 |
| Jan. 9, 1998 | (JP) | 10-003498 |

(51) Int. Cl.$^7$ .............................. G09G 5/00
(52) U.S. Cl. .................. 345/175; 345/173; 345/176
(58) Field of Search ................ 345/173, 176, 345/179; 250/221; 235/472; 347/133

(56) References Cited

U.S. PATENT DOCUMENTS

| 4,267,443 A | | 5/1981 | Carroll et al. | |
| 4,553,842 A | * | 11/1985 | Griffin | 356/375 |
| 4,811,004 A | * | 3/1989 | Person et al. | 340/712 |
| 4,820,050 A | * | 4/1989 | Griffin | 356/375 |
| 4,916,308 A | * | 4/1990 | Meadows | 250/221 |
| 4,980,547 A | * | 12/1990 | Griffin | 250/221 |
| 5,196,835 A | * | 3/1993 | Blue et al. | 340/712 |
| 5,369,262 A | * | 11/1994 | Dvorkis et al. | 235/472 |
| 5,424,756 A | * | 6/1995 | Ho et al. | 345/158 |
| 5,536,930 A | * | 7/1996 | Barkan et al. | 235/472 |
| 5,656,804 A | * | 8/1997 | Barkan et al. | 235/472 |
| 6,104,420 A | * | 8/2000 | Matsumoto | 347/133 |

FOREIGN PATENT DOCUMENTS

| FR | 2 615 309 A | 11/1988 |
| GB | 1 575 420 A | 9/1980 |

(List continued on next page.)

OTHER PUBLICATIONS

"Light–Sensitive Pen to Substitute for Finger in Laser–Scanned Touch Screen", IBM Technical Disclosure Bulletin, vol. 32, No. 3B, Aug. 1989, p. 435/436 XP000029783 *the whole document*.

"System for Determining the Angle of a Probe in a Laser–Scanned Touch Entry Display", Research Disclosure, No. 28466, Dec. 1967, p. 797, XP002085598, New York, USA *the whole document*.

(List continued on next page.)

Primary Examiner—Dennis-Doon Chow
Assistant Examiner—Alecia D. Nelson
(74) Attorney, Agent, or Firm—Armstrong, Westerman & Hattori, LLP

(57) ABSTRACT

A recurrence reflection sheet is provided to the outside of at least three sides of a quadrilateral display screen, two light send/receive units, which includes a light scanning element for scanning a light angularly in a plane which is substantially parallel with the display screen, and a light receiving element for receiving a reflected light from the recurrence reflection sheet, are arranged on the outside of the display screen. A cut-off region due to a finger as an indicator is obtained based on an angle of a scanning light in a timing of rise and fall of the received light level of the light receiving element, and a position of the indicator is calculated according to the obtained cut-off region.

44 Claims, 58 Drawing Sheets

FOREIGN PATENT DOCUMENTS

| | | |
|---|---|---|
| GB | 2 176 282 A | 12/1986 |
| JP | 57197629 | 12/1982 |
| JP | 57-211637 | 12/1982 |
| JP | 62-5428 | 1/1987 |
| JP | 351943 | 3/1991 |
| JP | 3278156 | 12/1991 |
| JP | 5197669 | 8/1993 |
| JP | 6103116 | 4/1994 |
| JP | 6149730 | 5/1994 |
| JP | 9128346 | 5/1997 |
| JP | 1031632 | 2/1998 |
| JP | 10307788 | 11/1998 |

OTHER PUBLICATIONS

Patent Abstracts of Japan, vol. 016, No. 092 (P–1321), Mar. 6, 1992 & JP 03 273419 A (WACOM Co Ltd), Dec. 4, 1991 *abstract*.

Patent Abstracts of Japan, vol. 008, No. 051 (P–259), Mar. 8, 1984 & JP 58 201188 A (PENTEL KK), Nov. 22, 1983 *abstract*.

Patent Abstracts of Japan, vol. 015, No. 455 (P–1277), Nov. 19, 1991 & JP 03 192419 A (WACOM co Ltd), Aug. 22, 1991 *abstract*.

* cited by examiner

LIGHT RECEIVING ELEMENT 13a

LIGHT RECEIVING ELEMENT 13b 31a, 32a, 31b, 32b: LIGHT RECEIVING ELEMENT 41a, 42a, 41b, 42b: RECURSIVE REFLECTOR

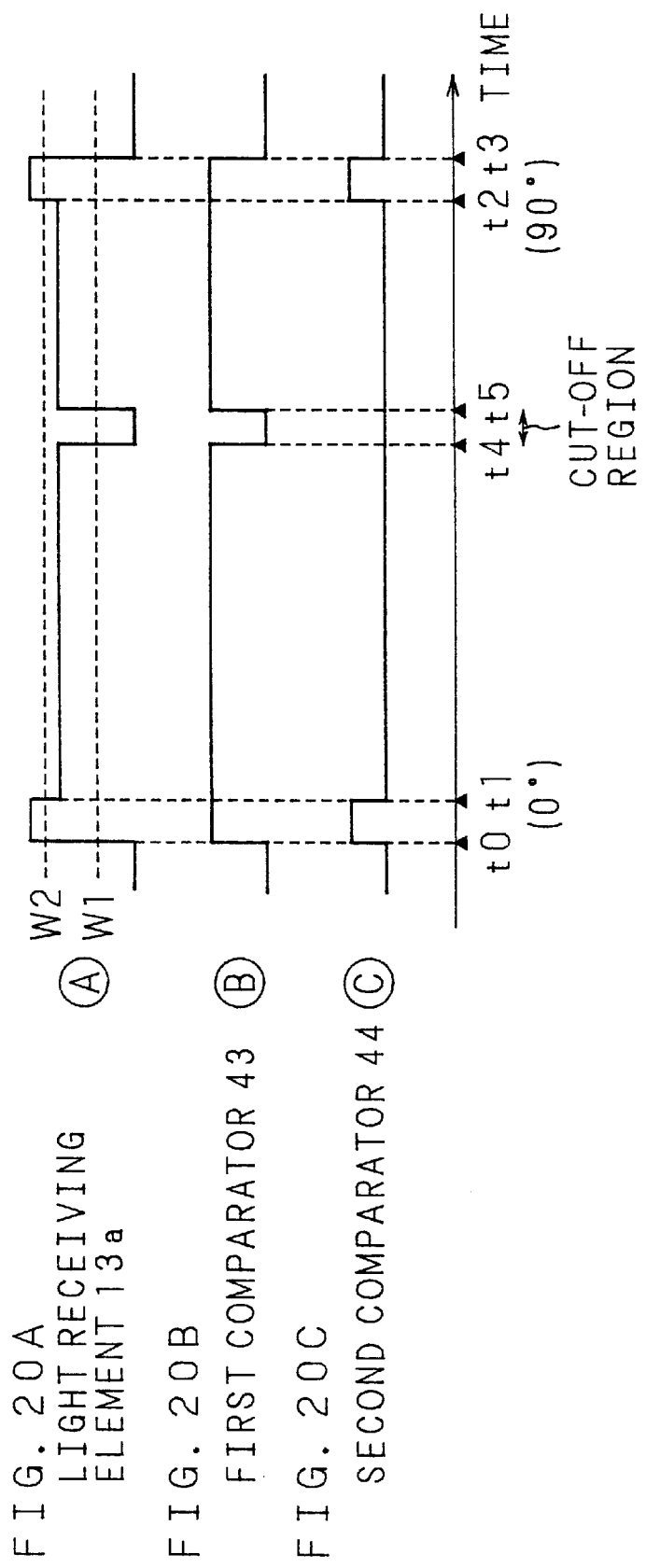

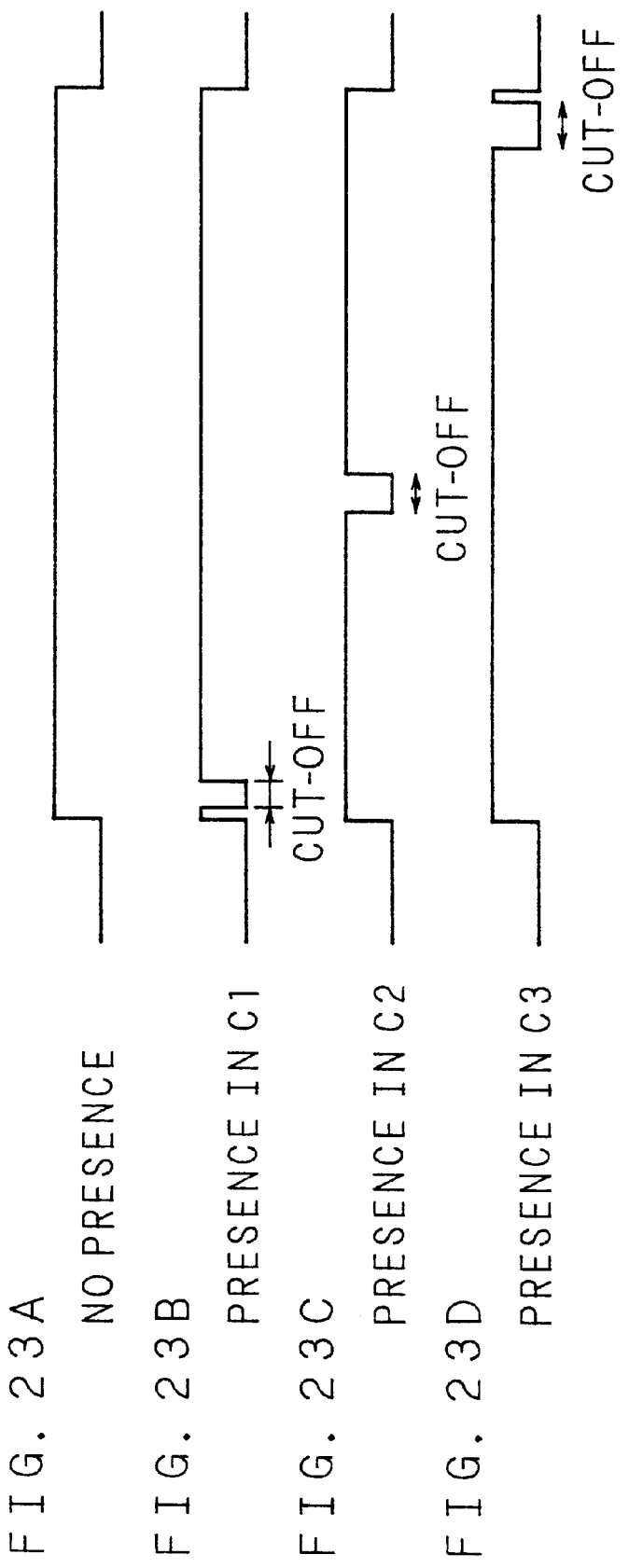

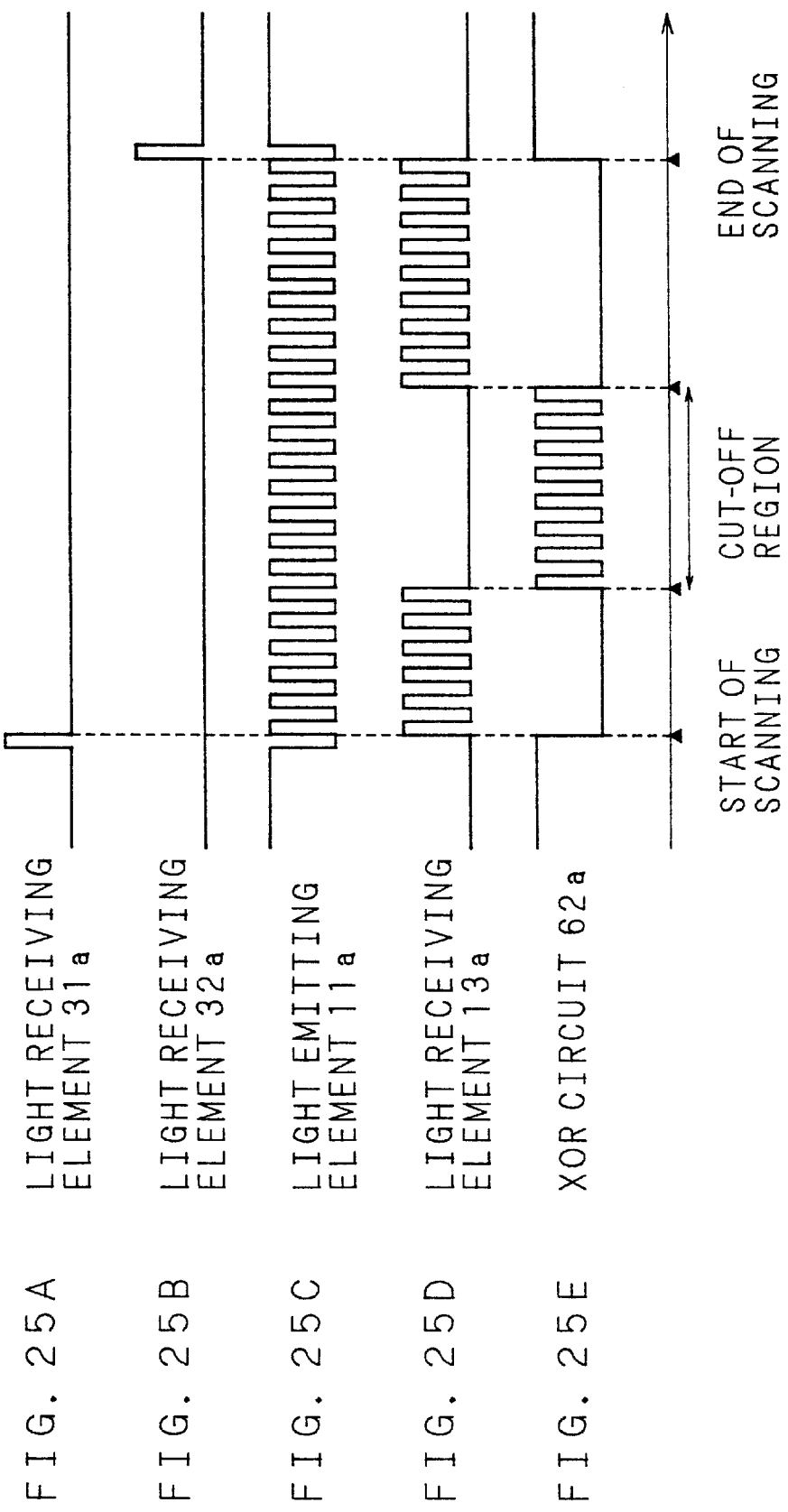

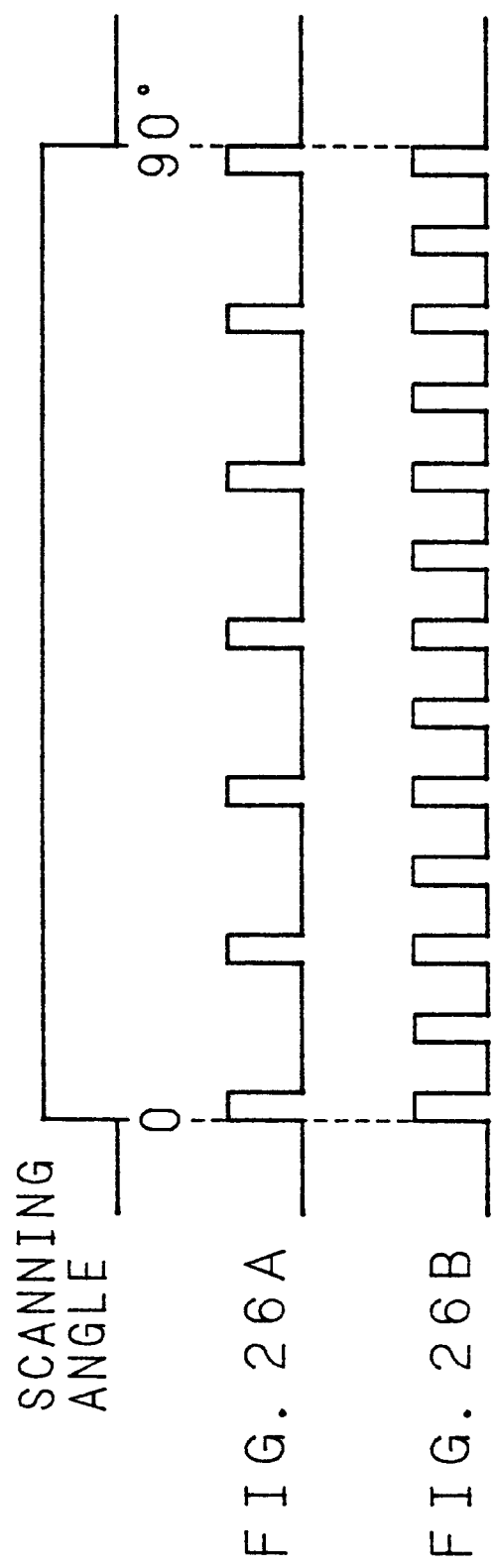

FIG. 28A  STANDARD 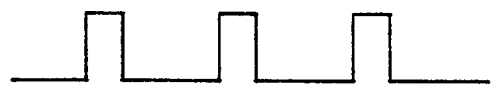
FIG. 28B  EMISSION TIME 
FIG. 28C  EMISSION STRENGTH 

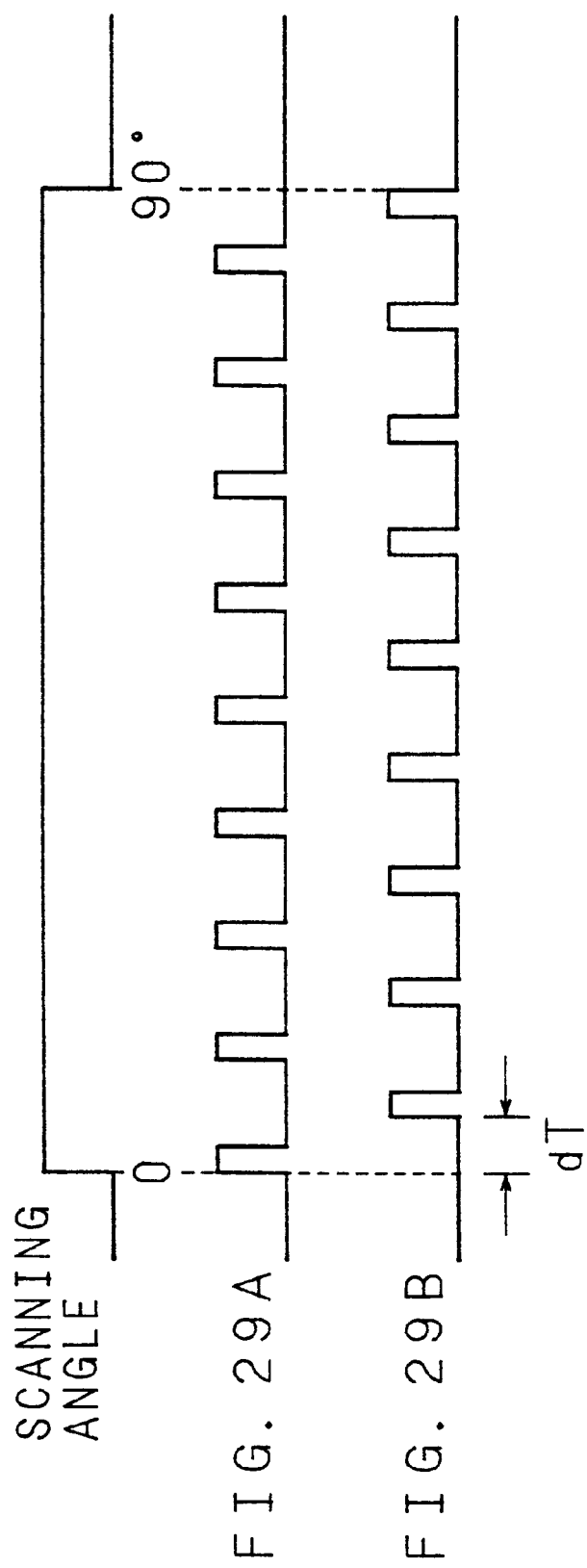

$d\theta = \omega \cdot dT$

LEVEL OF LIGHT RECEIVING SIGNAL (NO SWITCHING)

LEVEL OF LIGHT RECEIVING SIGNAL (TWO-STEP SWITCHING)

FIG. 41A LEVEL OF LIGHT RECEIVING SIGNAL

FIG. 41B SCANNING START SIGNAL

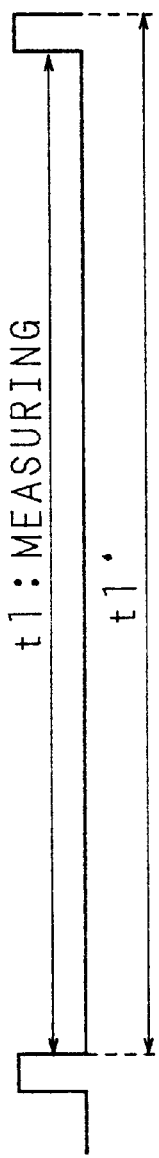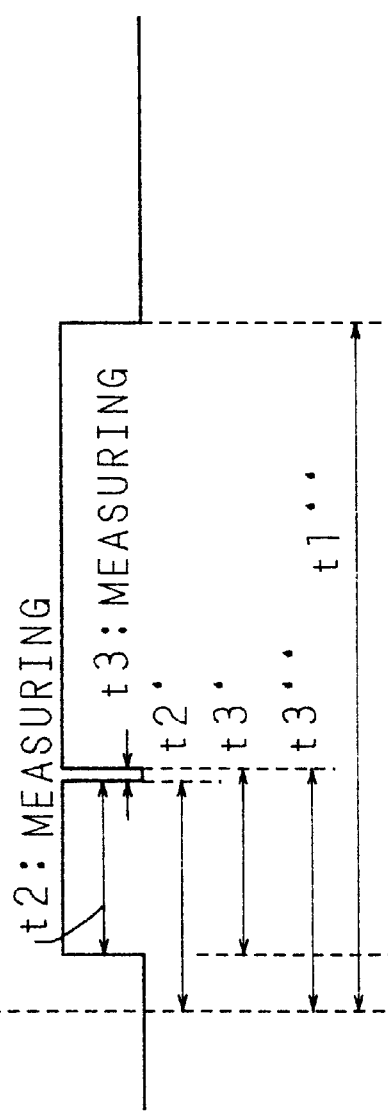
FIG. 43A PERIOD OF SCANNING START
FIG. 43B INDICATOR
FIG. 43C EMISSION STRENGTH OF LIGHT EMITTING ELEMENT

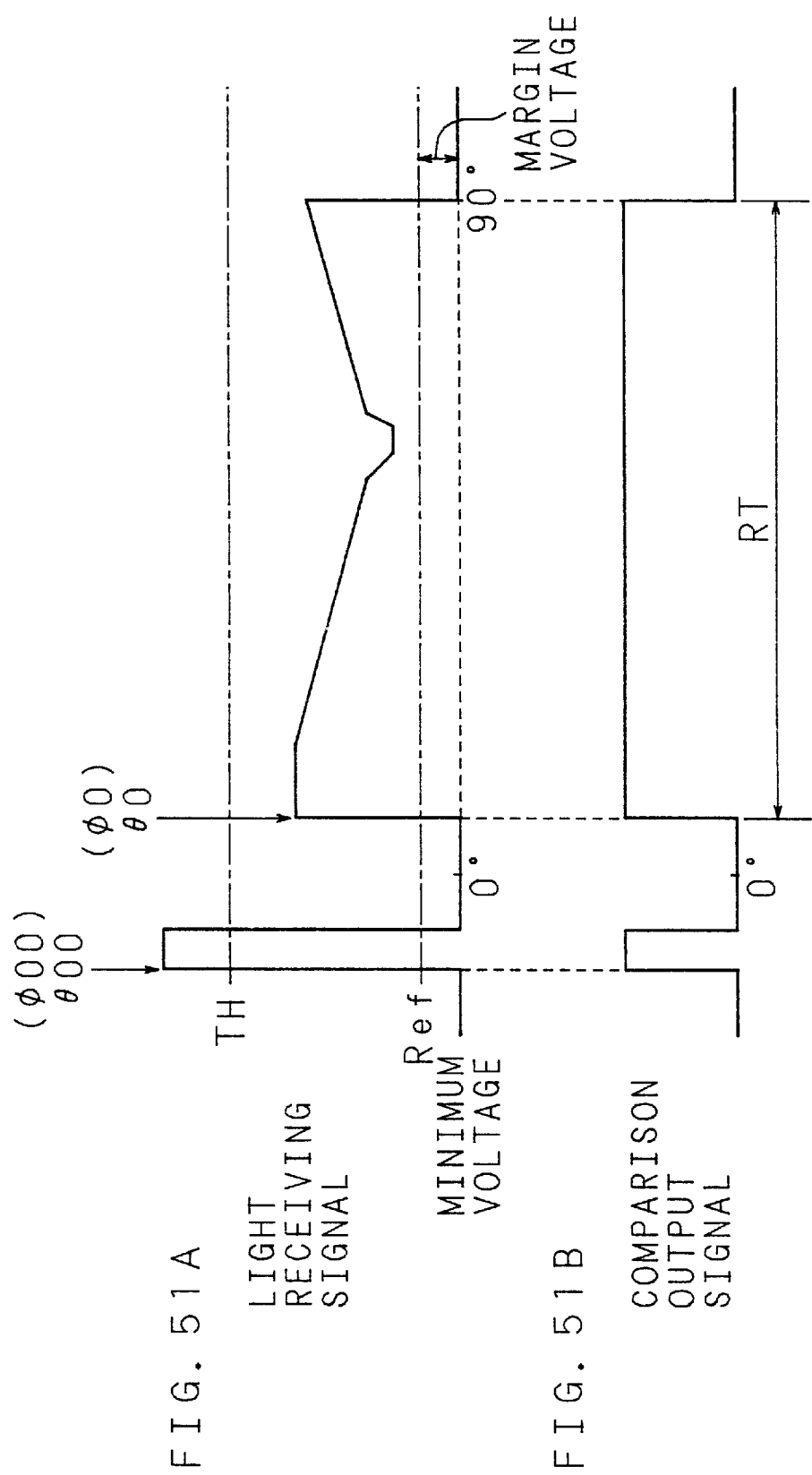

LIGHT RECEIVING ELEMENTS 13a AND 18a

LIGHT RECEIVING ELEMENTS 13b AND 18b

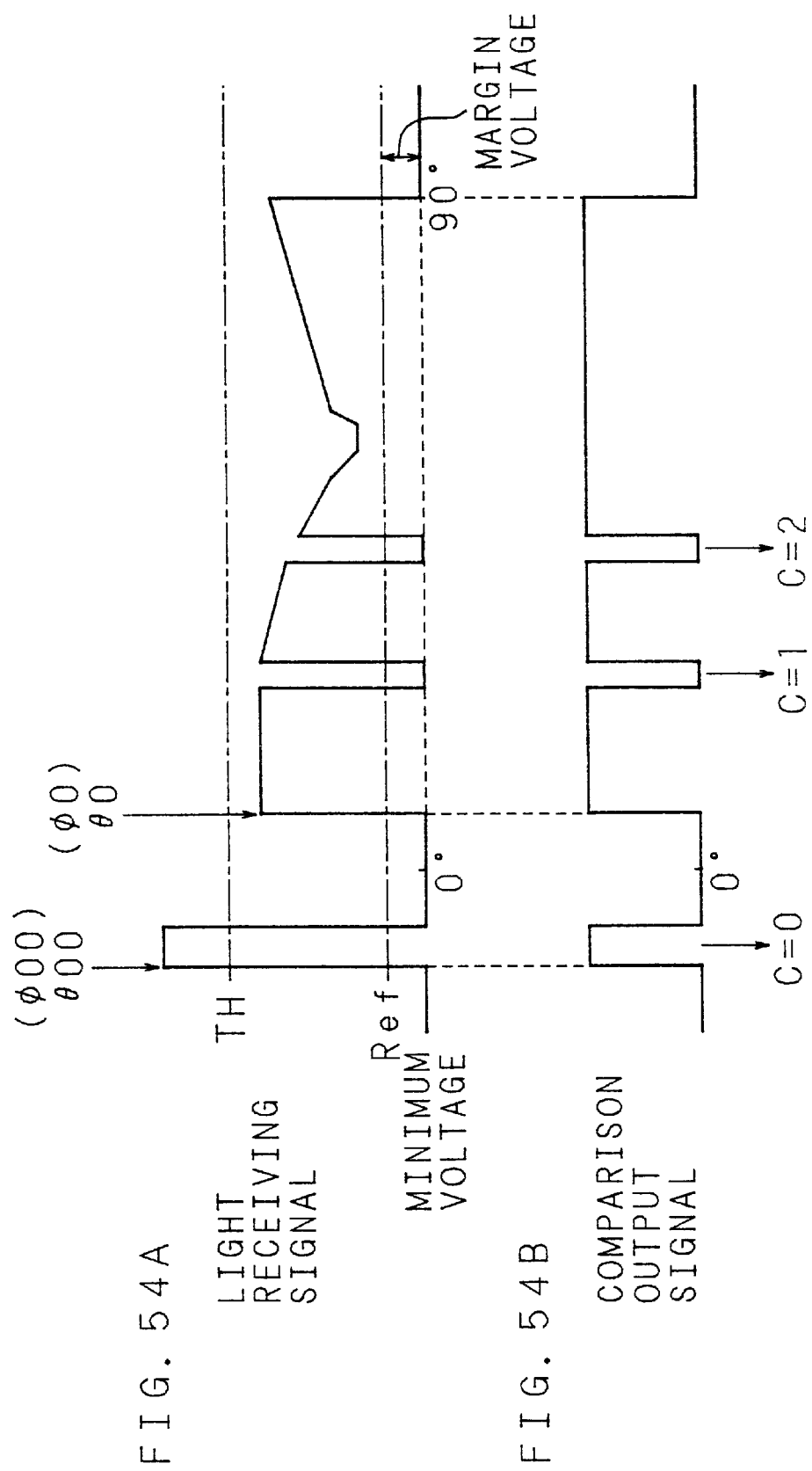

OPTICAL SCANNING-TYPE TOUCH PANEL

BACKGROUND OF THE INVENTION

1. Field of the Invention

The present invention relates to an optical scanning-type touch panel which inputs information thereinto by touching a plane such as a display screen of a computer which is specified as a section to be touched by means of an indicator.

2. Description of the Prior Art

In the case where information displayed on a screen of a personal computer or the like is inputted by a touching method, it is necessary to detect a touched position (indicated position) on the display screen accurately. As a method of detecting the indicated position on a display screen, "Carol method" (U.S. Pat. No. 4,267,443) is known. According to this method, an optical matrix is structured on a front surface of a display screen by arranging light emitting elements and light receiving elements oppositely in a frame on the front surface of the display screen, and a position where a light is cut off by touch of a finger or pen is detected. According to this method, a high S/N ratio is obtained, so the method can be applied to a large-sized display apparatus, but since resolution of detection is in proportion to arrangement intervals between the light emitting elements and light receiving elements, it is necessary for high resolution of detection to reduce the arrangement intervals. Therefore, in order to detect a touched position accurately even in the case where a large-sized screen is touched by a thin material such as a point of a pen, there arises a problem that a number of light emitting elements and light receiving elements to be arranged is increased and, thus, the arrangement becomes large, and signal processing becomes complicated.

In addition, another optical position detecting method is disclosed in Japanese Patent Application Laid-Open No. 57-211637/1982. According to this method, a focused light such as a laser beam is scanned angularly from the outside of a display screen, an angle where a special pen exists is obtained from two timings of reflected lights from the special pen having a reflector, and the obtained angle is applied to the triangulation principle so that a coordinate of the position is detected by calculation. This method can reduce a number of parts greatly, and can provides high resolution. However, there is a problem of operability such that a special reflection pen should be used, and the position of a finger, an arbitrary pen, etc., cannot be detected.

Still another optical position detecting method is suggested in Japanese Patent Application Laid-Open No. 62-5428/1987. According to this method, an light retro-reflector is arranged in frames on both sides of a display screen, a return light from the light retro-reflector of a light beam scanned angularly is detected, an angle where a finger or pen exists is obtained from timing that the light beam is cut off by the finger or pen, and a coordinate of the position is detected according to the triangulation principle to which the obtained angle is applied. In this method, detecting accuracy can be maintained with a small number of parts, and the position of a finger, arbitrary pen, etc., can be detected.

However, in the method disclosed in Japanese Patent Application Laid-Open No. 62-5428/1987, the detected touched position is occasionally deviated from an actually touched position due to an influence of a size or position of the indicator. Moreover, in the case where a finger-touched position is detected, when the screen is touched by parts of the hand other than this finger or an elbow touches, there arises a problem that a position which is touched by the parts of the hand other than the finger or an elbow is detected falsely and the position of the finger cannot be specified.

In addition, in the conventional methods, a light emitting element which emits a scanning light is frequently arranged so that an optic axis of the light emitted by the light emitting element is parallel with a scanning surface, and a light receiving element which receives a reflected scanning light is frequently arranged so that a direction of the received light is parallel with the scanning surface. For this reason, the light send/receive member becomes comparatively large, and this frequently disturbs the miniaturization of the whole apparatus.

Further, the display screen is generally rectangular and a scanning region is designed according to the display screen, and in this case when the arrangement is such that a light emitting element, light receiving element, light scanning element, etc., are arranged parallel with each other at the edge sides of the display screen so that the apparatus can be miniaturized. However, in the case of this arrangement, there arises a problem that a scanning light by the light scanning element is blocked by the light emitting element, light receiving element, etc., and thus a sufficient scanning angle cannot be obtained.

In the conventional methods, an off-set voltage is changed because of an influence of sensitivity caused by a change in temperature, etc., of the light receiving element, and thus there is a possibility that accurate measurement cannot be made.

In addition, in the conventional methods, the time required for the light receiving element receiving a reflected light in scanning once is varied according to scattering of a rotating speed of a polygon mirror, etc., of respective apparatuses, but it is troublesome that manufactures adjust individual apparatuses, and they cannot cope with fluctuations after shipment.

Further, in the conventional methods, in the case where two or more indicators exist on a scanning surface, there arises a problem that their positions cannot be detected accurately.

BRIEF SUMMARY OF THE INVENTION

One object of the present invention is to provide an optical scanning-type touch panel or an optical scanning-type input device which is capable of detecting a position of an indicator for indicating on a plane specified as an object to be touched (hereinafter called as coordinate surface in short) accurately by judging a size of the indicator.

Another object of the present invention is to provide an optical scanning-type touch panel in which when the position is indicated by a finger or pen, if a hand or elbow touches a display screen, its detected position is made to be invalid, an accurate position indicated by the finger or pen can be detected.

Still another object of the present invention is to provide an optical scanning-type touch panel in which scanning lights by an optical scanning element can be prevented from being cut off by a light emitting element, a light receiving element or the like by arranging the light receiving element and light scanning element farther from the edge sides of a rectangular coordinate surface than the light emitting element, and a sufficient scanning angle can be obtained.

Still another object of the present invention is to provide an optical scanning-type touch panel in which a light emitting element for emitting a scanning light is arranged so that an optic axis of the emitted light intersects a scanning surface and a light receiving element for receiving reflected scanning light is arranged so that directivity of the received light intersects the scanning surface, and thus a light send/receive part can be miniaturized and further the whole of the apparatus can be miniaturized.

Still another object of the present invention is to provide an optical scanning-type touch panel in which a defect of faults of an optical isolator in the case of using a half mirror is eliminated.

Still another object of the present invention is to provide an optical scanning-type touch panel in which an influence of a change in sensitivity due to a change in temperature of light receiving element is eliminated so that accurate measurement can be made.

Still another object of the present invention is to provide an optical scanning-type touch panel which is capable of automatically correcting scattering of the time when a light receiving element receives a reflected light at scanning once in respective apparatuses, and capable of coping with change after shipment easily.

Still another object of the present invention is to provide an optical scanning-type touch panel in which when two or more indicators exist on a scanning surface, a state that their accurate positions cannot be detected is frequently temporary, so in this case the positions are not detected so that useless confusion can be avoided.

An optical scanning-type touch panel of the present invention is provided with a light recurrence reflection member in at least three sides of a rectangular coordinate surface, at least two light send/receive members having a light scanning element for angularly scanning a light in plane which is substantially parallel with the coordinate surface and having a light receiving element for detecting the light from the light scanning element which is reflected from the light recurrence reflection member on the outside of the coordinate surface, and the optical scanning-type touch panel detects existence of an indicator and a scanning angle based on a received light amount detected by the light receiving element, and measures a cut-off region where light scanning is cut off by the indicator according to the detected result, and calculates a position of the indicator, namely, an indicated position.

Here, when an angular velocity of the scanning light is constant, information of the scanning angle can be obtained from information of the scanning time. Moreover, a cross-section length of the indicator can be calculated based on the measured cut-off region and the calculated indicated position, and information about a size of the indicator can be obtained according to the calculated cross-section length. As mentioned above, in the present invention, information about the position and size of the indicator is obtained.

Information about sizes of various objects which are supposed to touch the coordinate surface is stored previously, and information about the actually obtained size of the indicator is compared with the stored information about sizes so that a type of the current indicator is judged according to the compared result. A judgment is made as to whether or not the indicator is an indicator for actually specifying a position, and only when the indicator is an indicator for specifying a position, the result of measuring the cut-off region and the result of calculating the indicated position are effective. Therefore, false detection of an indicated position by a wrong indicator can be prevented, and thus an indicated position by a correct indicator can be always detected.

When two more light receiving elements for receiving a light from the light emitting element which is reflected from the light recurrence reflection member are arranged in each light send/receive member so as to be close to both the end portions of the detecting region of the coordinate surface, the light receiving signals of the light receiving elements can be used as scanning start/end timing signals.

When two more light reflecting elements for reflecting a light from the light emitting element and making the light be incident to the light receiving element are arranged in each light send/receive member so as to be close to both the end portions of the detecting region of the coordinate surface, the light receiving signals of reflected light from the light reflecting elements can be used as scanning start/end timing signals.

When a region where the indicator cannot enter is provided between the coordinate surface and the light recurrence reflection member, even if the indicator is in any position on the coordinate surface, the scanning start/end timing can be obtained securely, and an indicated position can be detected accurately.

Further, the scanning light from the light emitting element is a pulse light, and pulse light emission is controlled. For example, a pulse light is of sufficiently short period, a number of pulses can be cope with a scanning angle in the ratio of 1:1. Moreover, when the emission time for once is shortened, or the emission strength for once is weakened, or the light emitting period is lengthened, average radiant energy from the light emitting element can be reduced. Further, when the scanning start timing in each optical scanning is varied, even if the light emitting period becomes long, the detection of the indicator is not omitted.

In addition, the arrangement of the light emitting element and light receiving element is considered so that the scanning light from the light scanning element is not cut down by components accompanying the light emitting element and light receiving element. Therefore, the optical scanning by the light scanning element is sufficiently scanned in the direction of the scanning region, and thus a sufficient scanning angle can be obtained.

Furthermore, the light emitting element is arranged so that the light emitting direction of the light emitting element intersects the scanning surface of the light scanning element, and the light receiving element is arranged so that the directivity of light receiving by the light receiving element intersects the scanning surface of the light scanning element. As mentioned above, since the arrangement of the light emitting element and light receiving element is considered, the light send/receive member can be miniaturized and accordingly the whole apparatus can be miniaturized.

In addition, the light send/receive member further includes a light separating element for passing the light emitted from the light emitting element towards the light scanning element and separating the reflected light from the light recurrence reflection member to the light receiving element, and the light separating element includes a reflector having a reflecting surface for reflecting the reflected light from the light recurrence reflection member in the direction of the light receiving element and having an opening which is bored between the reflecting surface for passing the light emitted from the light emitting element towards the light scanning element and the back surface of the reflecting surface. The light which is allowed to pass from the light emitting element towards the light scanning element is controlled by this opening.

In the above constitution, the reflector is constituted so that its reflecting surface and back surface are not parallel with each other. As a result, a percentage of the light emitted from the light emitting element being received directly by the light receiving element becomes low.

In the above constitution, a reflecting mirror whose reflecting surface intersects the coordinate surface is further provided, and the light scanning element scans the light emitted from the light emitting element in a plane which intersects the coordinate surface, and the reflecting mirror reflects the light scanned in the plane where the light scanning element intersects the coordinate surface in a plane parallel with the coordinate surface. The light emitted from the light emitting element is scanned by the light scanning element in the plane intersecting the coordinate surface and the light scanned by the light scanning element in the plane intersecting the coordinate surface is reflected by the reflecting mirror in the plane parallel with the display screen, so the constitution of the apparatus can be miniaturized. At this time, when the reflecting surface of the reflecting mirror is set so as to intersect the coordinate surface at 45°, the light emitted from the light emitting element is scanned by the light scanning element in the plane intersecting perpendicularly to the coordinate surface, and thus the constitution of the apparatus can be further miniaturized.

Another optical scanning-type touch panel of the present invention includes a light recurrence reflection member, at least two light send/receive members, a comparator for comparing a receiving signal by the light receiving element with a predetermined threshold value and in the case where an indicator exists in a coordinate surface, detecting timing of shielding due to the indicator, a measuring unit for measuring a cut-off region of a scanning light due to the indicator in the coordinate surface based on a scanning angle in the optical scanning element and a compared result of the comparator, a calculating unit for calculating a position and size of the indicator in the coordinate surface according to the measured result by the measuring unit, a signal level detector for detecting a lowest level of a light receiving signal of the light receiving element, an adder for adding a predetermined value to the level of the signal detected by the signal level detector, and a threshold value setting unit for setting the addition value obtained by the adder as a threshold value to the comparator. Since the lowest level of the light receiving signal of the light receiving element is detected and the value obtained by adding the predetermined value to the detected signal level is set to the comparator as a threshold value, an influence of a change in a level of the light receiving signal due to a change, etc. in the sensitivity is not given.

In the above-mentioned constitution, the signal level detector detects the lowest level of the light receiving signal of the light receiving element and a lowest level of the light receiving signal in the case where the light receiving element receives a scanning light with the indicator not existing on the coordinate surface, and the adder adds a value between the two levels detected by the signal level detector to the lowest level of the light receiving signal of the light receiving element. Therefore, a threshold value of the comparator is set to a suitable value.

Still another optical scanning-type touch panel of the present invention includes the light recurrence reflection member, at least two light send/receive members, comparator, measuring unit and calculating unit, and time counter for counting a continuous time of a level of the light receiving signal of the light receiving element in the case where the indicator does not exist on the coordinate surface. The measuring unit performs measurement in the case where the compared result of the comparator is changed within a time counted by the time counter. Since the continuous time of the level of the output signal of the light receiving element in the case where the indicator does not exist on the coordinate surface is counted, and the measurement is performed in the case where the compared result of the comparator is changed within the counted time, it is not necessary to adjust respective apparatuses.

In the above-mentioned constitution, the time counting by the time counter is performed automatically at the time of actuation or in the case where a predetermined instruction is given. Since the time counting by the time counter is performed automatically at the time of actuation or in the case where the predetermined instruction is given, scattering of the time at which the light receiving element receives a reflected light in scanning for once in the respective apparatuses is corrected automatically.

Still another optical scanning-type touch panel of the present invention includes the light recurrence reflection member, at least two light send/receive members, comparator, measuring unit and calculating unit, and counter for counting a number of times cut-off every time when the comparator detects a cut-off timing due to the indicator existing on the coordinate surface. The measuring unit does not perform measurement in the case where a counted value of the counter is two or more. In the case where the comparator detects a cut-off timing due to the indicator existing on the coordinate surface twice or more, the measurement is not performed by the measuring unit, so a situation that detection becomes impossible and thus useless confusion occurs can be avoided previously.

In the aforementioned optical scanning-type touch panel of the present invention, when the optical scanning element is composed of a polygon mirror having three through six reflecting surfaces, the polygon mirror composing the optical scanning element can be constituted small.

In the present invention, "touch" represents only the case where the indicator is in contact with the coordinate surface, but "touch" includes the case where the indicator is not in contact with the coordinate surface (non-contact touch). In other words, the present invention can be applied to the state where the indicator is positioned above the coordinate surface, not coming in contact with it.

The above and further objects and features of the invention will more fully be apparent from the following detailed description with accompanying drawings.

BRIEF DESCRIPTION OF THE SEVERAL VIEWS OF DRAWINGS

FIGS. 20A–20C are timing charts for explaining an operation of the optical scanning-type touch panel (third embodiment) of the present invention.

FIGS. 23A–23D are timing charts showing a level change of the light receiving signal.

FIGS. 25A–25E are timing charts for explaining an operation of the optical scanning-type touch panel (fifth embodiment) of the present invention.

FIGS. 26A and 26B are timing charts showing a timing signal of pulse light emission.

FIGS. 28A–28C are timing charts showing the timing signal of pulse light emission.

FIGS. 29A and 29B are timing charts showing the timing signal of pulse light emission.

FIGS. 43A–43C are timing charts showing a relationship of time as for timing of one optical scanning.

FIGS. 51A and 51B are waveform charts showing a state of a light receiving signal and comparison output signal when an indicator does not exist on a display screen.

FIGS. 54A and 54B are waveform charts showing a state of the light receiving signal and comparison output signal when two indicators exist on the display screen.

DETAILED DESCRIPTION OF THE INVENTION

The following describes embodiments of the present invention in detail on reference with the drawings.

First Embodiment

Figure 1:
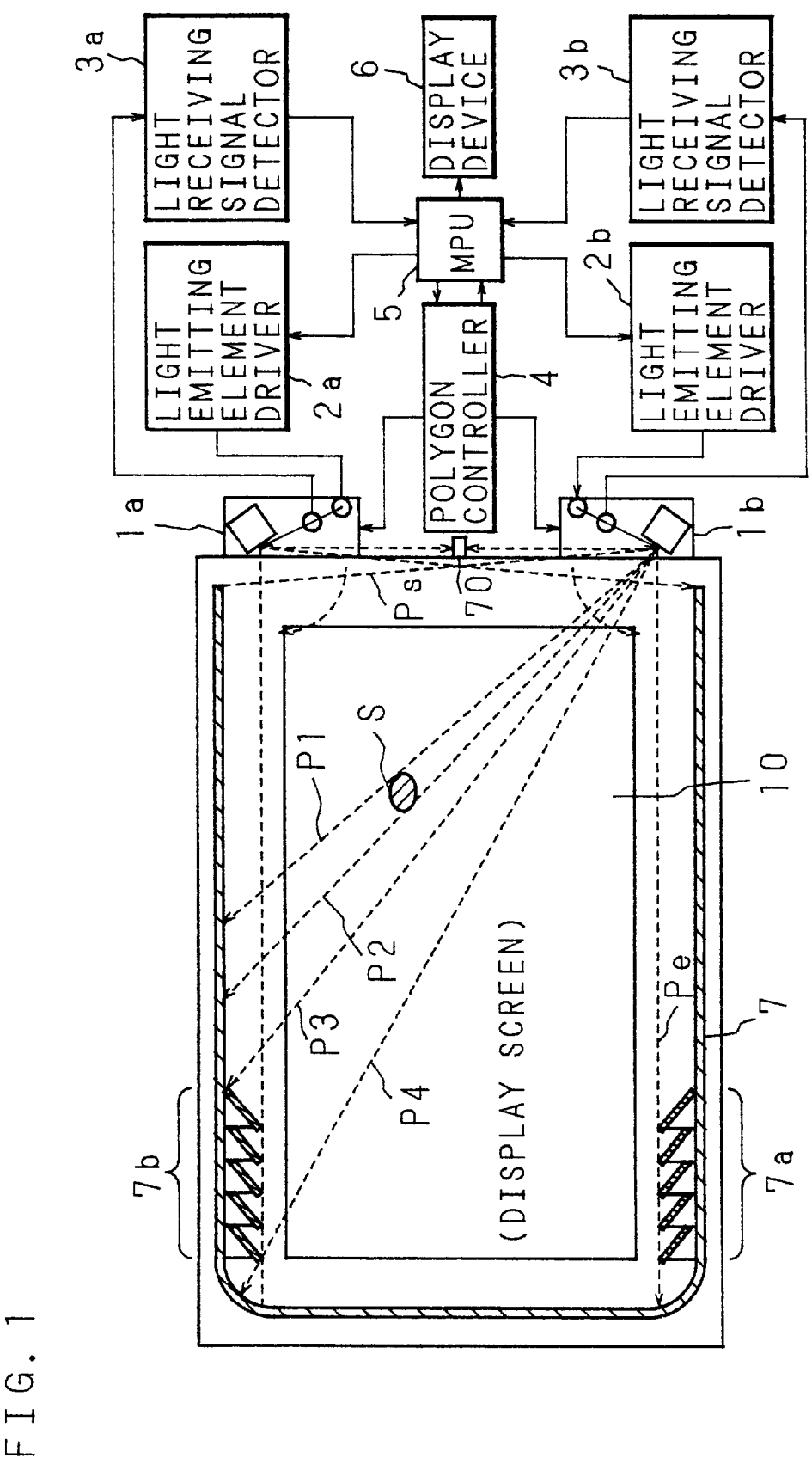
FIG. 1 is a schematic diagram showing a basic constitution of an optical scanning-type touch panel (first embodiment) of the present invention.

FIG. 1 is a drawing showing the basic constitution of the optical scanning-type touch panel according to the first embodiment of the present invention.

In FIG. 1, a reference numeral 10 is a display screen such as CRT, flat display panel (PDP, LCD, EL, etc.) and a projection-type image display device in an electronic equipment such as a personal computer, and in the present example the display screen is constituted as a PDP (Plasma Display panel) screen having a display dimension of 92.0 cm wide×51.8 cm long and 105.6 cm diagonal. As mentioned later, the outsides of both corners of one short side (in the present example right side) of the rectangular display screen 10 to be an angular plane (coordinate surface) for specifying a target section to be touched are respectively provided with light send/receive units 1a and 1b having an optical system including a light emitting element, light receiving element, polygon mirror, etc. Moreover, the outsides of three sides other than the right side of the display screen 10, namely, of the sides on the upper and lower sides and the left side are provided with a recurrence reflection sheet 7. These parts are arranged to be shielded by a canopy-shaped interceptor (not shown), mentioned later, provided to the front side of a housing.

Here, a reference numeral 70 is a light shielding member. This light shielding member 70 is provided on a line connecting both the light send/receive units 1a and 1b so that a direct light does not enter between both the light send/receive units 1a and 1b, more specifically, a light projected from the light send/receive unit 1a does not enter the light send/receive unit 1b, whereas a light projected from the light send/receive unit 1b does not enter the light send/receive unit 1a. Moreover, the light shielding member 70 is an object whose light reflectance is practically, zero, and its height is substantially the same as the height of the recurrence reflection sheet 7. Moreover, a reference symbol S shows a section of a finger as an indicator (light interceptor).

Figure 2:
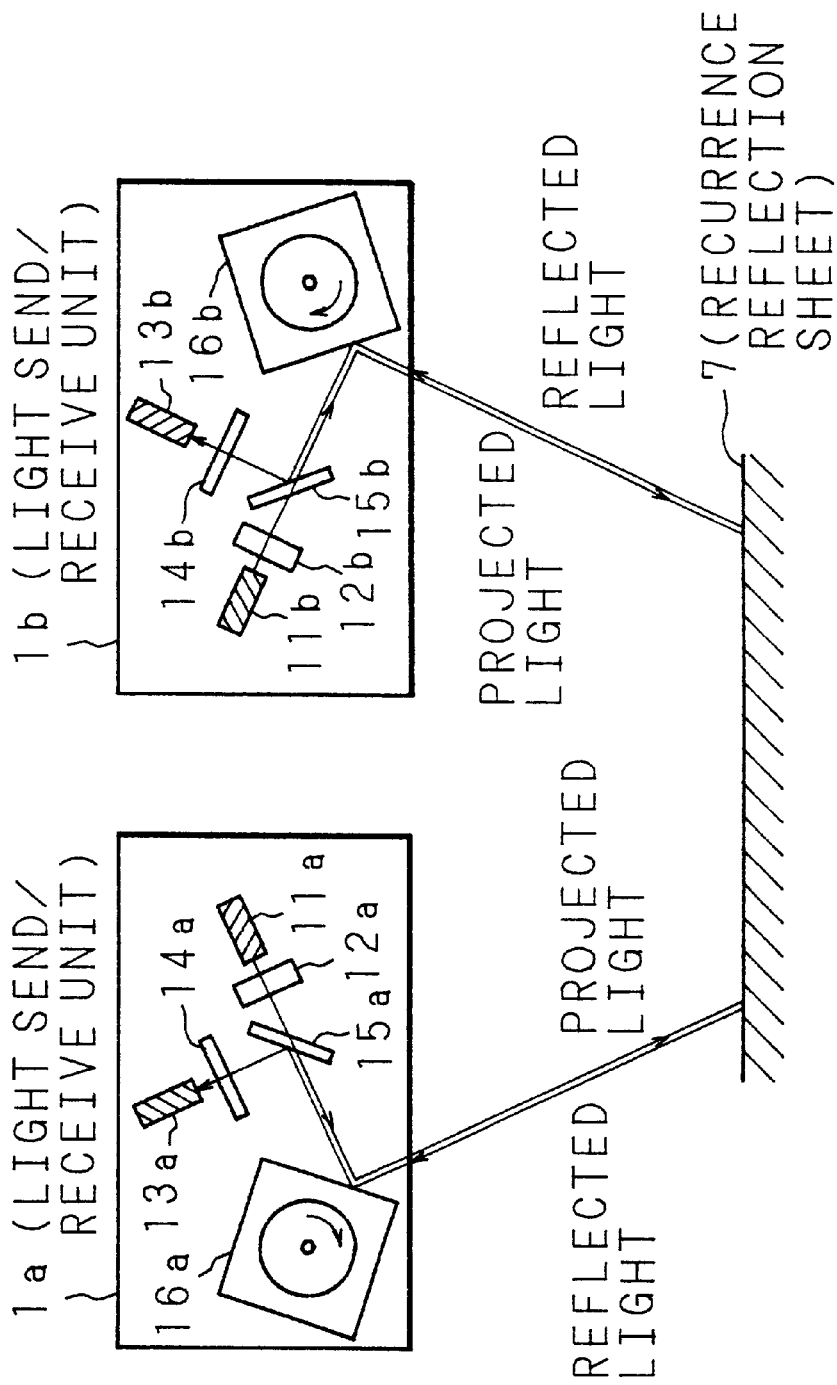
FIG. 2 is a schematic diagram showing an internal constitution and an optical path of a light send/receive unit.

FIG. 2 is a drawing showing an internal arrangement and optical path of the light send/receive units 1a and 1b. Both the light send/receive units 1a and 1b respectively include light emitting elements 11a and 11b composed of laser diodes for emitting near infrared lasers, collimating lenses 12a and 12b for making laser beams from the light emitting elements 11a and 11b to be parallel, light receiving elements 13a and 13b for receiving reflected lights from the recurrence reflection sheet 7, visible light cut filters 14a and 14b for shielding visible light components of outer lights from the display screen, illumination light, etc., which enter the light receiving elements 13a and 13b, half mirrors 15a and 15b for guiding the reflected lights to the light receiving elements 13a and 13b, polygon mirrors 16a and 16b (square-shaped in the present example) for scanning the laser beams from the light emitting elements 11a and 11b angularly, etc.

After the laser beams emitted from the light emitting elements 11a and 11b are made to be parallel lights by the collimating lenses 12a and 12b to be transmitted through the half mirrors 15a and 15b, they are scanned angularly by the rotation of the polygon mirrors 16a and 16b in a plane which is substantially parallel with the display screen 10 to be projected onto the recurrence reflection sheet 7. After the reflected lights from the recurrence reflection sheet 7 are reflected by the polygon mirrors 16a and 16b and the half mirrors 15a and 15b, the reflected lights passes through the visible light cut filters 14a and 14b to enter the light receiving elements 13a and 13b. However, in the case where an indicator exists in an optical path of the projected light, the projected light is cut-off, so the reflected lights do not enter the light receiving elements 13a and 13b. Here, a laser beam can be scanned angularly at an angle of not less than 90° by the rotation of the polygon mirrors 16a and 16b.

The light send/receive units 1a and 1b are connected with light emitting element drivers 2a and 2b for driving the light emitting elements 11a and 11b, light receiving signal detectors 3a and 3b for converting a received light amount of the light receiving elements 13a and 13b into an electric signal, and a polygon controller 4 for controlling the operations of the polygon mirrors 16a and 16b. Moreover, a reference numeral 5 represents MPU for measuring and calculating a position and size of the indicator S such as a finger and pen and for controlling the operation of the apparatus, and 6 represents a display device for displaying the measured results or the like of the MPU 5.

In such an optical scanning-type touch panel, as shown in FIG. 1, when the description for the light send/receive unit 1b, for example, is given, the projected light from the light send/receive unit 1b is first scanned in the counterclockwise direction in FIG. 1 from a position shielded by the light shielding member 70, and the projected light comes to a position (Ps) where the projected light is reflected by the point of the recurrence reflection sheet 7 and to a scanning start position. Thereafter, the projected light is reflected by the recurrence reflection sheet 7 until the projected light comes to a position (P1) of one end of the indicator S, but the projected light is shielded by the indicator S until a position (P2) of the other end of the indicator S, and the projected light is reflected by the light recursive sheet 7 until it comes to a scanning end position (Pe).

However, in the light send/receive unit 1a, a light is scanned in the clockwise direction in the FIG. 1. In the light send/receive unit 1a, the side of the lower side of the display screen 10 is the scanning start direction in the clockwise direction in FIG. 1, and in the light send/receive unit 1b, the side of the upper side of the display screen 10 is the scanning start direction in the counterclockwise direction in FIG. 1. The reason for this is described below.

In the case of the light send/receive unit 1b, for example, the side of the upper side or the side of the left side of the display screen 10 can be the scanning start direction, but viewed from the light send/receive unit 1b, since the upper side of the display screen 10 is closer than the lower side, an amount of reflected light is larger, and since the light is substantially at right angles with the reflecting surface of the recurrence reflection sheet 7 in the upper side of the display screen 10, an amount of reflected light is larger. For this reason, the side of the upper side of the display screen 10 is set as the scanning start direction. In other words, when in the case of the light send/receive unit 1b the side of the lower side of the display screen 10 is the scanning start direction, the lower side of the display screen 10 is farther than the upper side, so an amount of reflected light at the time of starting scanning becomes smaller. Moreover, since the reflecting surface of the recurrence reflection sheet 7 is curved, an amount of reflected light becomes smaller. However, the curve of the recurrence reflection sheet 7 is not an essential problem, so needless to say, an arrangement where the recurrence reflection sheet 7 is not curved can be provided.

Figure 3:
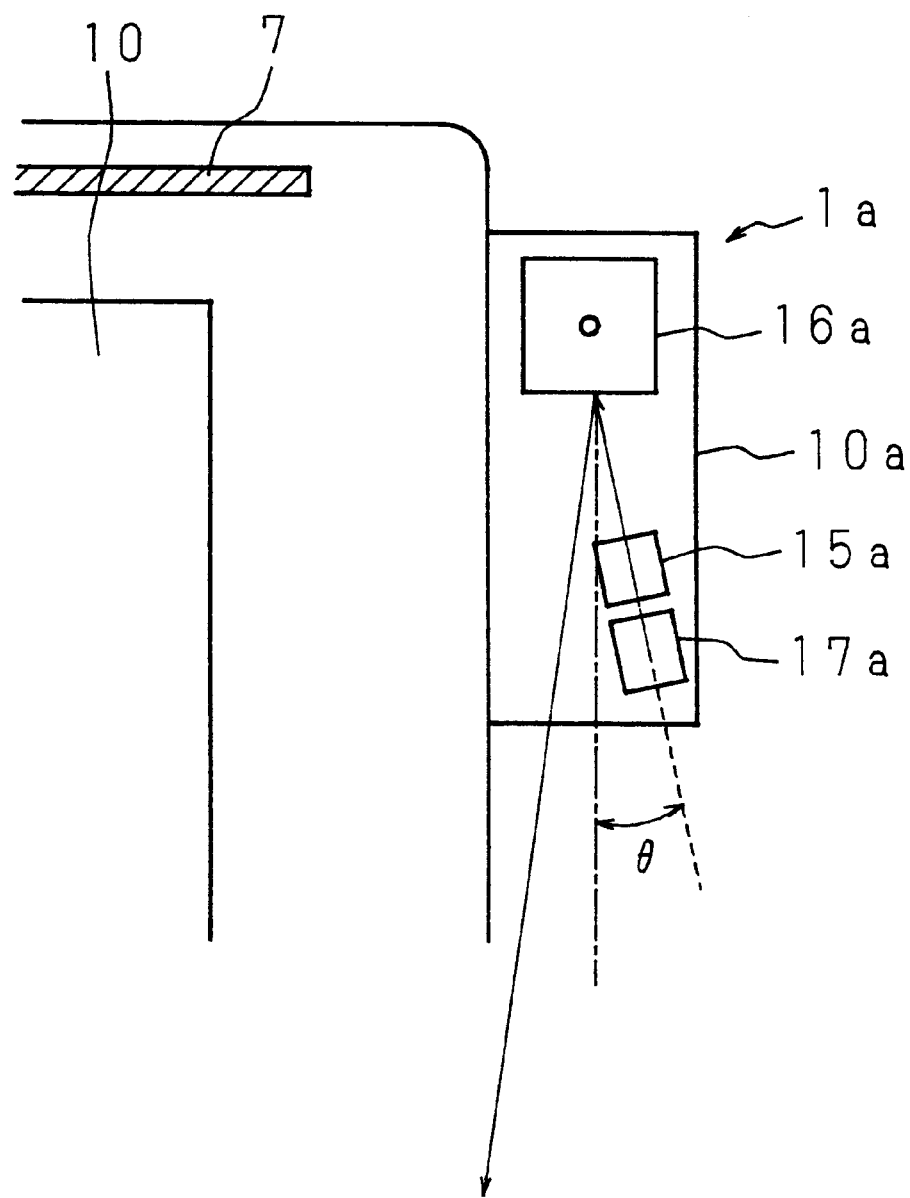
FIG. 3 is a schematic plane view showing an example of the constitution of the light send/receive unit.
Figure 4:
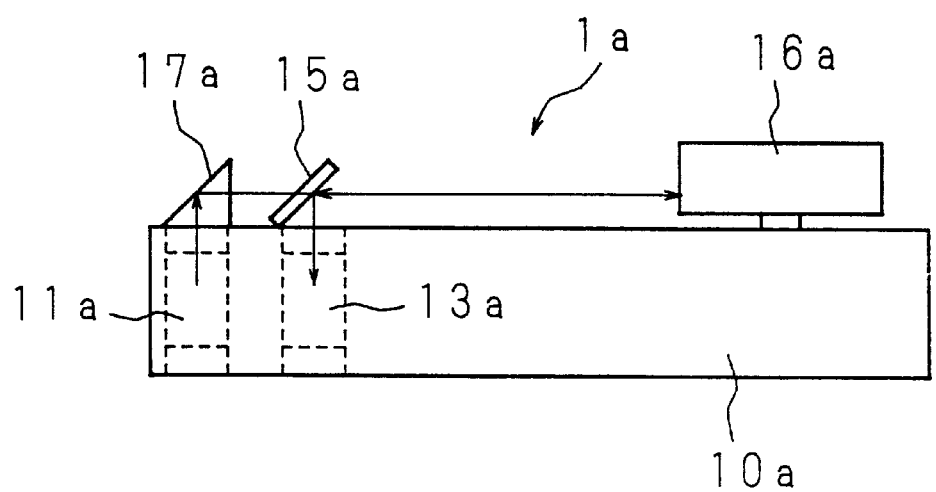
FIG. 4 is a schematic side view showing an example of the constitution of the light send/receive unit.
Figure 5:
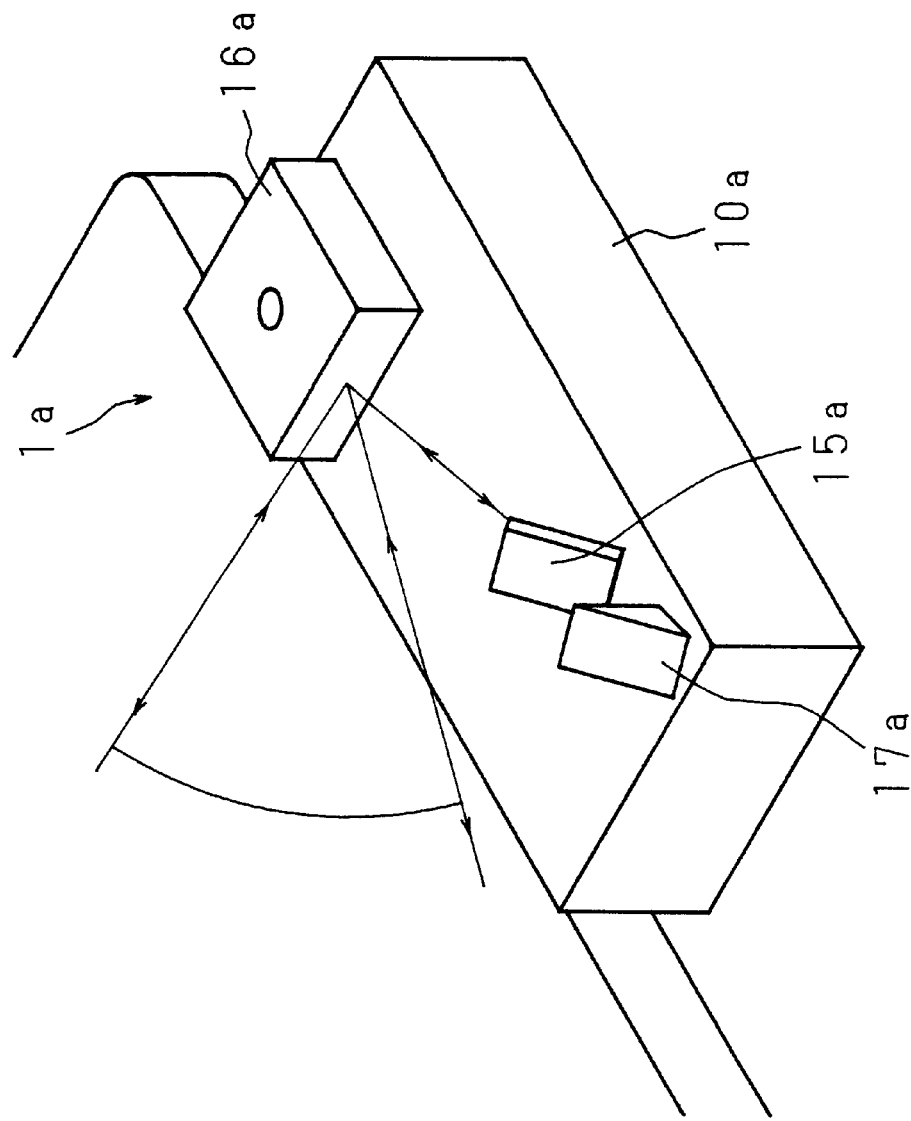
FIG. 5 is a schematic perspective view showing an example of the constitution of the light send/receive unit.

The aforementioned FIG. 2 is a schematic diagram for explaining the optical path and the operation of the light send/receive units 1a and 1b, so the optical scanning-type touch panel of the present invention is actually constituted such that the light send/receive units 1a and 1b are arranged as shown in the schematic plane view of FIG. 3, schematic side view of FIG. 4 and schematic perspective view of FIG. 5.

The light send/receive unit 1a (1b) contains the light emitting element 11a (11b) such as a semiconductor laser generating unit and the light receiving element 13a (13b) for receiving a reflected light from the recurrence reflection sheet 7 inside a housing 10a (10b), and its upper surface is provided with a prism mirror 17a (17b) on the portion directly above the light emitting element 11a (11b), and the portion directly above the light receiving element 13a (13b) is provided with the half mirror 15a (15b). Further, the polygon mirror 16a (16b) is attached to a shaft of a pulse motor (not shown), at a portion opposite to the prism mirror 17a (17b) across the half mirror 15a (15b) on the upper surface of the housing 10a (10b).

In FIGS. 3, 4 and 5, the collimating lenses 12a and 12b and the visible light cut filters 14a and 14b shown in FIG. 2 are omitted, so the description thereof is omitted.

According to the aforementioned constitution of the light send/receive unit 1a (1b), a laser beam emitted from the light emitting element 11a (11b) is refracted by the prism mirror 17a (17b) to pass through the half mirror 15a (15b) and is reflected by the polygon mirror 16a (16b) to be projected onto the recurrence reflection sheet 7. The light reflected by the recurrence reflection sheet 7 is returned to the polygon mirror 16a (16b) to be reflected thereby and enters the half mirror 15a (15b) to be received by the light receiving element 13a (13b) finally.

As shown in FIGS. 3, 4 and 5, in the light send/receive unit 1a (1b) of the optical scanning-type touch panel of the present invention, the light emitting element 11a (11b) is positioned in the housing 10a (10b) so that an optical path therefrom to the polygon mirror 16a (16b) goes away from the edge side of the display screen 10 on the light emitting element 11a (11b) side. The light receiving element 13a (13b) is positioned in the housing 10a (10b) so that an optical path therefrom to the polygon mirror 16a (16b) goes away from the edge side of the display screen 10 on the light receiving element 13a (13b) side.

Such an arrangement of the light emitting element 11a (11b) and light receiving element 13a (13b) is adopted in order to solve a problem such that a scanning light from the polygon mirror 16a (16b) is shielded by the half mirror 15a (15b) and the prism mirror 17a (17b) and thus sufficient scanning cannot be performed in the direction of the display screen 10.

Furthermore, in the light send/receive unit 1a (1b) of the optical scanning-type touch panel of the present invention, the light emitting element 11a (11b) is positioned in the housing 10a (10b) so that the direction where its laser beam is emitted intersects perpendicularly to the display screen 10, namely, a scanning surface by the polygon mirror 16a (16b), and the light receiving element 13a (13b) is positioned in the housing 10a (10b) so that the directivity of the light receiving intersects perpendicularly to the display screen 10, namely, the scanning surface by the polygon mirror 16a (16b).

Such an arrangement of the light emitting element 11a (11b) and light receiving element 13a (13b) is more effective in miniaturization of the light send/receive unit 1a (1b) when comparing with the case where the light emitting element 11a (11b) is positioned on the housing 10a (10b) so that the direction where its laser beam is emitted is parallel with the display screen 10, namely, with the scanning surface by the polygon mirror 16a (16b) and the case where the light receiving element 13a (13b) is positioned on the housing 10a (10b) so that the directivity of light receiving is parallel with the display screen 10, namely, the scanning surface by the polygon mirror 16a (16b).

As mentioned above, in the optical scanning-type touch panel of the present invention, the light emitting element 11a (11b) is positioned so that the direction where its laser beam is emitted intersects perpendicularly to the scanning surface by the polygon mirror 16a (16b) and the light receiving element 13a (13b) is positioned so that the directivity of light receiving intersects perpendicularly to the scanning surface by the polygon mirror 16a (16b), but even when they are positioned so that the light emitting direction and the directivity intersect the scanning surface at an angle of 60°, for example, needless to say, the same effect can be obtained.

As shown in FIG. 1, the side of the recurrence reflection sheet 7 to which both the light send/receive units 1a and 1b are arranged is an opening, and the recurrence reflection sheet 7 is arranged in "U'-shaped form so as to surround the display screen 10. Further, as represented by the reference symbols 7a and 7b, portions where an angle in which a light is projected from both the light send/receive units 1a and 1b to the recurrence reflection sheet 7 becomes smaller, more specifically, portions of two sides intersecting perpendicularly to the side on which both the light send/receive units 1a and 1b (the upper and lower sides in FIG. 1) are positioned which are far from both the light send/receive units 1a and 1b are provided with the recurrence reflection sheet 7 in sawtooth form.

Due to sawtooth-shaped portions 7a and 7b of the recurrence reflection sheet 7, as the scanning of the projected light from the light send/receive unit 1b proceeds from the position Ps to a position P3 of one end of the sawtooth-shaped portion 7b of the recurrence reflection sheet 7, an angle in which the light enters the recurrence reflection sheet 7 becomes smaller gradually. For this reason, a reflected light amount becomes smaller accordingly. However, since the light enters the recurrence reflection sheet 7 substantially at right angle to the sawtooth-shaped portion 7b during the scanning from the position P3 of one end of the sawtooth-shaped portion 7b of the recurrence reflection sheet 7 to a position P4 of the other end of the sawtooth-shaped portion 7b, further lowering of a recursive reflection factor is avoided.

Figure 6:
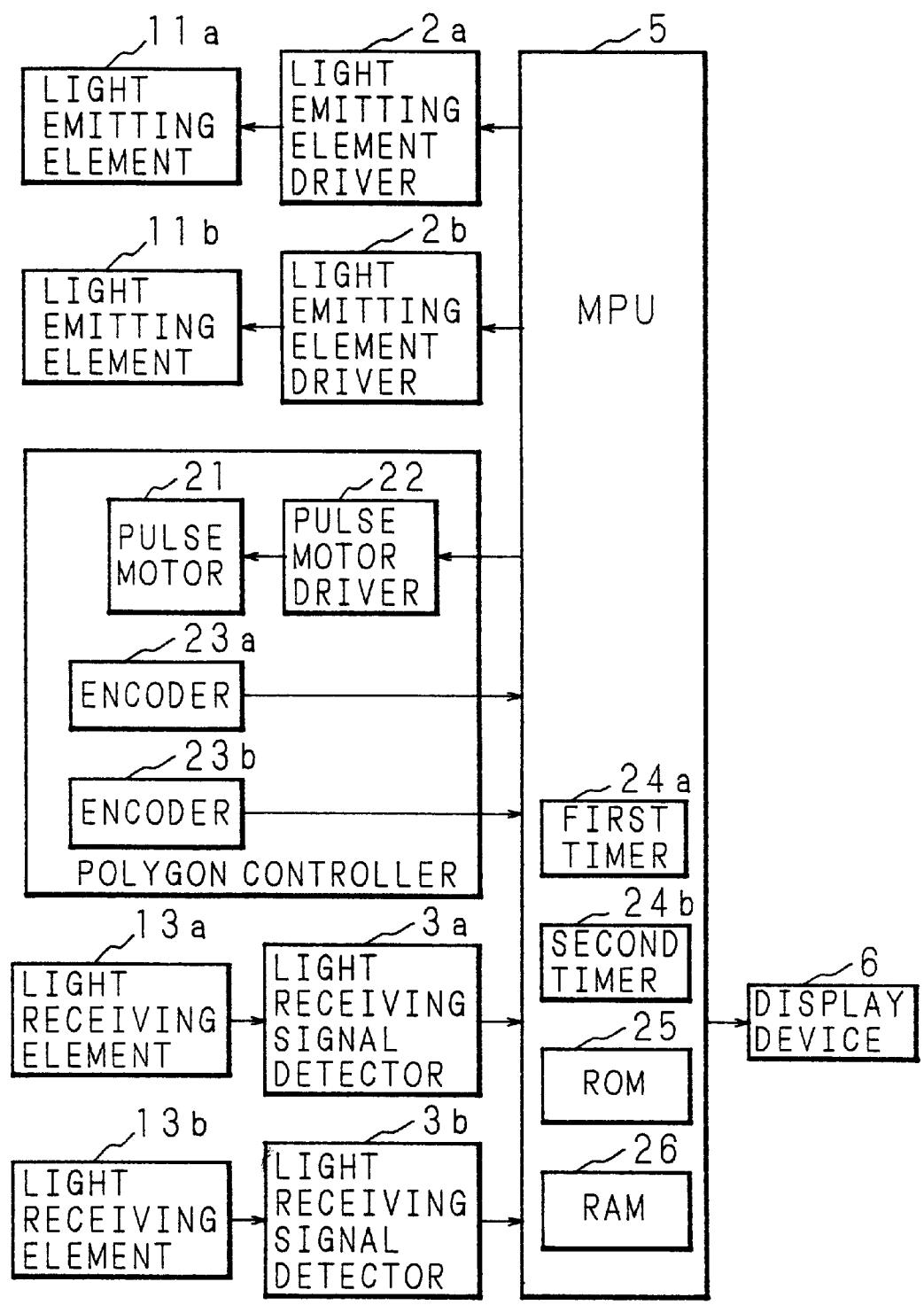
FIG. 6 is a block diagram of the optical scanning-type touch panel (first embodiment) of the present invention.

FIG. 6 is a block diagram showing a relationship between the MPU 5 and another circuit. The polygon controller 4 has a pulse motor 21 for rotating the polygon mirrors 16a and 16b, a pulse motor driver 22 for driving the pulse motor 21, and encoders 23a and 23b for detecting encode signals of rotating angles of the polygon mirrors 16a and 16b.

The MPU 5 transmits driving control signals to the light emitting element drivers 2a and 2b, and the light emitting element drivers 2a and 2b are driven according to the driving control signals so that the light emitting operations of the light emitting elements 11a and 11b are controlled. The light receiving signal detectors 3a and 3b transmit light receiving signals of the reflected lights in the light receiving elements 13a and 13b to the MPU 5. Moreover, the MPU 5 transmits a driving control signal for driving the pulse motor 21 to the pulse motor driver 22. The encoders 23a and 23b detect the encode signals of rotating angles of the polygon mirrors 16a and 16b and transmits the encode signals to the MPU 5. The MPU 5 measures a position and size of the indicator S based on the light receiving signals from the light receiving elements 13a and 13b and the encode signals from the encoders 23a and 23b, and displays the measured results on the display device 6. Here, the display screen 10 may serve also as the display device 6.

In addition, the MPU 5 includes two timers (first timer 24a and second timer 24b) having a time counting function, a read only memory (ROM) 25 for storing information about sizes of supposed indicators thereinto and a random access memory (RAM) 26 into which writing is possible.

Figure 7:
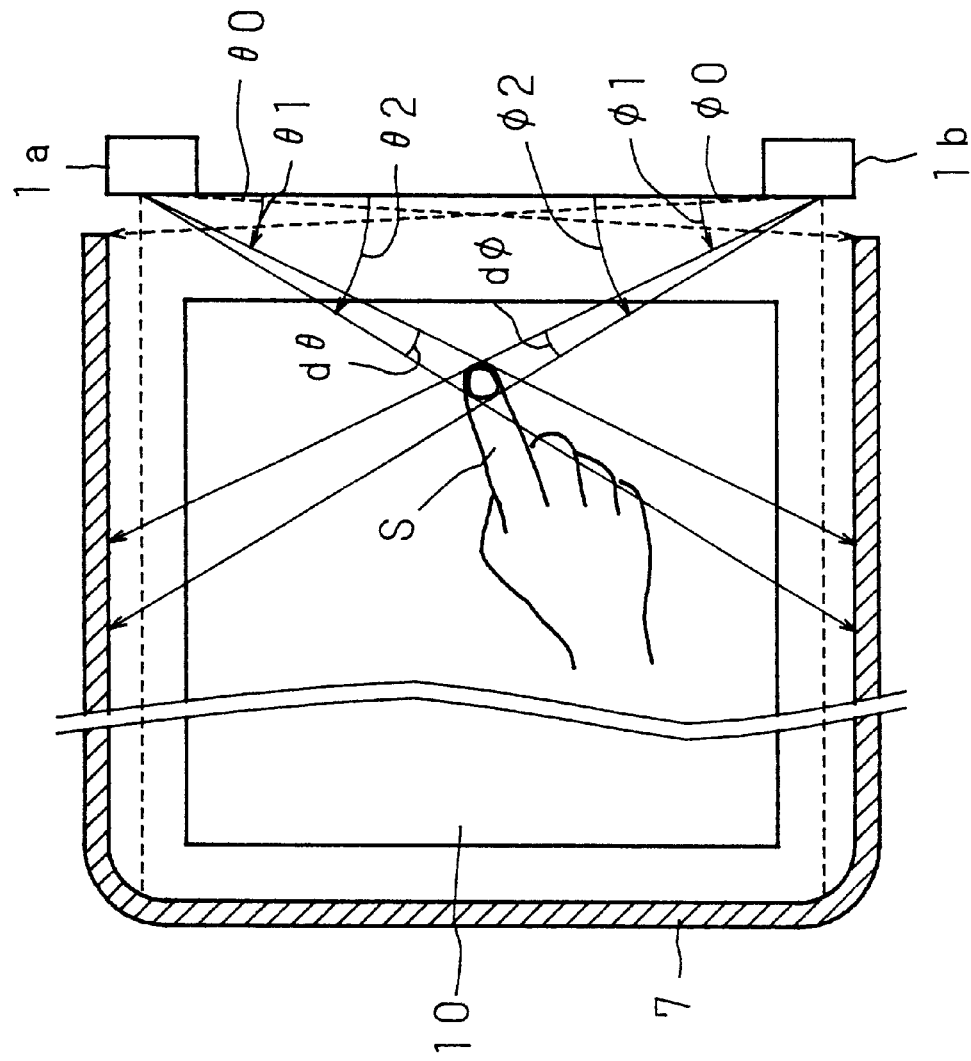
FIG. 7 is a schematic diagram showing an applied state of the optical scanning-type touch panel (first embodiment) of the present invention.

The following describes an operation for detecting a position by means of the optical scanning-type touch panel of the present invention on reference with the schematic drawing of FIG. 7 showing its principle. However, in FIG. 7, components other than the light send/receive units 1a and 1b, recurrence reflection sheet 7 and display screen 10 are not shown. Moreover, FIG. 7 shows the case where a finger is used as the indicator.

The MPU 5 controls the polygon controller 4 to rotate the polygon mirrors 16a and 16b in the light send/receive unit 1a and 1b and scans laser beams from the light emitting elements 11a and 11b angularly. As a result, the reflected light from the recurrence reflection sheet 7 enters the light receiving elements 13a and 13b. In such a manner a received light amount of the lights which entered the light receiving elements 13a and 13b is obtained as light receiving signals which are outputs of the light receiving signal detectors 3a and 3b. Here, in FIG. 7, $\theta 0$ and $\phi 0$ represent angles from reference lines connecting both the light send/receive units 1a and 1b to the end portions of the recurrence reflection sheet 7, $\theta 1$ and $\phi 1$ represent angles from the reference lines to the end portions of the indicator on the reference line side, and $\theta 2$ and $\phi 2$ represent angles from the reference lines to the end portions of the indicator on the opposite side to the reference line side.

Figure 8A:
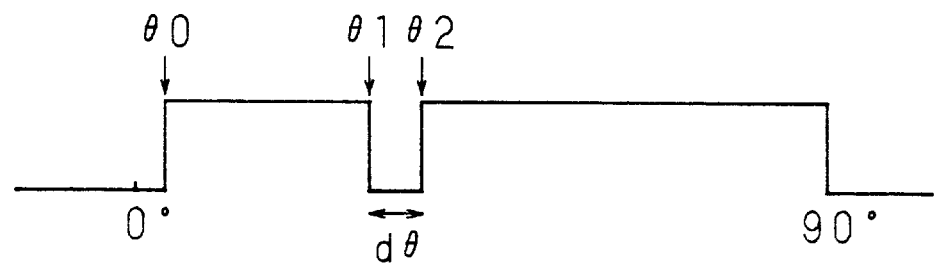
FIGS. 8A and 8B are timing charts showing level changes of a light receiving signal.
Figure 8B:
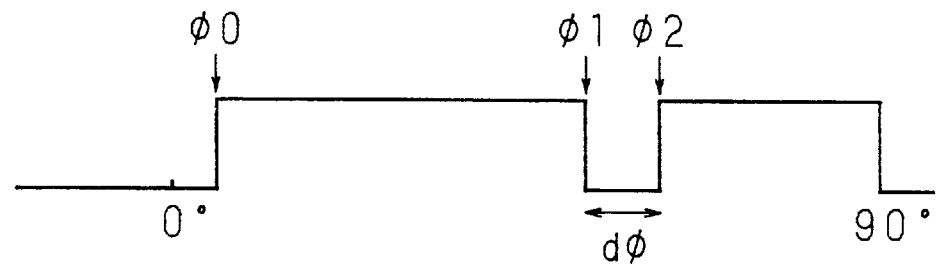

The timing charts of FIGS. 8A and 8B show waveforms of the light receiving signals in the light receiving elements 13a and 13b. When an indicator does not exist in the optical path of the scanning light, the reflected light from the recurrence reflection sheet 7 enters the light receiving elements 13a and 13b, and when an indicator exists on the optical path, the reflected light does not enter the light receiving elements 13a and 13b. Therefore, in the state shown in FIG. 7, the reflected light does not enter the light receiving element 13a in the range where the scanning angle is 0° to $\theta 0$, and the reflected light enters the light receiving element 13a in the range where the scanning angle is $\theta 0$ to $\theta 1$, and the reflected light does not enter the light receiving element 13a in the range where the scanning angle is $\theta 1$ to $\theta 2$. Similarly, the reflected light does not enter the light receiving element 13b in the range where the scanning angle is 0° to $\phi 0$, and the reflected light enters the light receiving element 13b in the range where the scanning angle is $\phi 0$ to $\phi 1$, and the reflected light does not enter the light receiving element 13b in the range where the scanning angle is $\phi 1$ to $\phi 2$. Such angles can be obtained from the rise or fall timing of the light receiving signal (see FIGS. 8A and 8B). Therefore, the cut-off region by a human finger as the indicator can be obtained as $d\theta=\theta 2-\theta 1$ and $d\phi=\phi 2-\phi 1$.

Here, needless to say, $\theta 0$ and $\phi 0$ is known from a positional relationship between the reference lines connecting the light send/receive units 1a and 1b and the end portions of the recurrence reflection sheet 7.

Figure 9:
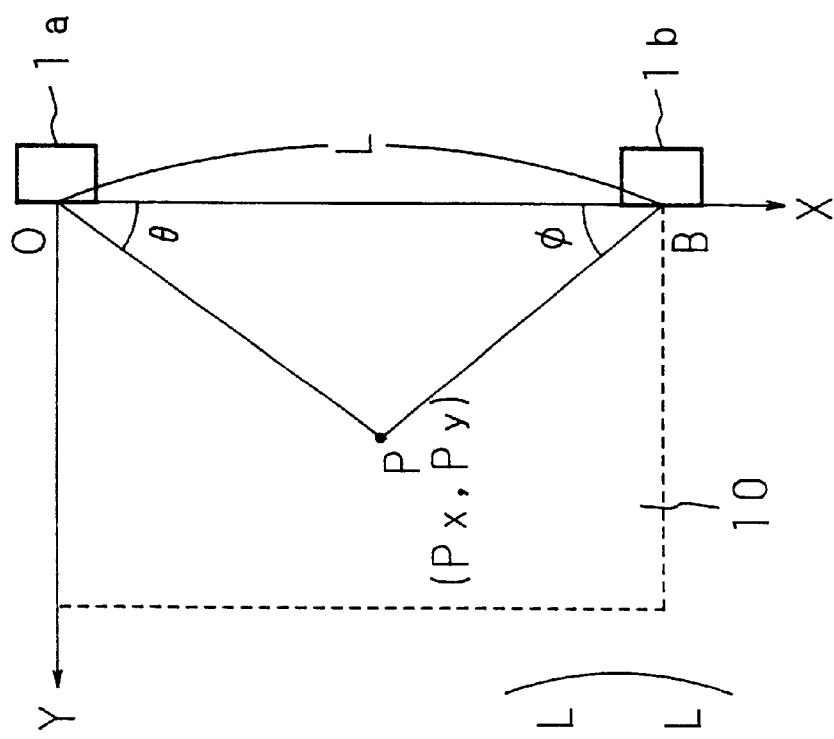
FIG. 9 is a schematic diagram showing the principle of a triangulation used for detecting a coordinate.

The following describes the process for obtaining a coordinate of a central position (indicated position) of the indicator (finger in the present example) from the cut-off region obtained in such a manner. First, the description is given as to the conversion from an angle into an orthogonal coordinate based on the triangulation. As shown in FIG. 9, the position of the light send/receive unit 1a is set as an origin 0, and the upper side and left side of the display screen 10 is set as X axis and Y axis, a length of the reference line (distance between the light send/receive units 1a and 1b) is set as L. Moreover, the position of the light send/receive unit 1b is set as B. In the case where a central point P (Px, Py) on the display screen 10 indicated by the indicator is positioned at angles of $\theta$ and $\phi$ from the light send/receive units 1a and 1b with respect to the X axis, values of X coordinate Px and Y coordinate Py of the point P can be obtained according to the principle of the triangulation as represented by the following equations (1) and (2).

$$Px=(\tan \phi)\div(\tan \theta+\tan \phi)\times L \tag{1}$$

$$Py=(\tan \theta \cdot \tan \phi)\div(\tan \theta+\tan \phi)\times L \tag{2}$$

Figure 10:
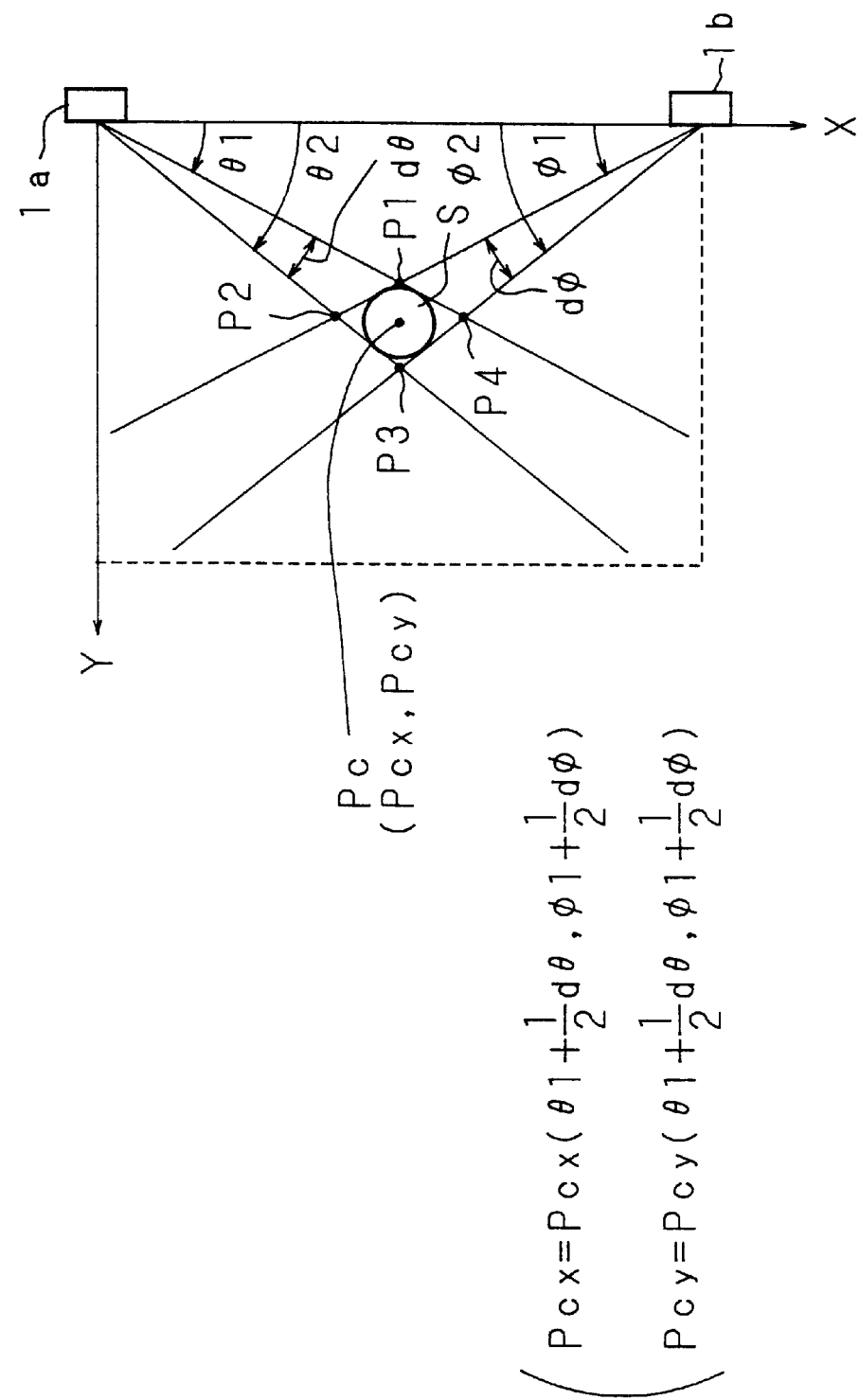
FIG. 10 is a schematic diagram showing an indicator and a cut-off region.

Since the indicator (finger) has a size, in the case where the detecting angle at the timing of rise/fall of the detected light receiving signal is adopted, as shown in FIG. 10, four points (P1 through P4 in FIG. 10) of the edge portion of the indicator (finger) S are detected. These four points are different from the indicated central point (Pc in FIG. 10). Therefore, a coordinate (Pcx, Pcy) of the central point Pc is obtained as follows. In the case where Px=Px ($\theta$, $\phi$) and Py=Py ($\theta$, $\phi$), Pcx and Pcy can be represented the following equations (3) and (4).

$$Pcx=Pcx(\theta 1+d\theta/2, \phi 1+d\phi/2) \tag{3}$$

$$Pcy=Pcy(\theta 1+d\theta/2, \phi 1+d\phi/2) \tag{4}$$

Therefore, when $\theta 1+d\theta/2$ and $\phi 1+d\phi/2$ represented by the equations (3) and (4) are substituted for $\theta$ and $\phi$ in the above equations (1) and (2), the coordinate of the indicated central point Pc can be obtained.

In the aforementioned example, an average value of the angle is first obtained, the average value is substituted into the triangulation converting equations (1) and (2) so that the coordinate of the central point Pc which is the indicated position is obtained, but in another method, the orthogonal coordinates of the four points P1 through P4 are first obtained from the scanning angle according to the triangulation converting equations (1) and (2), and an average of the obtained coordinate values of the four points is calculated so that the coordinate of the central point Pc can be obtained. Moreover, considering parallax and easy viewing of the indicated position, the coordinate of the central point Pc which is the indicated position can be determined.

Figure 11:
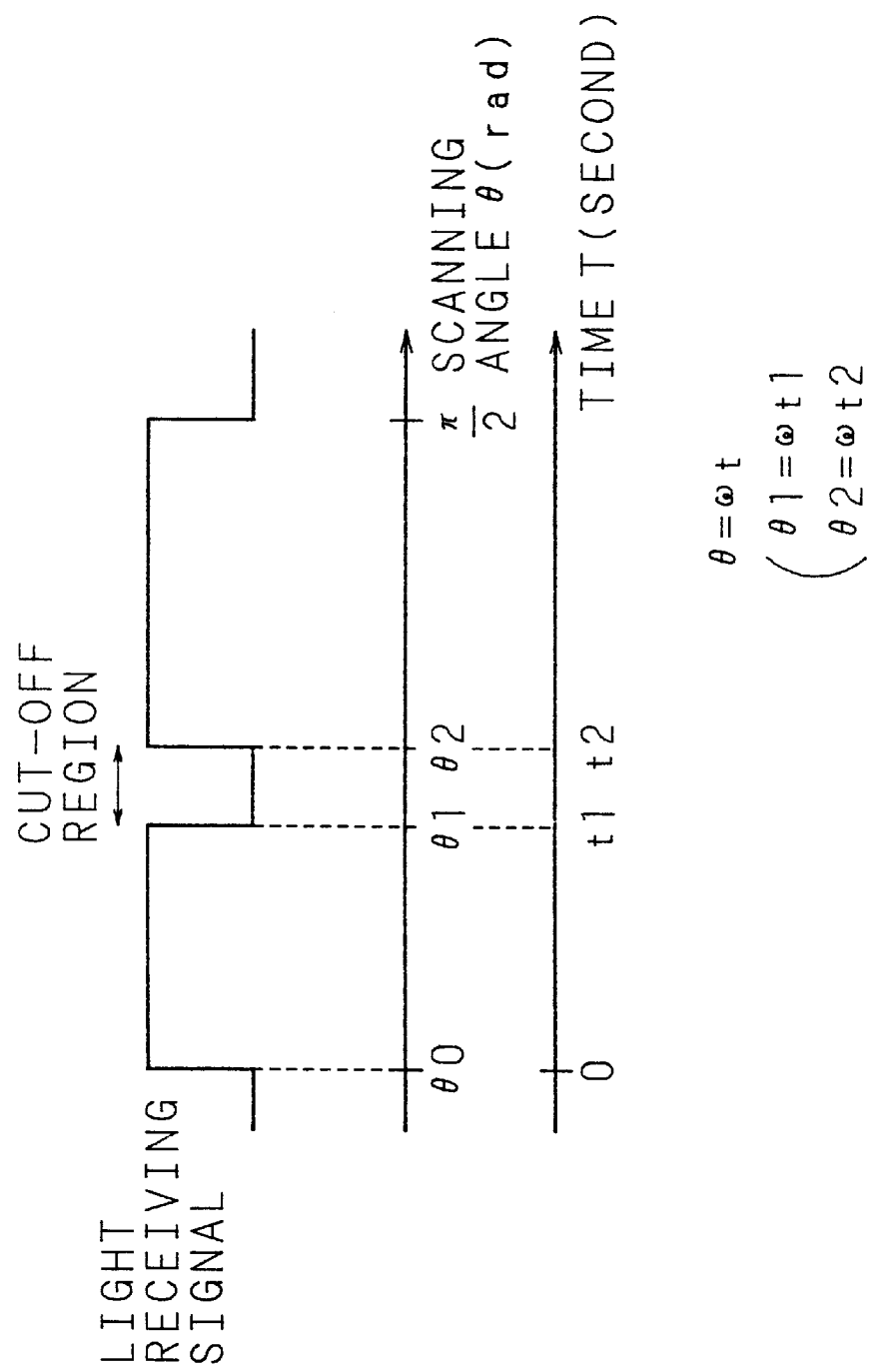
FIG. 11 is a timing chart showing a relationship between a light receiving signal, scanning angle and scanning time.

When a scanning angular velocity of the rotation of the polygon mirrors 16a and 16b is constant, the scanning angle is in proportion to the rotating time, so information about the scanning angle can be obtained by counting the time. FIG. 11 is a timing chart showing a relationship between the light receiving signal from the light receiving signal detector 3a and the scanning angle $\theta$ by the polygon mirror 16a and the scanning time T. In the case where the scanning angular velocity of the polygon mirror 16a is constant, when the scanning angular velocity is set as $\omega$, a proportional relationship between the scanning angle $\theta$ and the scanning time T represented by the following equation (5) holds.

$$\theta=\omega\times T \tag{5}$$

Therefore, the angles $\theta 1$ and $\theta 2$ at the time of the rise and fall of the light receiving signal is related to the scanning time t1 and t2 by the following equations (6) and (7).

$$\theta 1=\omega\times t1 \tag{6}$$

$$\theta 2=\omega\times t2 \tag{7}$$

Therefore, in the case where the scanning angular velocity of the polygon mirrors 16a and 16b is constant, the cut-off region and coordinate position of the indicator (finger) can be measured by using the time information.

Figure 12:
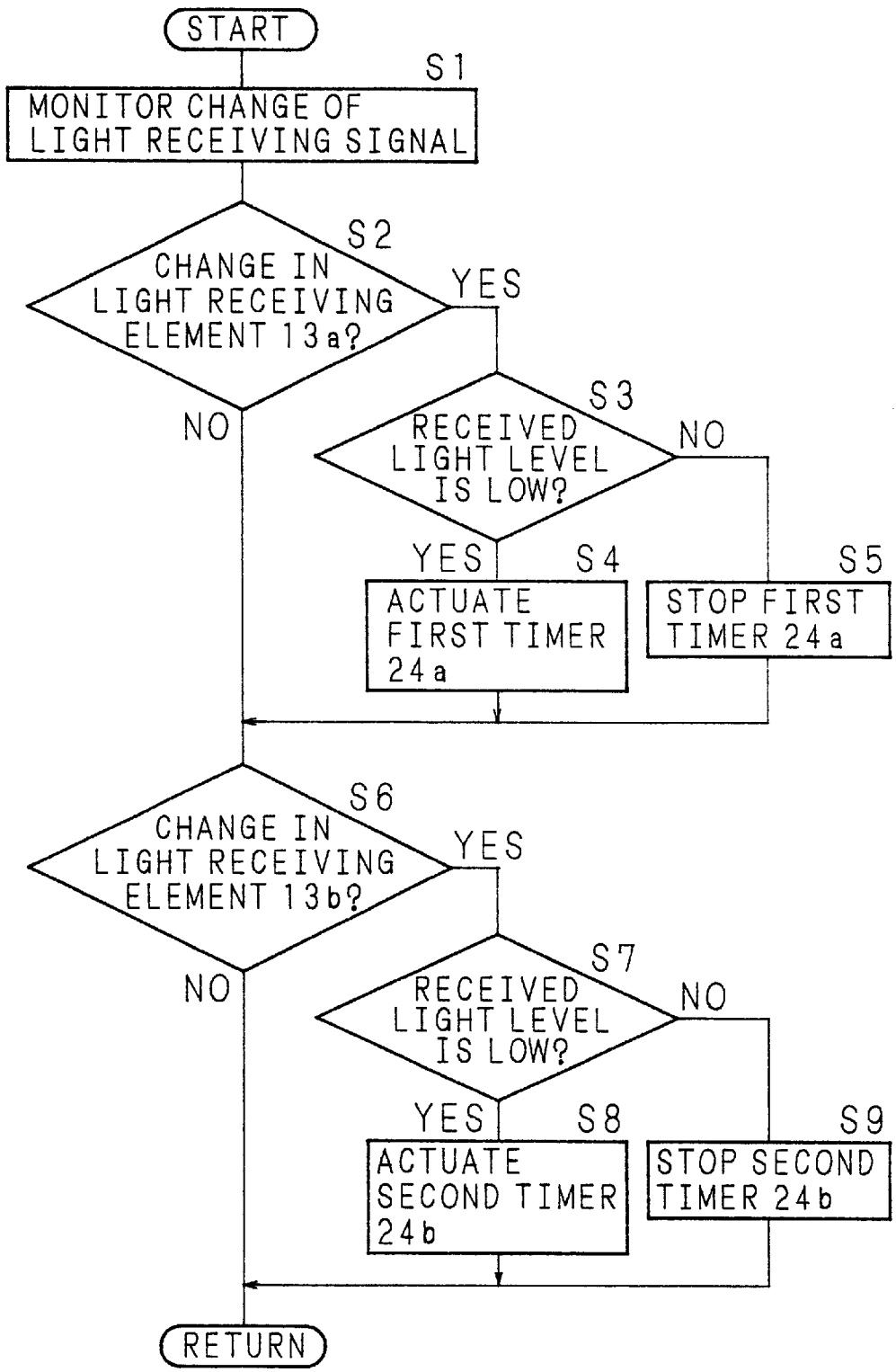
FIG. 12 is a flow chart showing algorithm for measuring a time of shielding.

FIG. 12 is a flow chart showing one example of algorithm in the MPU 5 when the time interval at which the reflected light is in low level is measured by using the first timer 24a and second timer 24b included in the MPU 5. The MPU 5 detects a change in the light receiving signals from the light receiving signal detectors 3a and 3b, and when the level of the light receiving signals is lowered, actuates the timers 24a and 24b to start the time counting operation, and when the level is returned, stops the timers 24a and 24b to end the time counting operation.

The MPU 5 first checks a change in the light receiving signals from the light receiving signal detectors 3a and 3b (S1) and judges as to whether or not the light receiving signal from the light receiving signal detector 3a is changed (S2). When the signal is not changed ("NO" at S2), the sequence goes to S6. When the signal is changed ("YES" at S2), the MPU 5 judges as to whether or not the level of the light receiving signal is low (S3). When the level is low ("YES" at S3), the MPU 5 actuates the first timer 24a (S4), and when the level is high ("NO" at S3), stops the first timer 24a (S5) to carry the process to S6. At S6, the MPU 5 judges as to whether or not the light receiving signal from the light receiving signal detector 3b is changed. When the signal is not changed ("NO" at S6), the sequence is returned. When the signal is changed ("YES" at S6), the MPU 5 judges as to whether or not the level of the light receiving signal is low (S7). When the level is low ("YES" at S7), the MPU 5 actuates the second timer 24b (S8), and when the level is high ("NO" at S7), the MPU 5 stops the second timer 24b (S9) and the sequence is returned.

Figure 13:
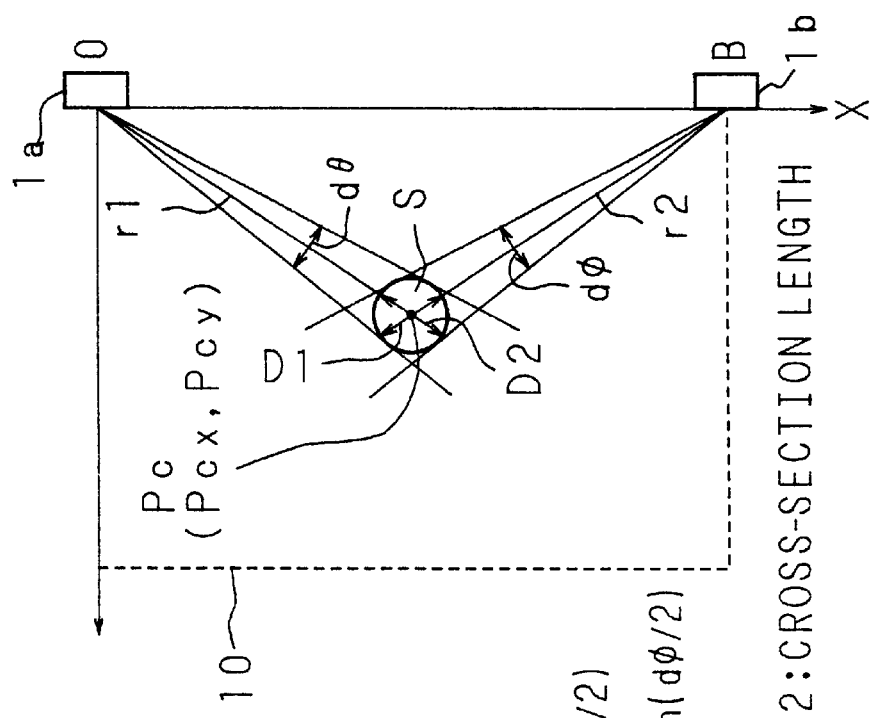
FIG. 13 is a schematic diagram showing the principle of measuring a cross-section length.

In addition, in the optical scanning-type touch panel of the present invention, a cross-section length of the indicator can be obtained from the measured cut-off region. FIG. 13 is a schematic diagram showing the principle of cross-section length measurement. In FIG. 13, D1 and D2 represents cross section lengths of the indicator S viewed from the light send/receive units 1a and 1b. First, distances OPc (r1) and BPc (r2) from positions O (0, 0) and B (L, 0) of the light send/receive units 1a and 1b to the central point Pc (Pcx, Pcy) of the indicator S are obtained according to the following equations (8) and (9).

$$OPc = r1 = (Pcx^2 + Pcy^2)^{1/2} \qquad (8)$$

$$BPc = r2 = \{(L-Pcx)^2 + Pcy^2\}^{1/2} \qquad (9)$$

Since the cross-section length can be approximated by a product of the distance and a sine value of a cut-off angle, the respective cross-section lengths D1 and D2 can be measured according to the following equations (10) and (11).

$$D1 = 2r1 \cdot \sin(d\theta/2) = 2(Pcx^2 + Pcy^2)^{1/2} \cdot \sin(d\theta/2) \qquad (10)$$

$$D2 = 2r2 \cdot \sin(d\phi/2) = 2\{(L-Pcx)^2 + Pcy^2\}^{1/2} \cdot \sin(d\phi/2) \qquad (11)$$

In the case where $\theta$, $\phi \approx 0$, since approximation can be performed such that $\sin d\theta \approx d\theta \approx \tan d\theta$ and $\sin d\phi \approx d\phi d \approx \tan d\phi$, in the equations (10) and (11), $\sin d\theta$ and $\sin d\phi$ may be replaced respectively by $d\theta$ or $\tan d\theta$ and $d\phi$ or $\tan d\phi$.

Figure 14:
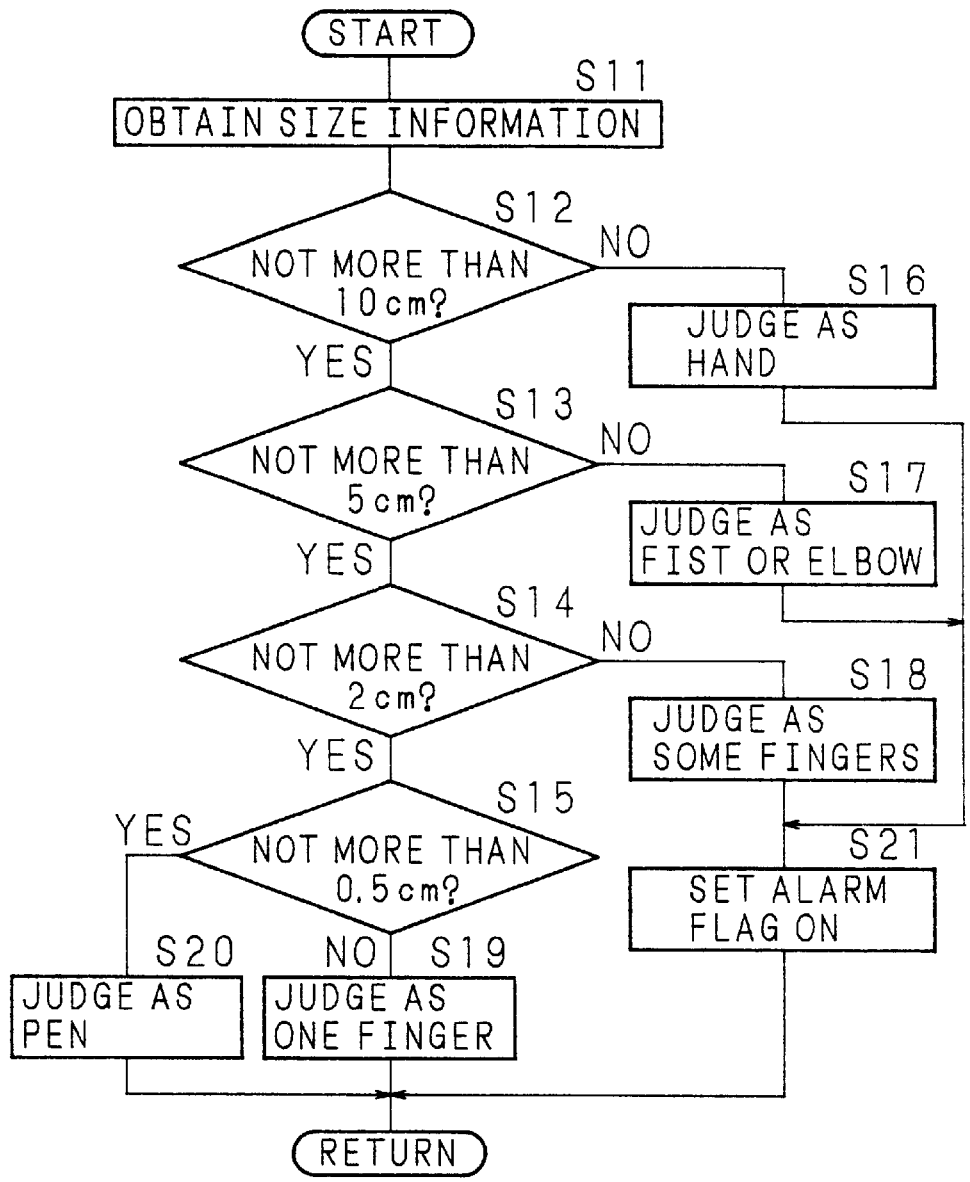
FIG. 14 is a flow chart showing algorithm for determining a type of the indicator.

When a position is specified by one finger or pen, a plurality of fingers, hand or elbow occasionally touch the display screen 10 falsely. In this case, it is necessary to perform a process of error detection. Therefore, in the present invention, information about a size of the indicator is obtained from the measured cross-section length, and a judgment can be made as to what the indicator is based on the obtained size information. FIG. 14 is a flow chart showing one example of algorithm for judging a type of the indicator. By comparing the actually calculated indicator size information with information about sizes of plural indicators previously supposed, a type of the indicator is judged. When the judgment is made that the indicator is other than one finger or pen, an alarm flag is turned on. Here, as mentioned above, the information about sizes of plural indicators supposed is previously stored in the ROM 25 and RAM 26 included in the MPU 5.

First, the MPU 5 obtains information about a size of current indicator (S11) and judges as to whether or not the size is 10 cm or less (S12). When the size is larger than 10 cm ("NO" at S12), the MPU 5 judges that the indicator is a hand (S16) and turns on the alarm flag (S21), and the sequence is returned. When the size is 10 cm or less ("YES" at S12), the MPU 5 judges as to whether or not the size is 5 cm or less (S13). When the size is larger than 5 cm ("NO" at S13), the MPU 5 judges that the indicator is a clenched fist or elbow (S17) and turns the alarm flag on (S21), and the sequence is returned. When the size is 5 cm or less ("YES" at S13), the MPU 5 judges as to whether or not the size is 2 cm or less (S14). When the size is larger than 2 cm ("NO" at S14), the MPU 5 judges that the indicator is a plurality of fingers which are bundled (S18) and turns on the alarm flag (S21), and the sequence is returned. When the size is 2 cm or less ("YES" at S14), the MPU 5 judges as to whether or not the size is 0.5 cm or less (S15). When the size is larger than 0.5 cm ("NO" at S15), the MPU 5 judges that the indicator is one finger (S19), and when the size is 0.5 cm or less ("YES" at S15), judges that the indicator is a pen (S20), and the sequence is returned.

A type of the indicator is judged in such a manner, and when it is found that the indicator for specifying a position is other than one finger or pen, the alarm flag is turned on and the flag information is transmitted from the MPU 5 to the display device 6. When the flag information is transmitted, detected position data to be transmitted from the MPU 5 to the display device 6 is made to be invalid, and a warning mark is displayed on the screen of the display device 6. Moreover, an arrangement such that a result of judging a type is displayed on the display device 6 is also possible.

Here, an arrangement such that when the alarm flag is turned on, a buzzer is beeped may be realized. Moreover, as another method of making detected position data invalid, when an indicator other than one finger or pen is judged, it is possible to control detected position data so that they are not outputted from the MPU 5 to the display device 6.

Second Embodiment

Figure 15:
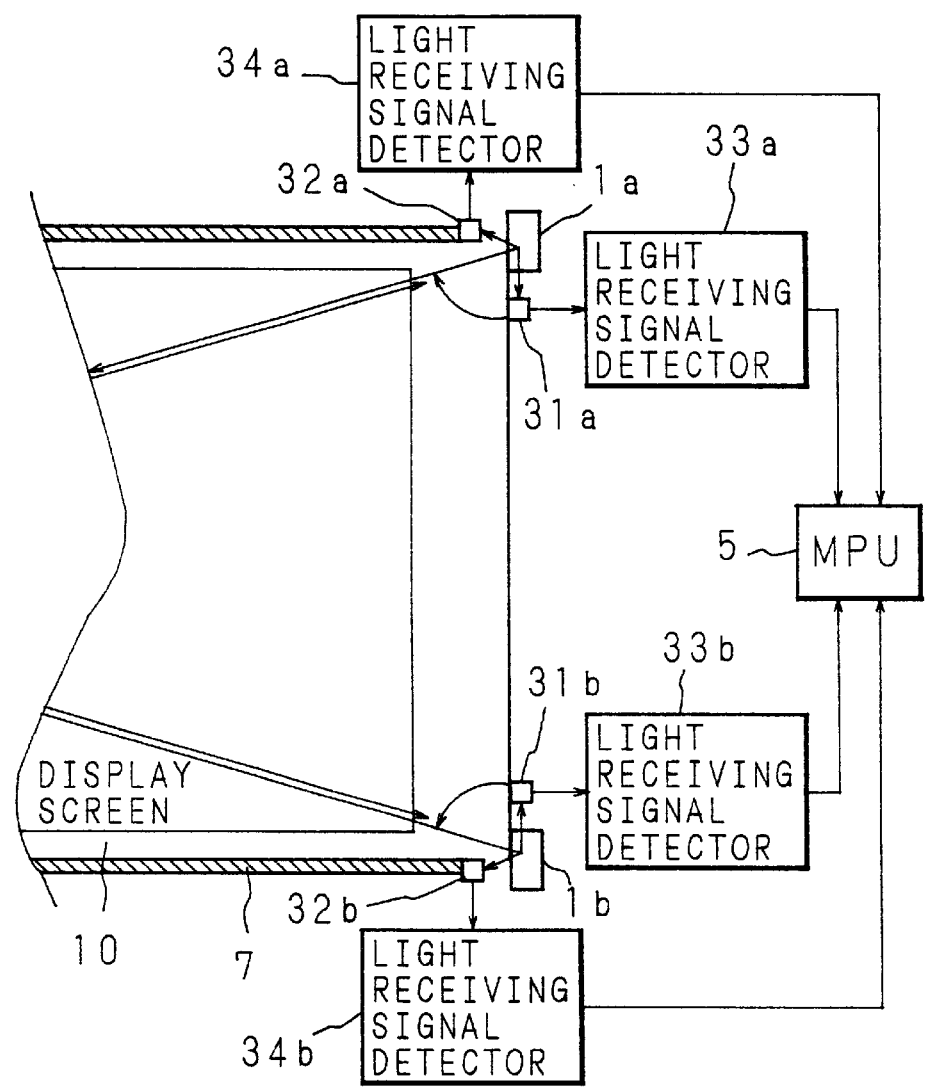
FIG. 15 is a schematic diagram showing a basic constitution of an optical scanning-type touch panel (second embodiment) of the present invention.
Figure 16:
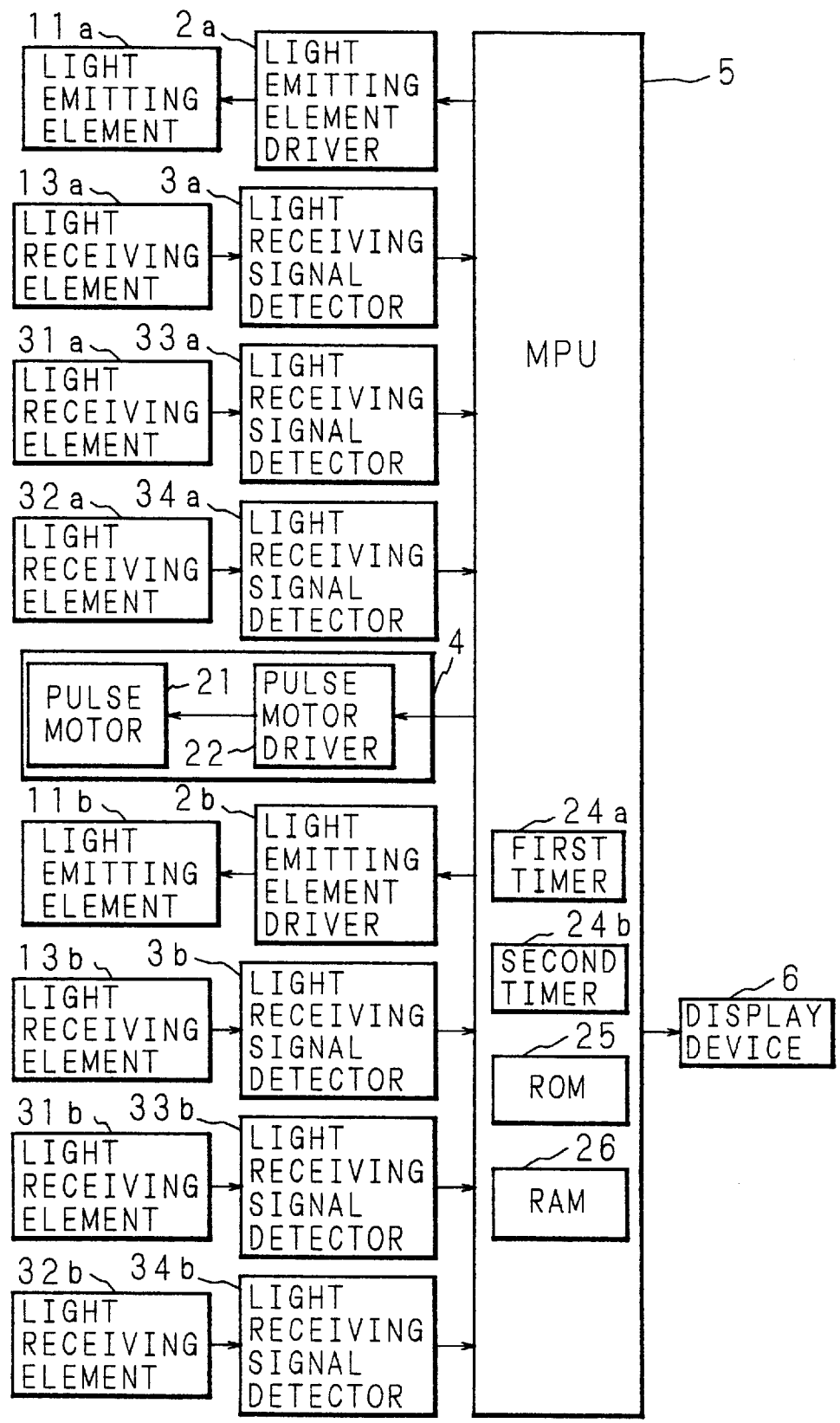
FIG. 16 is a block diagram of the optical scanning-type touch panel (second embodiment) of the present invention.

FIG. 15 is a schematic diagram showing a basic constitution of the optical scanning-type touch panel according to the second embodiment of the present invention, and FIG. 16 is a block diagram of the second embodiment. In FIGS. 15 and 16, parts represented by the same reference numerals as those in FIGS. 1 and 6 are the same members. Here, in FIG. 15, the light emitting element drivers 2a and 2b, light receiving signal detectors 3a and 3b, polygon controller 4 and display device 6 are omitted.

In the second embodiment, in order to detect a scanning region on the display screen 10, two light receiving elements 31a and 32a for detecting timing are provided for the light send/receive unit 1a, and two light receiving elements 31b and 32b for detecting timing are provided for the light send/receive unit 1b so that they are extremely close to the display screen 10. Here, light receiving surfaces of the light receiving elements 31a and 32a face the side of the light send/receive unit 1a, and light receiving surfaces of the light receiving elements 31b and 32b face the side of the light send/receive unit 1b.

In addition, light receiving signal detectors 33a, 34a, 33b and 34b for converting a received light amount of the light receiving elements 31a, 32a, 31b and 32b into electric signals are provided. The polygon controller 4 in the second embodiment does not have the encoders 23a and 23b in the first embodiment, so the polygon controller 4 is composed of the pulse motor 21 and pulse motor driver 22.

Just before the scanning goes to the scanning region to be detected, laser beams from the light send/receive units 1a and 1b enter the light receiving elements 31a and 31b for detecting timing positioned on the upper stream side of the scanning direction, and just after the scanning goes out of the scanning region to be detected, the laser beams from the light send/receive units 1a and 1b enter the light receiving elements 32a and 32b for detecting timing positioned on the lower stream side of the scanning direction.

As mentioned above, in the second embodiment, position detecting start and end timings are determined by a pair of the light receiving elements, and the scanning angle of the laser beams can be detected even without the encoders 23a and 23b of the first embodiment.

Figure 17:
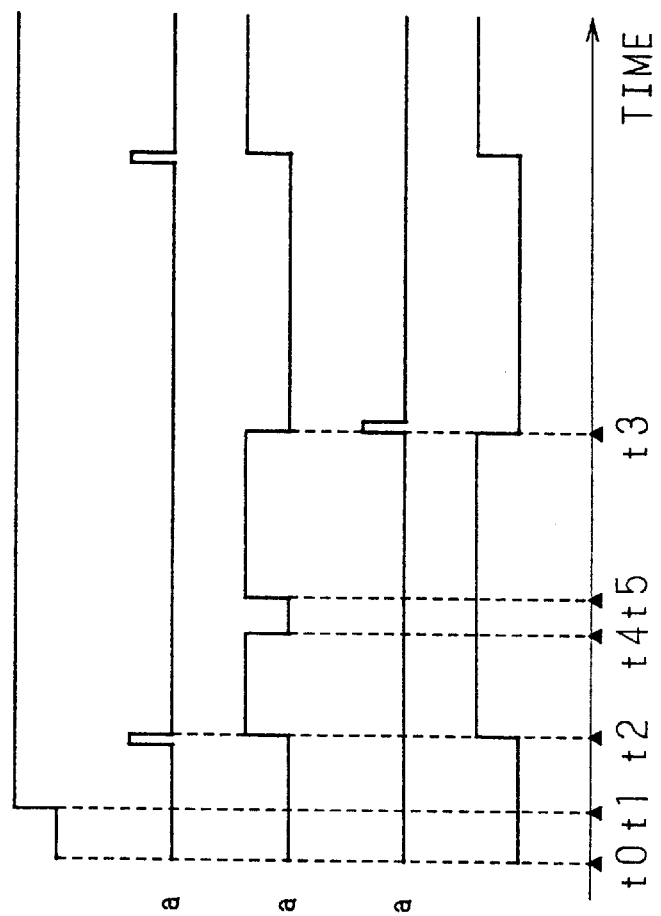
FIGS. 17A–17E are timing charts for explaining an operation of the light-scanning-type touch panel (second embodiment) of the present invention.

FIGS. 17A–17E are timing charts for explaining the operation of the optical scanning-type touch panel according to the second embodiment, FIG. 17A shows the light emitting operation of the light emitting element 11a of the light send/receive unit 1a, FIG. 17B shows a light receiving signal of the light receiving signal detector 33a representing a received light amount in the light receiving element 31a for detecting timing positioned on the upper stream side of the scanning direction, FIG. 17C shows a light receiving signal of the light receiving signal detector 3a representing a received light amount in the light receiving element 13a of the light send/receiving unit 1a, FIG. 17D shows a light receiving signal of the light receiving signal detector 34a representing a received light amount in the light receiving element 32a for detecting timing position on the lower stream side of the scanning direction, and FIG. 17E shows the time counting operation of the timer included in the MPU 5.

A time t0 is a timing at which the power source is turned on and the polygon mirror 16a starts rotating, a time t1 is a timing at which the light emitting operation of the light emitting element 11a is started, a time t2 is a timing at which receiving of a laser beam by the light receiving element 31a is ended, and a time t3 is a timing at which receiving of a laser beam by the light receiving element 32a is started. The time t2 and time t3 are respectively timings of scanning start and scanning end, and the light receiving level of the light receiving element 13a becomes high at the time t2, and the level becomes low at the time t3. Moreover, the timer starts the counting at the time t2 and ends the counting at the time t3. A time t4 is a timing at which the light receiving level of the light receiving element 13a falls due to the indicator, and a time t5 is a timing at which the laser beam goes through the cut-off region and thus the light receiving level of the light receiving element 13a rises.

The light emitting element 11a is driven with the rotation of the polygon mirror 16a being constant, a timing at which the laser beam scanned by the light send/receive unit 1a reaches a region to be detected is detected at the light receiving timing (time t2) in the light receiving element 31a, and a timing at which the scanned laser beam goes out of the region to be detected is detected as the light receiving timing (time t3) in the light receiving element 32a. Since the positions where the light receiving elements 31a and 32a are provided are known, the position of the indicator such as a finger and pen which shields the scanned laser beam can be also measured between the positions where the light receiving elements 31a and 32a are provided. Namely, in FIG. 17, between the time t2 and time t3, the cut-off region and the central position of the indicator can be measured from a count value of the timer from the timing (time t4) at which the light receiving level of the light receiving element 13a falls to the timing (time t5) at which the light receiving level rises.

Here, the processing operation on the side of the light send/receive unit 1b is the same as that on the side of the light send/receive unit 1a mentioned above, so the description thereof is omitted.

Third Embodiment

Figure 18:
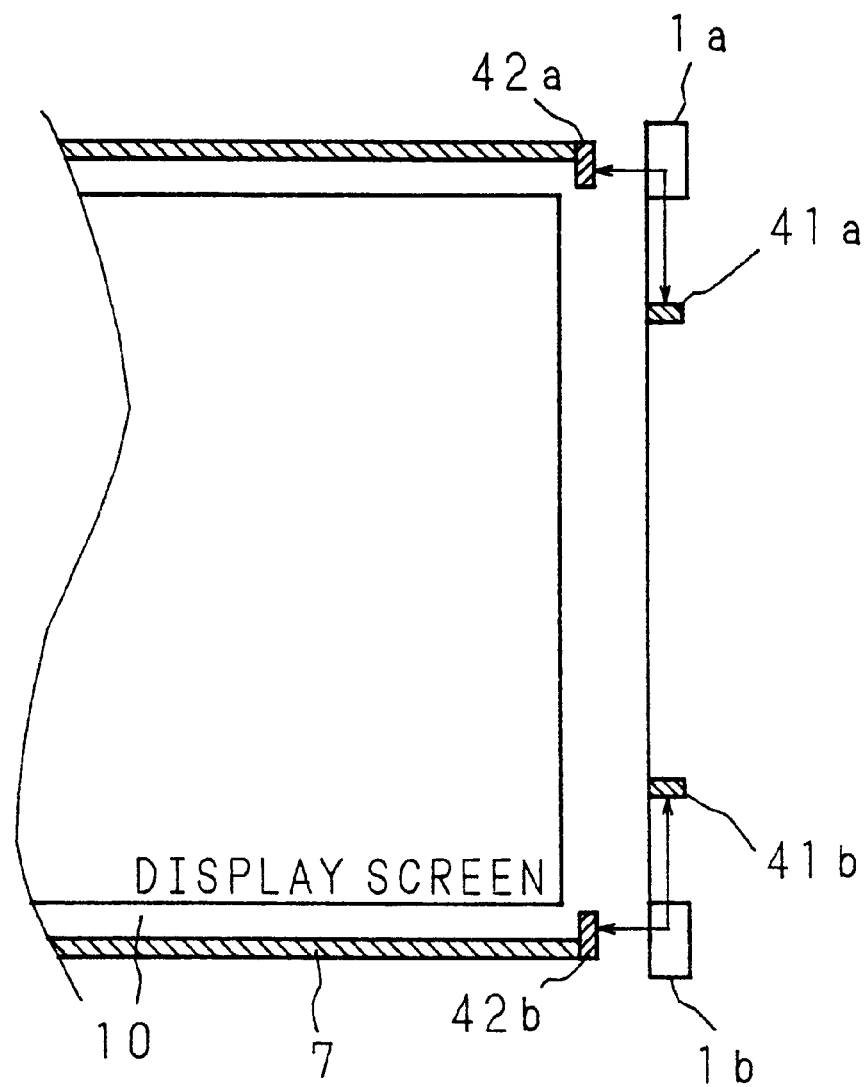
FIG. 18 is a schematic diagram showing a basic constitution of an optical scanning-type touch panel (third embodiment) of the present invention.

FIG. 18 is a drawing showing the basic constitution of the optical scanning-type touch panel according to the third embodiment of the present invention. In FIG. 18, parts represented by the same reference numerals as FIG. 1 are the same members. Here, the light emitting element drivers 2a and 2b, light receiving signal detectors 3a and 3b, polygon controller 4, MPU 5 and display device 6 are omitted.

In the third embodiment, in order to detect a scanning region on the display screen, two recursive reflectors 41a and 42a for detecting timing are provided for the light send/receive unit 1a, and two recursive reflectors 41b and 42b for detecting timing are provided for the light send/receive unit 1b so that they are extremely close to the display screen 10. These recursive reflectors 41a, 42a, 41b and 42b are composed of the same material as the recurrence reflection sheet 7.

Just before the scanning enters the scanning region to be detected, laser beams from the light receiving units 1a and 1b are reflected by the recursive reflectors 41a and 41b for detecting timing positioned on the upper stream side of the scanning direction and the reflected lights enter the light receiving elements 13a and 13b, and just after the scanning goes out of the scanning region to be detected, the laser beams from the light send/receive units 1a and 1b are reflected by the recursive reflectors 42a and 42b for detecting timing positioned on the lower stream side of the scanning direction and the reflected lights enter the light receiving elements 13a and 13b.

As mentioned above, in the third embodiment, the position detecting start and end timing is determined by a pair of the recursive reflectors, and thus the scanning direction of the laser beam can be detected even without the encoders 23a and 23b of the first embodiment. At this time, since the recursive reflectors 41a, 41b, 42a and 42b are provided so as to be close to the light send/receive units 1a and 1b, attenuation of the reflected lights therefrom is less than the reflected light from the recurrence reflection sheet 7, and the light receiving level in the light receiving elements 13a and 13b becomes high.

Figure 19:
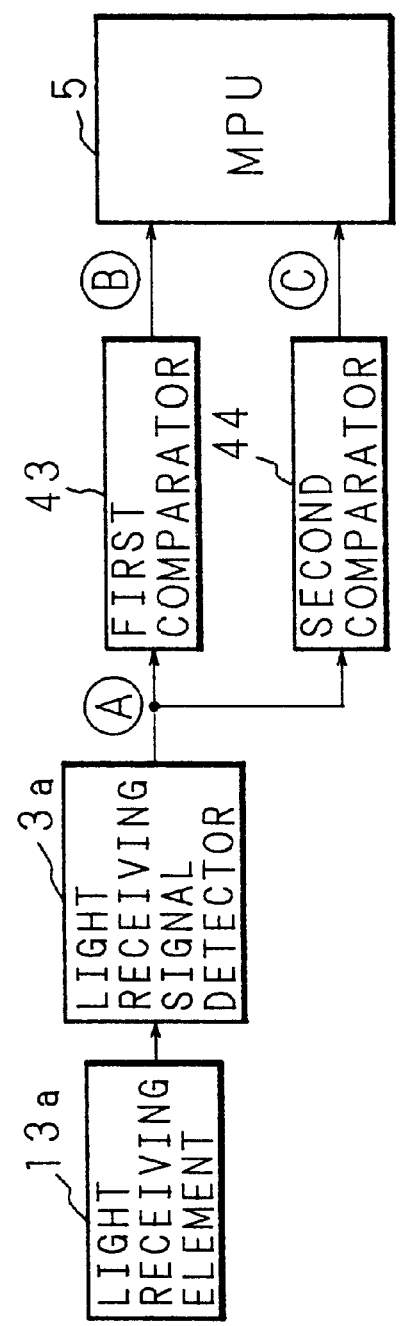
FIG. 19 is a block diagram of the optical scanning-type touch panel (third embodiment) of the present invention.

FIG. 19 is a block diagram of the third embodiment. Reference numeral 43 represents a first comparator for detecting shielding, and it compares a level of a receiving signal from the light receiving signal detector 3a representing a received light amount in the light receiving element 13a with a first threshold level to output the compared result to the MPU 5 in the form of a binary signal. Reference numeral 44 represents a second comparator for detecting scanning start/end, and it compares the level of the receiving signal from the light receiving signal detector 3a with a second threshold level which is higher than the first threshold level to output the compared result to the MPU 5 in the form of a binary signal.

FIGS. 20A–20C are timing charts for explaining the operation of the third embodiment, FIG. 20A shows a receiving signal from the light receiving signal detector 3a representing a received light amount in the light receiving element 13a, FIG. 20B shows an output signal of the first comparator 43, and FIG. 20C shows an output signal of the second comparator 44. Moreover, a broken line W1 represents the first threshold level, and a broken line W2 represents the second threshold level.

A time t0 is a timing at which light receiving of a reflected light from the recursive reflector 41a is started, a time t1 is a timing at which the light receiving of the reflected light from the recursive reflector 41a is ended and light receiving of a reflected light from the recurrence reflection sheet 7 is started, a time t2 is a timing at which the light receiving of the reflected light from the recurrence reflection sheet 7 is ended and light receiving of a reflected light from the recursive reflector 42a is started, and a time t3 is a timing at which the light receiving of the reflected light from the recursive reflector 42a is ended. Moreover, a time t4 is a timing at which the light receiving level of the light receiving element 13a falls due to the indicator, and a time t5 is a timing at which a scanning laser beam goes through the cut-off region and the light receiving level of the light receiving element 13a rises. The time t1 and time t2 are respectively the scanning start timing and scanning end timing. These timings are detected based on the result of comparing the level of the light receiving signal with the first threshold level W1 and the second threshold level W2.

Here, the description was given as to the processing operation on the side of the light send/receive unit 1a, but since the processing operation on the side of the light send/receive unit 1b is the same as that on the side of the light send/receive unit 1a, the description thereof is omitted.

In the aforementioned example, the reflected lights from the recursive reflectors 41a, 41b, 42a and 42b are distinguished from the reflected light from the recurrence reflection sheet 7 according to a difference in the attenuation of light due to a difference in distance, but the reflectance of the recursive reflectors 41a, 42a, 41b and 42b is set higher than the reflectance of the recurrence reflection sheet 7 so that these reflected lights can be distinguished more clearly.

In the third embodiment, by checking a change in a received light amount in the light receiving elements 13a and 13b, reference signals of the scanning start timing and scanning end timing can be generated, and resolution can be kept constant without increasing detecting elements.

Fourth Embodiment

Figures 21A, 21B:
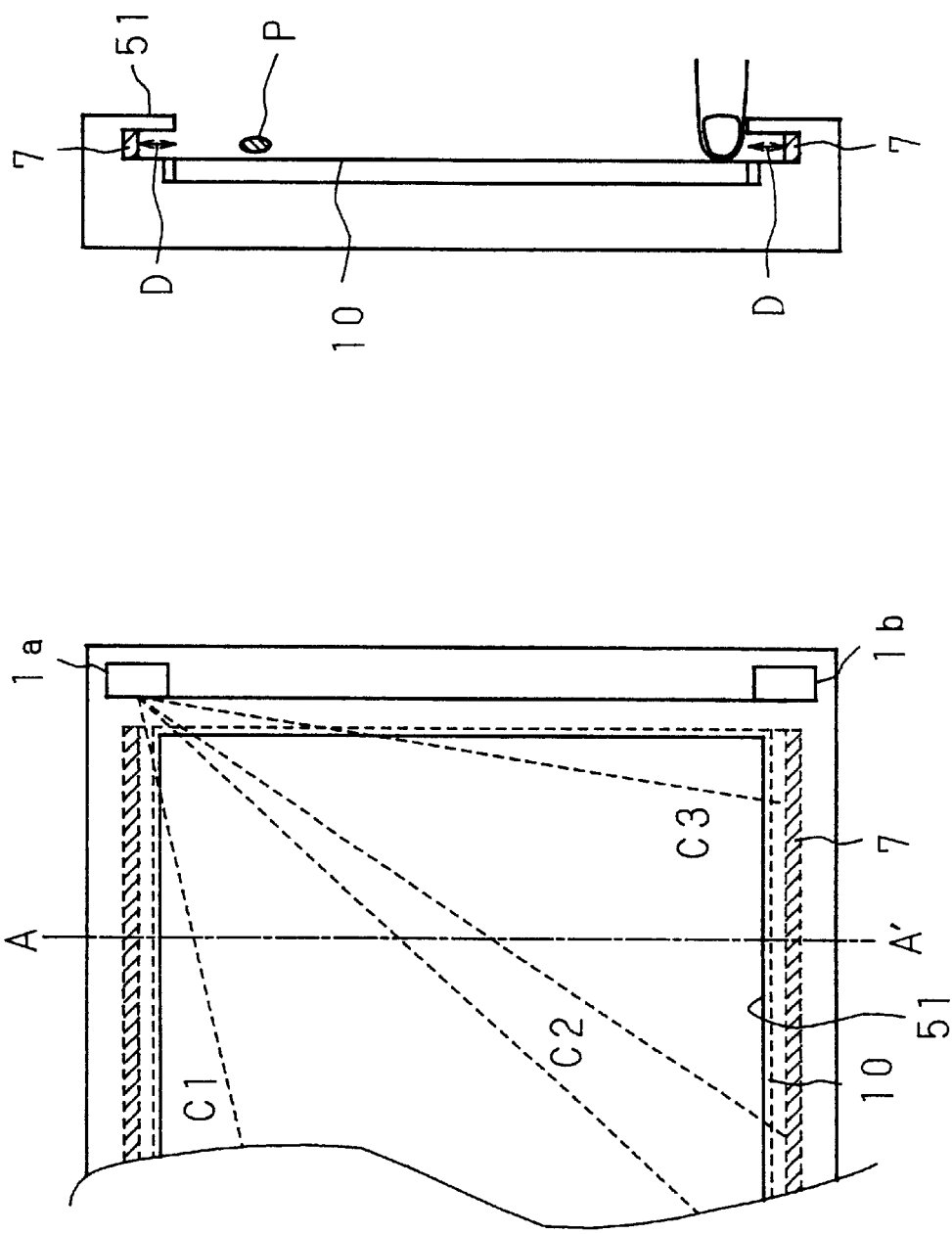
FIG. 21A is a schematic plane view showing a basic constitution of an optical scanning-type touch panel (fourth embodiment) of the present invention.
FIG. 21B is a schematic sectional view showing the basic constitution of the optical scanning-type touch panel (fourth embodiment) of the present invention.

FIG. 21A is a plan view showing the basic configuration of the optical scanning-type touch panel according to the fourth embodiment of the present invention, and FIG. 21B is a cross-sectional view taken along line A–A' of FIG. 21A. In FIGS. 21A and 21B, parts represented by the same reference numerals as FIG. 1 are the same members. Here, the light emitting element drivers 2a and 2b, light receiving signal detectors 3a and 3b, polygon controller 4, MPU 5 and display device 6 are omitted.

In the fourth embodiment, a canopy-shaped shielding body 51 is provided on the outside of the display screen 10 up to a position where a visual field of the display screen 10 is not disturbed so as to cover the recurrence reflection sheet 7. As a result, a cut-off impossible region D where the indicator such as a finger cannot enter is formed between the canopy-shaped shielding body 51 and the recurrence reflection sheet 7. According to this constitution, even if the indicator exists in any position including the edge portion of the display screen 10, the light receiving timing of a reflected light from the cut-off impossible region D can be a reference timing of scanning start/end.

Reference symbol P in FIG. 21B represents a cross section of a laser beam projected from the light send/receive unit 1a. As shown here, in the optical scanning-type touch panel of the present invention, laser beams projected from the light send/receive units 1a and 1b have an elliptical cross section which is flat in a direction parallel with the surface of the display screen 10 (scanning direction), for example, in which the direction parallel with the surface of the display screen 10 is a longitudinal axis. The reason for this is the constitution of the recurrence reflection sheet 7.

Figure 22A:
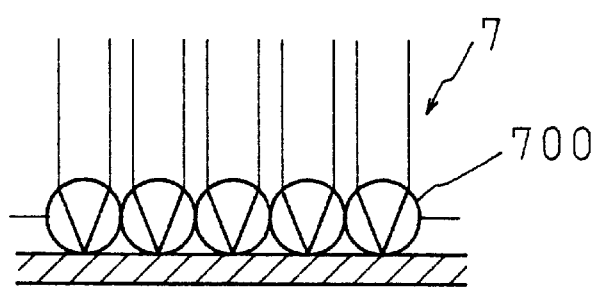
FIG. 22A is a schematic diagram showing a constitution of a recurrence reflection sheet.
Figure 22B:
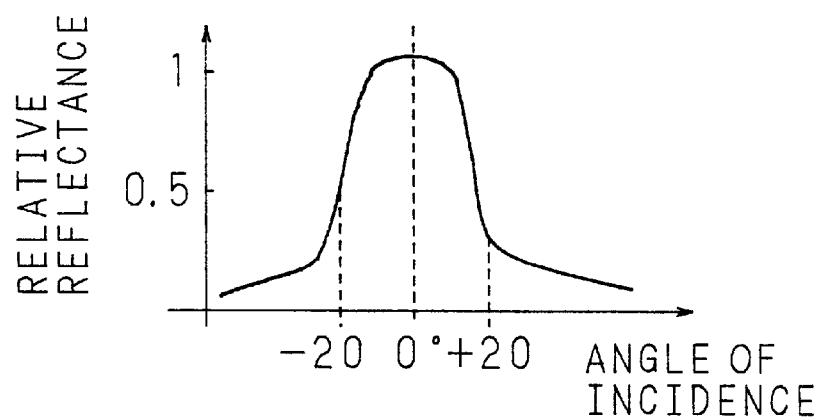
FIG. 22B is a graph showing a relationship between an incidence angle and relative reflectance of the recurrence reflection sheet.

FIGS. 22A is a schematic diagram showing a constitution of the reflecting surface side of the recurrence reflection sheet 7. As shown here, the reflecting surface of the recurrence reflection sheet 7 is constituted such that a lot of spherical lenses 700 are arranged in the direction parallel with the surface of the display screen 10, namely, in the scanning direction of the laser beam, and since these spherical lenses 700 have a relationship between an angle of incidence and relative reflectance shown in FIG. 22B, in the case where a width of the scanning direction of the laser beams projected from the light send/receive units 1a and 1b is not larger than a certain degree, an effecting reflected light amount cannot be obtained.

However, in the case where the spherical lenses 700 of the recurrence reflection sheet 7 are enough small, on the contrary, the width of the scanning direction of the laser beam is reduced so that the resolution can be heightened. However, also in this case, since it is necessary to enlarge a sectional area of the laser beam in order to obtain sufficient reflected light amount, it is desirable to use a laser beam having a flat section in which the width of a direction which intersects perpendicularly to the scanning direction (direction which intersects perpendicularly to the surface of the display screen 10) is large.

FIGS. 23A–23D are timing charts showing an example of a receiving signal from the light receiving signal detector 3a representing a received light amount in the light receiving element 13a in the fourth embodiment.

FIG. 23A represents a receiving signal in the case where the indicator does not exist, FIG. 23B represents a receiving signal in the case where the indicator exists in the edge portion of the display screen 10 (region C1 in FIG. 21A), FIG. 23C represents a receiving signal in the case where the indicator exists in the central portion of the display screen 10 (region C2 in FIG. 21A), and FIG. 23D represents a receiving signal in the case where the indicator exists in the edge portion of the display screen 10 (region C3 in FIG. 21A). Even in the case where the indicator exists in the edge portion of the display screen 10, the receiving signal has the rise and fall certainly. Since the process operation on the side of the light send/receive unit 1b having the light receiving element 13b is the same as that on the side of the light send/receive unit 1a having the light receiving element 13a, the description thereof is omitted.

Moreover, when the canopy-shaped shielding body 51 described in the fourth embodiment is provided, an effect such that a component of a irregularly reflected light from the recurrence reflection sheet 7 is reduced, and an effect such that entrance of a reflected light of disturbance light into the light receiving elements 13a and 13b is reduced can be expected.

Fifth Embodiment

Figure 24:
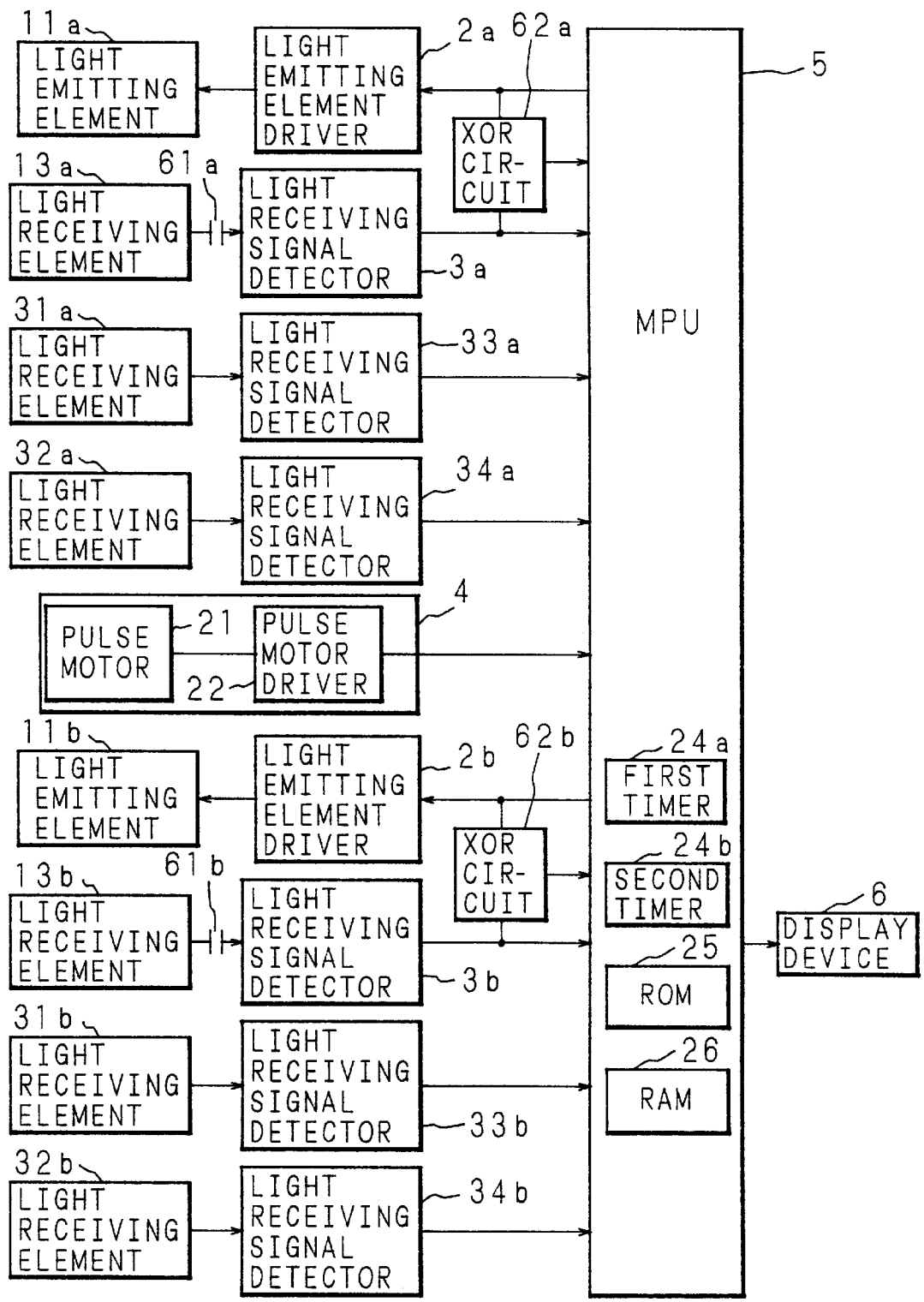
FIG. 24 is a block diagram of an optical scanning-type touch panel (fifth embodiment) of the present invention.

FIG. 24 is a block diagram of the optical scanning-type touch panel according to the fifth embodiment of the present invention. In FIG. 24, The same parts as FIGS. 6 and 16 are represented by the same reference numerals and the description thereof is omitted. AC couplings 61a and 61b are provided between the light receiving element 13 and the light receiving signal detector 3a and between the light receiving element 13b and the light receiving signal detector 3b. Moreover, XOR (exclusive OR) circuits 62a and 62b are provided between the light emitting element driver 2a and the light receiving signal detector 3a and between the light emitting element driver 2b and the light receiving signal detector 3b.

In the fifth embodiment, since receiving signals of the reflected lights detected in the light receiving elements 13a and 13b are AC-coupled so that a fixed light component is eliminated, a constitution which is strong against disturbance noises can be realized. Moreover, since XOR (exclusive OR) of a light emitting pulse signal and a receiving signal of a reflected light is taken, a receiving pulse signal only of the cut-off region can be detected, and this pulse signal is counted so that the cut-off time can be measured.

FIGS. 25A–25E are timing charts for explaining the operation of the fifth embodiment, FIG. 25A represents a receiving signal of the light receiving signal detector 33a representing a received light amount of the light receiving element 31a for detecting timing positioned on the upper stream side of the scanning direction, FIG. 25B represents a receiving signal of the light receiving signal detector 34a representing a received light amount of the light receiving element 32a for detecting a timing positioned on the lower stream side of the scanning direction, FIG. 25C represents light emitting pulse signal of the light emitting element 11a, FIG. 25D represents a receiving signal of the light receiving signal detector 3a representing a received light amount of the light receiving element 13a, and FIG. 25E represents an output signal of the XOR circuit 62a.

The scanning start timing is detected according to a high level of the receiving signal of the light receiving signal detector 33a and pulse driving is started and a number of its pulses is counted. Moreover, the scanning end timing is detected according to a high level of the receiving signal of the light receiving signal detector 34a and pulse driving is stopped. By counting a number of pulses of the output signal of the XOR circuit 62a, the cut-off region can be measured.

For example, in the case where the display screen 10 is about 40 inches diagonal, the diagonal line is 100 cm. When the resolution on the screen is about 0.5 cm, necessary angular resolution is obtained according to the equation of FIG. 9. The angular resolution at the center of screen is about 5 mrad. Here, in the case where a pentagonal polygon mirror is used, the maximum scanning angle becomes 144°. Therefore, a number of divisions for one scanning is obtained according to the following equation (12).

$$\{(\pi/2)/0.005\} \times (144/90) = 502 \quad (12)$$

The lowest frequency for detection of 200 points for 1 sec. is obtained according to the following equation (13).

$$502 \times 200 = 100400 (Hz) = 100.4 (kHz) \quad (13)$$

If this condition is satisfied, a number of pulses can be cope with the scanning angle in the ratio of 1:1, so the angle detecting process with desired resolution can be simplified.

Figure 27B:
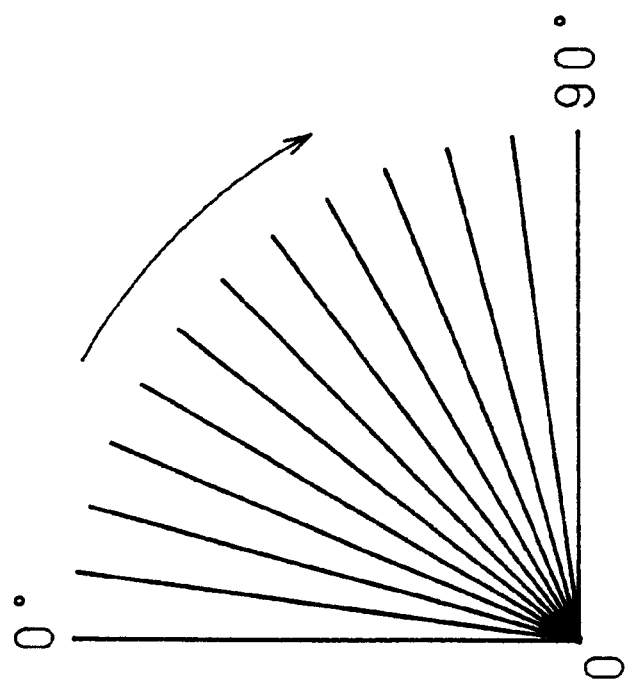
FIGS. 27A and 27B are schematic diagrams showing radiating states of the scanning light.
Figure 27A:
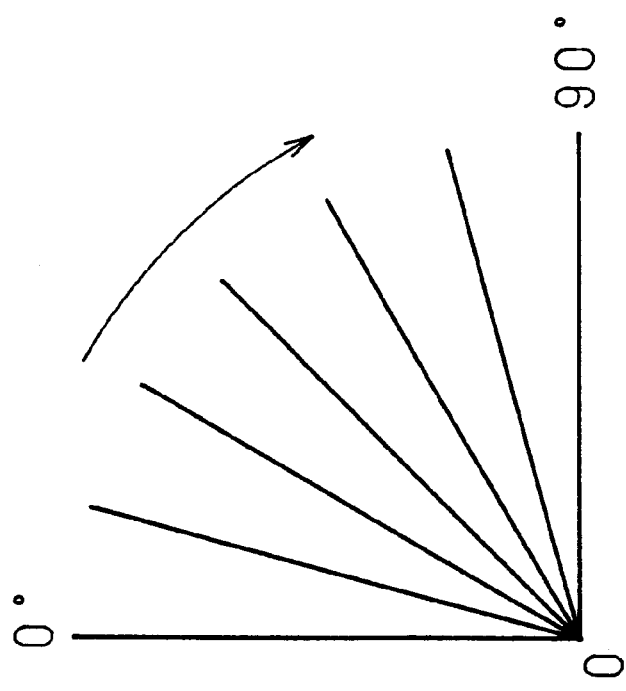

Next, the description is given as to control of pulse emission of the light emitting elements 11a and 11b. When a blank time of a pulse of a driving control signal to be transmitted from the MPU 5 to the light emitting element drivers 2a and 2b is controlled, average radiant energy from the light emitting elements 11a and 11b can be reduced. FIGS. 26A and 26B are timing charts representing a timing signal of the pulse emission, in the example shown in FIG. 26A, the blank time is longer than that in the example shown in FIG. 26B. Moreover, FIGS. 27A and 27B show states that scanning laser beams are radiated in the respective pulse patterns of FIGS. 26A and 26B. When the blank time of the pulse emission is lengthened, a duty ratio is lowered, and thus the average radiant energy can be reduced.

In addition, FIGS. 28A–28C show timing charts of another control example in which the average radiant energy of the pulse emission in the light emitting elements 11a and 11b can be reduced. FIG. 28A shows a timing signal of the pulse emission in the standard state. FIG. 28B is an example that the emission time for once is reduced without changing a period. Moreover, FIG. 28C is an example that the emission strength for once is reduced without changing a period.

Figure 30:
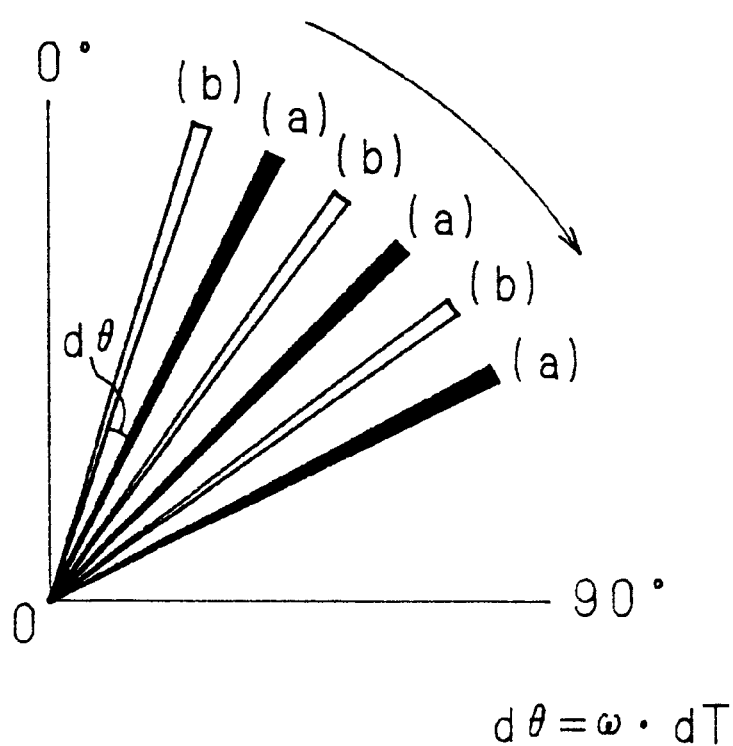
FIG. 30 is a schematic diagram showing the radiating state of the scanning light.

The following describes the control example that a timing at which the pulse emission in the light emitting elements 11a and 11b is started is staggered on reference with the timing charts of FIGS. 29A and 29B. For example, the first laser beam scanning is performed at a timing shown in FIG. 29A, and next laser beam scanning is performed at a timing such that the period is the same but the start timing is delayed from the previous one only by dT as shown in FIG. 29B. FIG. 30 shows synthesized state that the scanning laser beams in the respective pulse patterns of FIGS. 29A and 29B are radiated. Since the radiation is delayed by dT, in the case where the scanning angular velocity by the polygon mirror is ω, the scanning angle which is delayed by dθ=ω·dT can be realized. When such delay of the timing is set, even if the laser beam scanning becomes sparse, a region where the indicator cannot be detected is eliminated and high detecting accuracy can be maintained.

Next, the description will be given as to an example of control in which the frequency of scanning pulse is varied dynamically according to presence/non-presence of the indicator. While the presence of the indicator is not detected within a predetermined time, the frequency of the scanning pulse is reduced to ½ with the emission time being maintained constant. Meanwhile, when the indicator is detected, the frequency of the scanning pulse is increased twice with the emission time being kept constant. When this control is repeated, a duty ratio of emission is decreased to ½ and increased twice according to the presence/non-presence of the indicator. However, the minimum frequency of the scanning pulse is 6.25 kHz corresponding to the minimum resolution of 8 cm, and the maximum frequency is 200 kHz corresponding to the minimum resolution of 0.25 cm. The frequency of the scanning pulse is set not to exceed the minimum frequency and maximum frequency.

Figure 31:
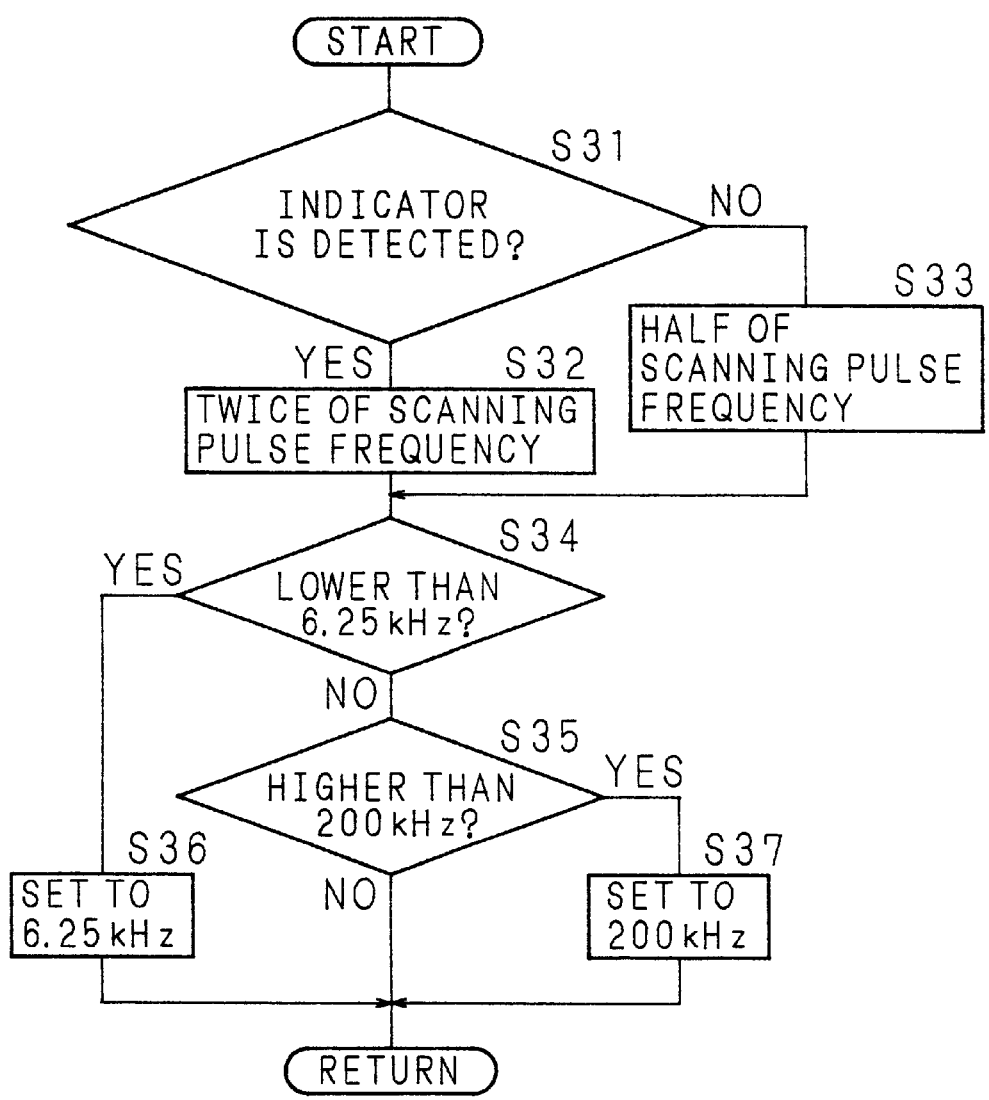
FIG. 31 is a flow chart showing algorithm for controlling a frequency of a scanning pulse.

FIG. 31 is a flow chart showing algorithm for controlling the frequency of the scanning pulse. First, a judgment is made as to whether or not the indicator is detected within a predetermined time (S31). When the indicator is detected ("YES" at S31), the frequency of the current scanning pulse is increased twice with the emission time being kept constant (S32), and the sequence goes to S34. Meanwhile, when the indicator is not detected ("NO" at S31), the frequency of the current scanning pulse is decreased to ½ with the emission time being kept constant (S33), and the sequence goes to S34. A judgment is made as to whether or not the frequency after the change is lower than 6.25 kHz (S34). When the frequency is lower than 6.25 kHz ("YES" at S34), the frequency is set to 6.25 kHz (S36) and the sequence is returned. When the frequency is not less than 6.25 kHz ("NO" at S34), a judgment is made as to whether or not the frequency after the change is higher than 200 kHz (S35). When the frequency is higher than 200 kHz ("YES" at S35), the frequency is set to 200 kHz (S37), and the sequence is returned. When the frequency is not more than 200 kHz ("N0" at S35), the sequence is directly returned.

By the aforementioned control of the pulse emission in the light emitting elements 11a and 11b, required detection resolution can be achieved and the low power consumption can be realized in the optical scanning-type touch panel of the present invention.

The common constitution of the aforementioned embodiments is that the light send/receive units 1a and 1b are arranged along the short side of the display screen 10 at a certain interval. The reason for this is described below.

It is generally known that in a triangulation as a reference line for a measurement is longer, the accuracy is improved. However, it is true that in the case where an object to be measured is extremely far or extremely close, an error becomes large. In the case where an object to be measured is extremely far, the accuracy is improved by enlarging the reference line, and on the contrary in the case where an object to be measured is extremely close, the accuracy is improved by shortening the reference line. In the optical scanning-type touch panel of the present invention, in view of such a defect of the triangulation, the reference line connecting the light send/receive units 1a and 1b is separated from the side of the display screen 10 to some degree, and since it is not necessary to make a measurement on a position farther than the display screen 10, the light send/receive units 1a and 1b are arranged along the short side of the display screen 10 in order to improve the accuracy of measurement on the closer position.

A distance d between the reference line connecting the light send/receive units 1a and 1b and one side of the display screen 10 (the short side of the display screen 10 in the present example) is set so that the following equation (14) is satisfied.

$$d\theta \leq 4\delta d(1/(L^2+2\delta L)) \quad (14)$$

Here, $d\theta$: accuracy of measurement $\delta$: detecting accuracy (5 mm in the present example)

L: reference line length (distance between both the light send/receive units)

When d in the equation (14) is changed, the following equation (15) holds.

$$d \geq d\theta \times L^2/4\delta \quad (15)$$

In the optical scanning-type touch panel of the present invention, the detecting accuracy $\delta$ is about 5 mm, the reference line length L is about 500 mm, and the accuracy of measurement $d\theta$ is determined by a scanning angular velocity $\omega$ and a clock obtained by AD-converting the receiving signal ($d\theta = \omega \cdot dT$) so as to be about 2.5 milliradian in the scanning angle. As a result, the suitable value of d is about 10 mm. However, needless to say, this value depends on the size of the display screen 10, the spreading angle of a beam, in other words, what degree of the accuracy of measurement is required.

As mentioned above, in the optical scanning-type touch panel of the present invention, a reflecting efficiency is improved by providing the sawtooth-shaped portions 7a and 7b on the portions which are far from the light send/receive units 1a and 1b and where the angle at which the projected light enters the recurrence reflection sheet 7 becomes small. However, the distance from both the light send/receive units 1a and 1b to the recurrence reflection sheet 7 is not constant, and the recurrence reflection sheet 7 has the aforementioned sawtooth-shaped portions 7a and 7b and a bent portion. For these reasons, a received light amount of the light receiving elements 13a and 13b does not become constant. However, it is desirable for the subsequent signal process that a received light amount of the light receiving elements 13a and 13b is as constant as possible, and this is preferable from a viewpoint of decreasing a power consumption.

In view of these points, the description will be given as to a configuration which makes a received light amount of the light receiving elements 13a and 13b constant.

Figure 32:
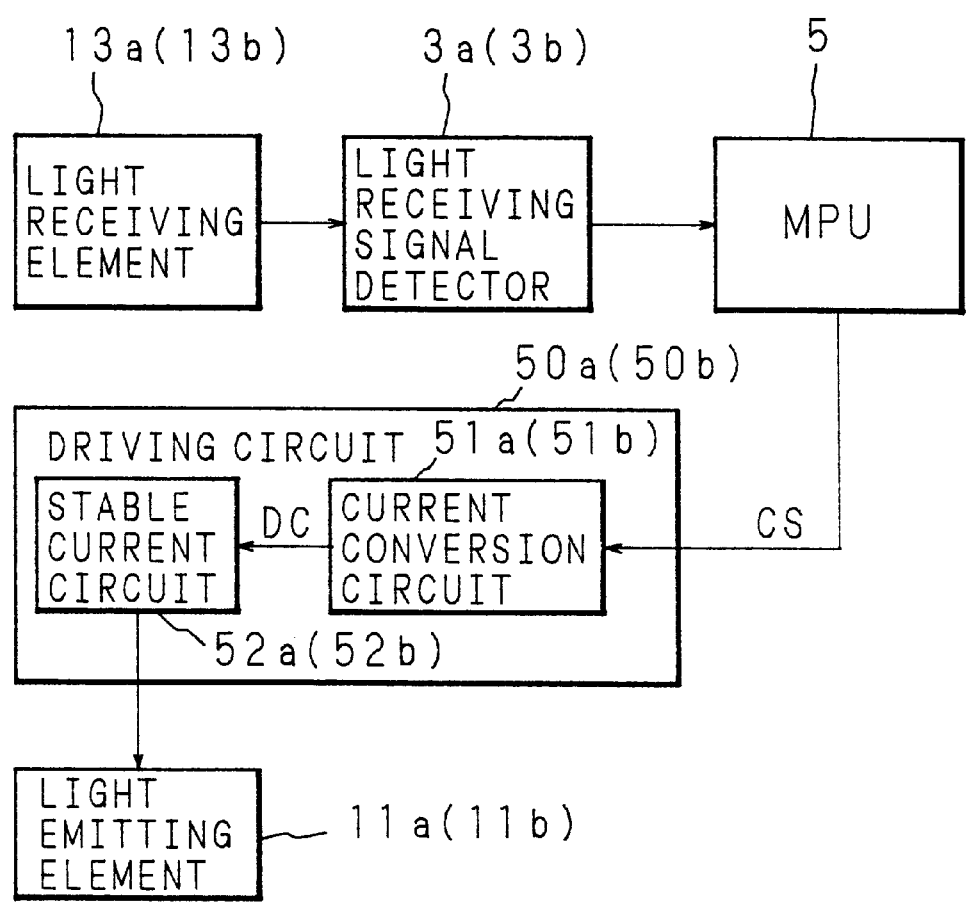
FIG. 32 is a block diagram showing an example of a constitution for controlling a received light amount uniformly.

FIG. 32 is a block diagram showing an example of the constitution for controlling the emission strength from the light emitting element 11a (11b) in order to control a received light amount of the light receiving element 13a (13b) to be constant. More specifically, the emission strength from the light emitting element 11a (11b) is set to be small at the scanning angle at which a reflected light amount is large, and set to be large at the scanning angle at which a reflected light amount is small.

In FIG. 32, a signal which accords with an amount of the reflected light received by the light receiving element 13a (13b) is converted into a digital signal by the light receiving signal detector 3a (3b) to be inputted to the MPU 5. The MPU 5 compares the value of the digital signal inputted from the light receiving signal detector 3a (3b) with a threshold value previously set, and when the value of the digital signal inputted from the light receiving signal detector 3a (3b) is larger than the threshold value, the MPU 5 outputs a control signal CS which decreases the emission strength of the light emitting element 11a (11b), whereas when the value of the digital signal inputted from the light receiving signal detector 3a (3b) is smaller than the threshold value, outputs a control signal CS which increases the emission strength of the light emitting element 11a (11b). Since the control signal CS outputted from the MPU 5 is a digital signal, it is converted into an analog driving signal DC by a current conversion circuit 51a (51b) and the analog driving signal DC is supplied to a stable current circuit 52a (52b) to be stable therein, and the light emitting element 11a (11b) emits a light. The current conversion circuit 51a (51b) and stable current circuit 52a (52b) compose a driving circuit 50a (50b) of the light emitting element 11a (11b).

As mentioned above, the MPU 5 always controls the emission strength of the light emitting element 11a (11b) so that a received light amount of the light receiving element 13a (13b) obtain a prescribed value.

Figure 33:
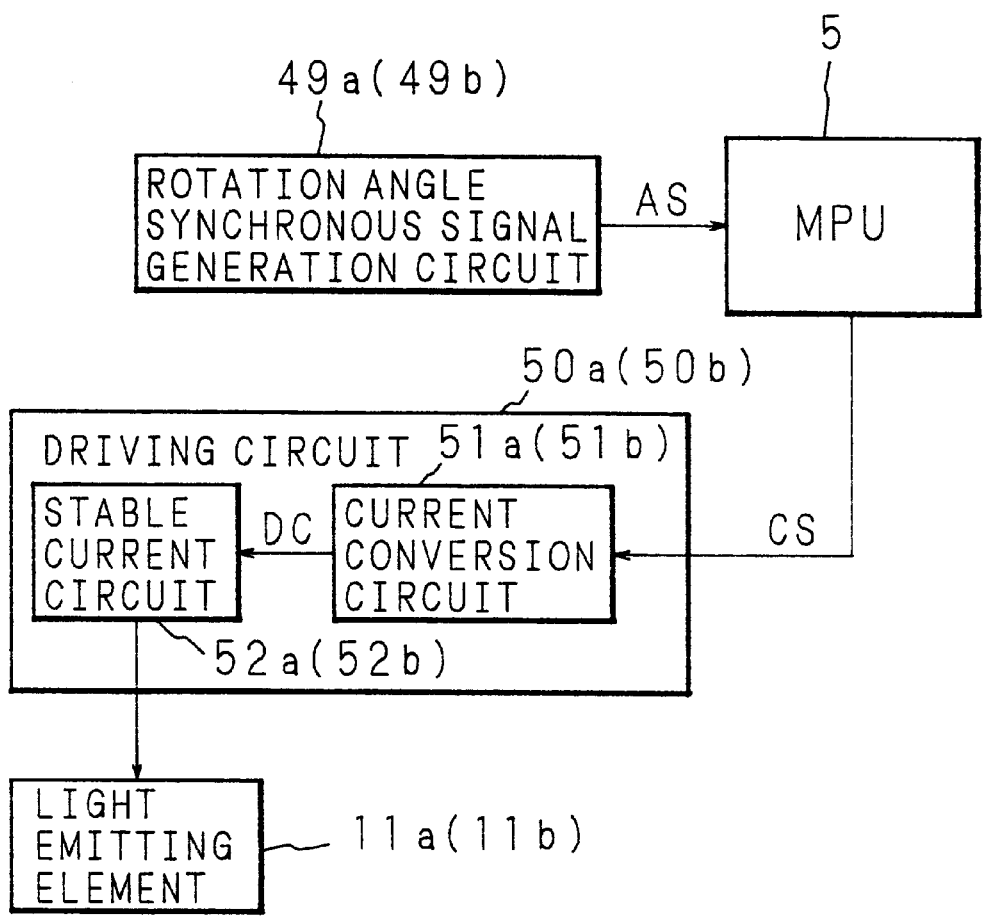
FIG. 33 is a block diagram showing an example of the constitution for controlling a received light amount uniformly.

FIG. 33 is a block diagram showing another example of the constitution which controls the emission strength of the light emitting element 11a (11b). In this example of the constitution, the MPU 5 outputs a control signal CS to control the driving circuit 50a (50b), and thus controls the emission strength of the light emitting element 11a (11b). This is the same as the aforementioned example. However, although a received light amount in the light receiving signal detector 3a (3b) is monitored and feedback control is made in the aforementioned example of the constitution, the light emission strength of the light emitting element 11a (11b) is controlled according to a rotation angle synchronous signal AS generated by a rotation angle synchronous signal generation circuit 49a (49b) of the polygon mirror 16a (16b) in this example of the constitution.

Figure 34:
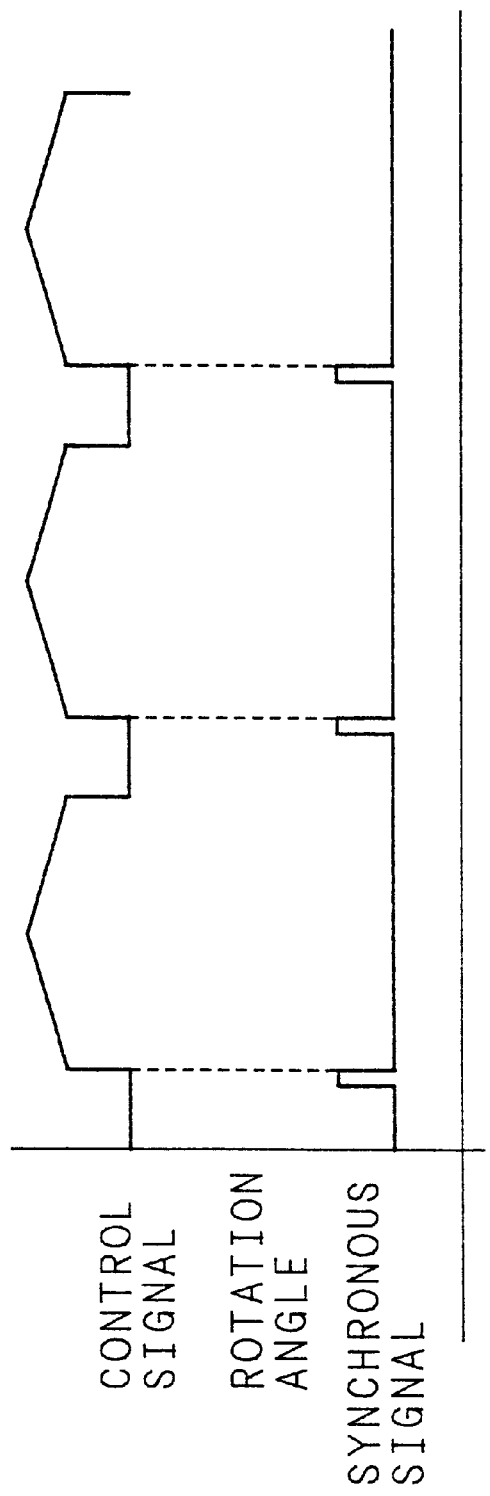
FIG. 34 is a timing chart when a received light amount is controlled uniformly.

More specifically, the MPU 5 reads the rotation angle synchronous signal AS generated by the rotation angle synchronous signal generation circuit 49a (49b) as shown in the timing chart of FIG. 34. The MPU 5 outputs the control signal CS which increases the emission strength of the light emitting element 11a (11b) during a period of an angle at which a portion far from the light send/receive units 1a and 1b is scanned. The MPU 5 outputs the control signal CS which decreases the emission strength of the light emitting element 11a (11b) during a period of an angle at which a portion close to the light send/receive units 1a and 1b is scanned. According to such control by the MPU 5, the emission strength of the light emitting element 11a (11b) is controlled so that a light emitting amount of the light receiving element 13a (13b) obtains a substantially constant value.

Figure 35:
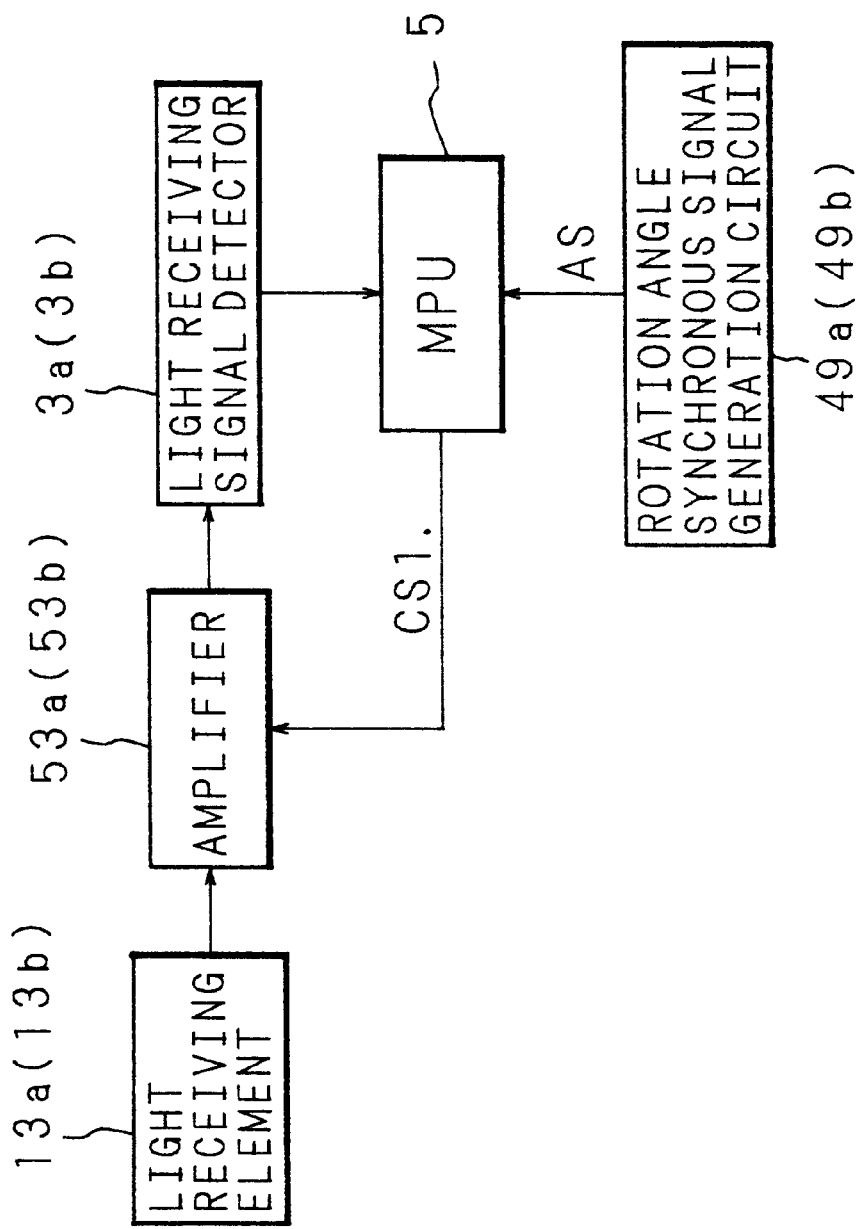
FIG. 35 is a block diagram showing an example of the constitution for controlling a received light amount uniformly.

Instead of the above-mentioned constitution for controlling the emission strength of the light emitting element 11a (11b), a constitution for amplifying a light receiving amount of the light receiving element 13a (13b) is possible. FIG. 35 is a block diagram showing an example of the constitution in this case.

In this example of the constitution, a signal (analog signal) of a received light amount of the light receiving element 13a (13b) is amplified by an amplifier 53a (53b) to be supplied to the light receiving signal detector 3a (3b). Here, an amplification factor of the amplifier 53a (53b) can be controlled by supplying a control signal CS1 from the MPU 5. Moreover, a rotation angle synchronous signal SA generated by the rotation angle synchronous signal generation circuit 49a (49b) is also supplied to the MPU 5.

In such a constitution, similarly to the constitution shown in FIG. 34, the MPU 5 reads the rotation angle synchronous signal AS generated by the rotation angle synchronous signal generation circuit 49a (49b). The MPU 5 outputs a control signal CS1 which increases the amplification factor of the amplifier 53a (53b) during a period of an angle at which a portion far from the light send/receive units 1a and 1b is scanned, and the MPU 5 outputs a control signal CS1 which decreases the amplification factor of the amplifier 53a (53b) during a period of an angle at which a portion close to the light send/receive units 1a and 1b is scanned. According to such control by the MPU 5, the level of the light receiving signal inputted to the light receiving signal detector 3a (3b) obtains a substantially constant value.

In the above-mentioned example of the constitution shown in FIGS. 33 and 35, the emission strength of the light emitting element 11a (11b) or the amplification factor of the amplifier 53a (53b) is controlled by using the comparatively simple pattern shown in FIG. 34, but an actual reflected light amount of the light receiving element 13a (13b) is monitored in the state that the indicator S does not exist on the display screen 10, correspondence of the reflected light amount with the rotation angle of the polygon mirror 16a (16b) is patterned to be stored previously, and the stored pattern is compared with an actual received light amount of the light receiving element 13a (13b) so that the indicator S may be detected by obtaining information about this difference.

Figure 36:
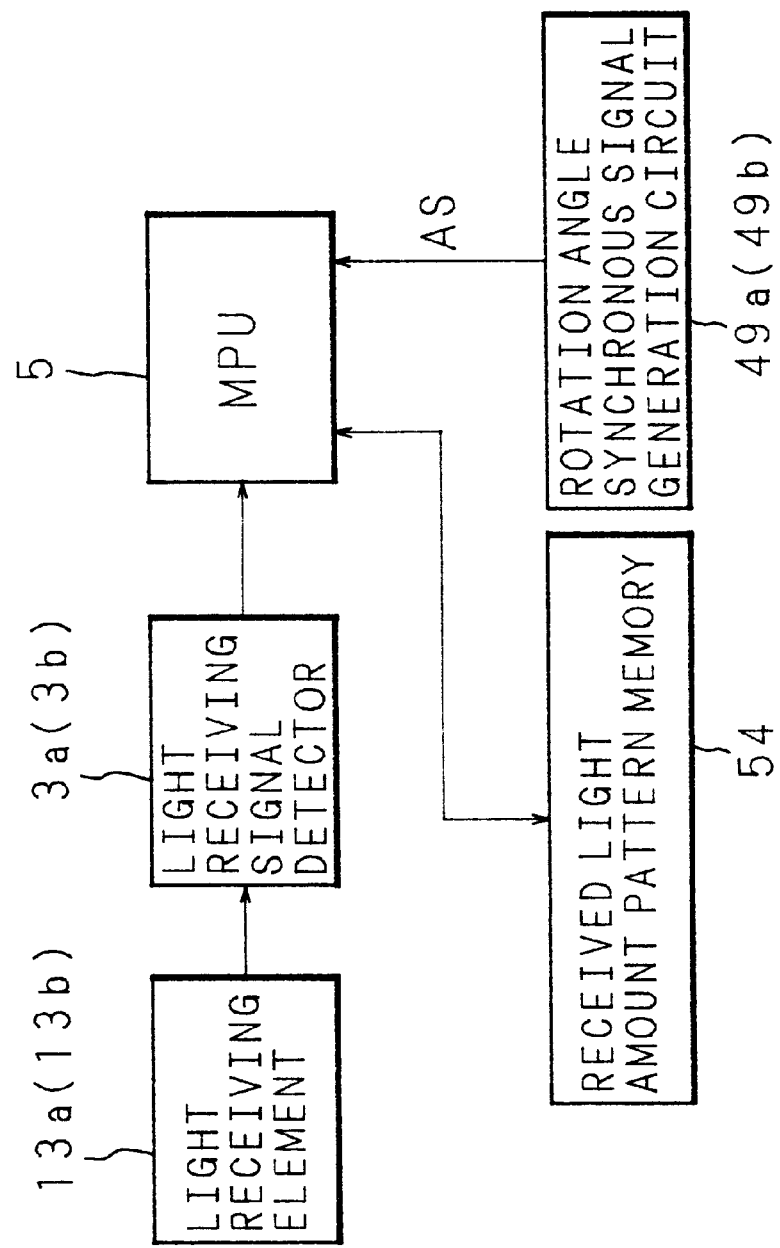
FIG. 36 is a block diagram showing an example of a constitution for comparing a received light amount with a monitored result.

FIG. 36 is a block diagram showing an example of such a constitution. In FIG. 36, a received light amount of the light receiving element 13a (13b) is converted into a digital signal by the light receiving signal detector 3a (3b). The MPU 5 synchronizes the converted result by the light receiving signal detector 3a (3b) with the rotation angle synchronous signal AS generated by the rotation angle synchronous signal generation circuit 49a (49b) and stores it into a received light amount pattern memory 54. As the received light amount pattern memory 54, the RAM 26 shown in FIG. 6 may be used. In such a constitution, on a basis of the rotation angle synchronous signal AS generated by the rotation angle synchronous signal generation circuit 49a (49b), digital data of a received light amount during one scanning of the light receiving element 13a (13b) are obtained as the received light amount pattern, and the obtained received light amount pattern is stored in the received light amount pattern memory 54. Therefore, in the state that the indicator S does not exist on the display screen 10, such as the case where the power source of the optical scanning-type touch panel of the present invention is turned on, the received light amount pattern is stored in the received light amount pattern memory 54, and a received light amount of the light receiving element 13a (13b) thereafter is compared with the data digitized in the light receiving signal detector 3a (3b) so that a difference is detected. As a result, the presence of the indicator S can be detected.

Figure 37:
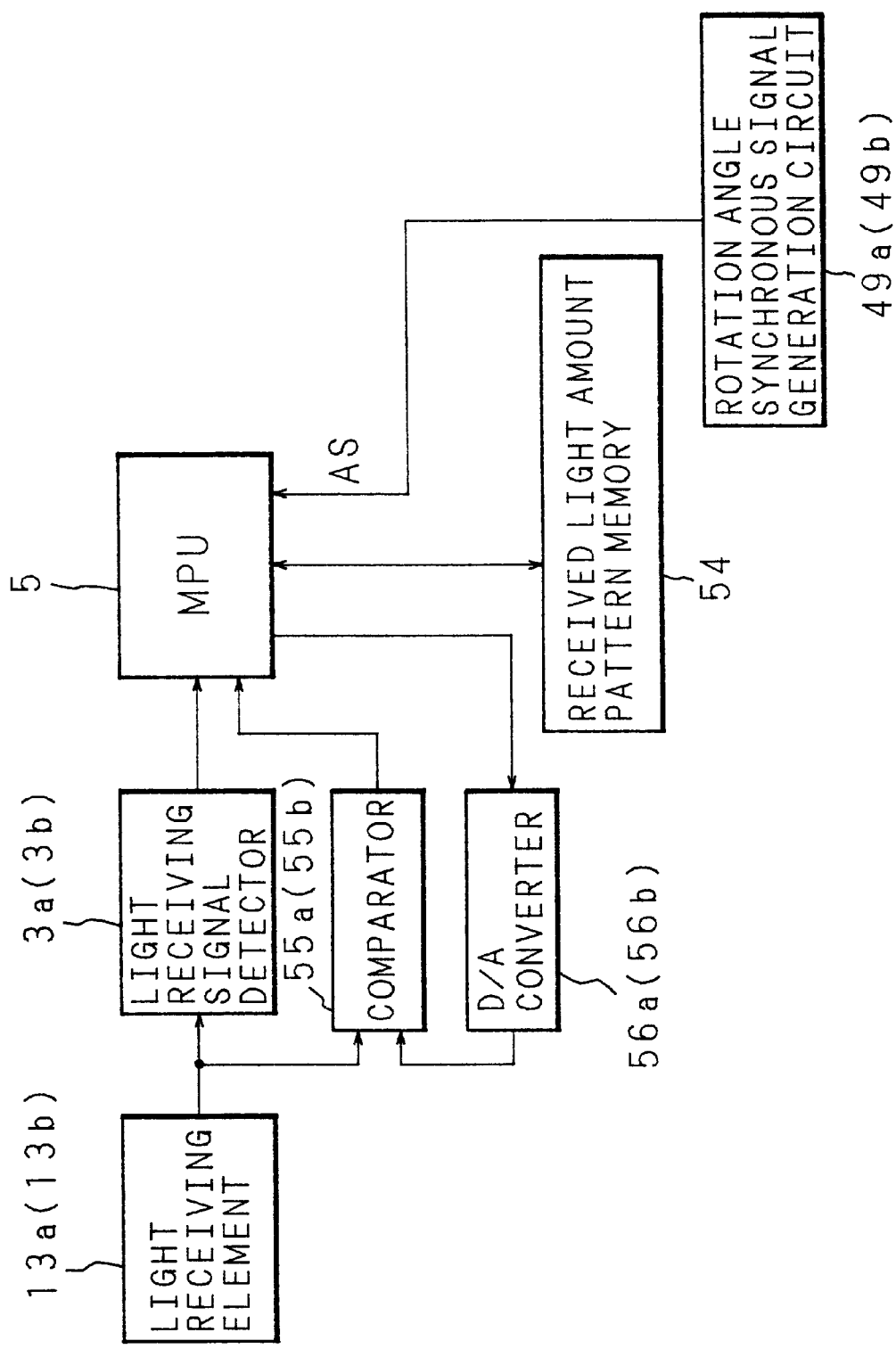
FIG. 37 is a block diagram showing an example of a constitution for comparing a received light amount with a monitored result.

Further, a constitution shown in FIG. 37 can be adopted. In the example of the constitution, similarly to the above-mentioned example, in the state that the indicator S does not exist on the display screen 10 such as the case where the power source of the optical scanning-type touch panel of the present invention is turned on, the received light amount pattern is stored in the received light amount pattern memory 54. A received light amount thereafter of the light receiving element 13a (13b) is given to a comparator 55a (55b), and the MPU 5 converts data of the received light amount pattern stored in the received light amount pattern memory 54 into an analog signal by means of a D/A converter 56a (56b) to supply the analog signal to the comparator 55a (55b). As a result, the comparator 55a (55b) compares with the light receiving signal from the light receiving element 13a (13b) with the signal, which is obtained by converting the data of the received light amount pattern read from the received light amount pattern memory 54 into the analog signal, and its difference is inputted into the MPU 5.

Therefore, the MPU 5 can detect the presence of the indicator S according to the difference signal supplied from the comparator 55a (55b).

In the optical scanning-type touch panel of the present invention, as mentioned above, there is a scanning angle at which a reflected light amount from the recurrence reflection sheet 7 is small, but this problem can be solved by adopting the aforementioned method of controlling the emission strength of the light emitting elements 11a and 11b. However, due to the problem of safety, the emission strength of the light emitting elements 11a and 11b cannot be occasionally increased. Therefore, the description will be given as to the case where the emission strength of the light emitting elements 11a and 11b is switched between the normal state and the state where the normal emission strength is reduced to about ½.

In addition, as shown in FIG. 2, in the light send/receive unit 1a (1b) of the optical scanning-type touch panel of the present invention, there is a timing where a laser beam projected from the light emitting element 11a (11b) is reflected from the polygon mirror 16a (16b) to enter the light receiving element 13a (13b) directly. Since special means for detecting the start of scanning is not required by utilizing this timing, the cost can be reduced.

More specifically, since the intensity of the scanning light entering the light receiving element 13a (13b) directly is high, two or more comparing means whose comparing levels are different are prepared and an output of the light receiving element 13a (13b) is compared, the output of the compared result from the comparing means whose level is comparatively high is utilized as the scanning start signal. In order to measure the time at which the scanning light is cut off, time measuring means in which the scanning start signal is used as a start trigger of the time measurement is provided. In another method, the output of the light receiving element 13a (13b) is compared, and the time measurement is started according to the output of the compared result from the comparing means whose level is comparatively low.

Since a change in the scanning speed causes an error, to eliminate this is an important problem. In order to eliminate an influence of the change in the scanning speed, means for measuring an interval of the scanning start signal is provided, and the cut-off time of the scanning light is corrected on the basis of the measured interval so that an error is eliminated.

Figure 38:
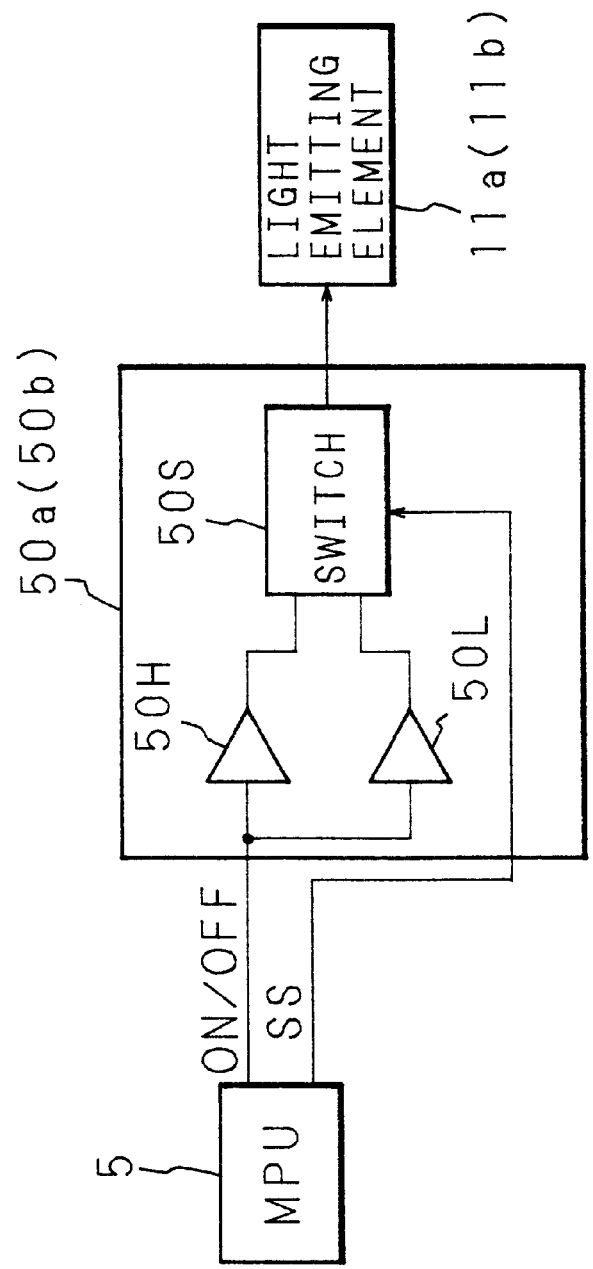
FIG. 38 is a block diagram showing a configuration of a driver of the light emitting element.

More concrete explanation will be given below. FIG. 38 shows a block diagram showing the configuration of the driving circuit 50a (50b) of the light emitting element 11a (11b). The driving circuit 50a (50b) is composed of a driver 50H for high-level driving, a driver 50L for low-level driving and a switch 50S. An ON/OFF signal from the MPU 5 is supplied to the drivers 50H and SOL, and a emission strength switching signal SS is supplied to the switch 50S. According to this constitution, the ON/OFF operation of a driving current in the light emitting element 11a (11b) and two-step switching of the emission strength are controlled. The constitution shown in FIG. 38 can be realized by a known circuit.

Figure 39A:
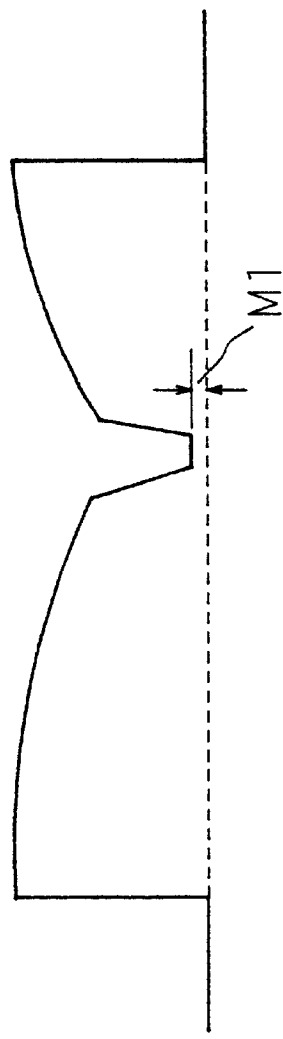
FIGS. 39A and 39B are waveform charts for explaining examples of increase in margin (improvement in S/N ratio) due to a change in light emission strength.
Figure 39B:
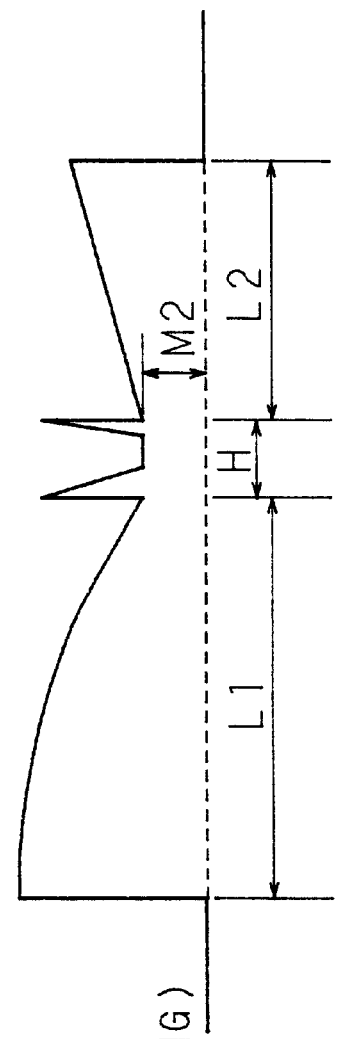

FIGS. 39A and 39B are waveform charts for explaining examples of an increase in a margin (improvement of the S/N ratio) by switching the emission strength. FIG. 39A represents a level of the receiving signal of the light receiving element 13a (13b) in the case where the scanning is always performed with the same emission strength without switching the emission strength of the light emitting element 11a (11b), and FIG. 39B represents a level of the receiving signal of the light receiving element 13a (13b) in the case where the scanning is performed with the emission strength of the light emitting element 11a (11b) being switched in two steps by the aforementioned constitution.

In the case of FIG. 39A where the emission strength is not switched, a reflected light amount from the recurrence reflection sheet 7 is lowered gradually and rises. Here, a portion where the level is lowered greatly at the central portion is a waveform due to the indicator S. Attention should be paid to that the level of the received light signal of the light receiving element 13a (13b) is lowered due to the indicator S, but a margin M1 with respect to the level "0" is extremely small (the S/N ratio is deteriorated).

Meanwhile, in the case of FIG. 39B where the emission strength is switched, similarly to FIG. 39A a reflected light amount from the recurrence reflection sheet 7 is lowered gradually and rises, but a section represented by L1 up to a portion where the reflected light amount is lowered most is scanned by the driver 50L for low-level driving, a section represented by H where the reflected light amount is lowered most is scanned by the driver 50H for high-level driving, and a section represented by L2 is scanned by the driver 50L for low-level driving. Therefore, in the case where the indicator S exists in the section represented by H where the reflected light amount is lowered most but which is scanned by the driver 50H for high-level driving, the level is lowered to the substantially same degree as FIG. 39A in high level of the received light signal scanned by the driver 50H for high-level driving. However, attention should be paid to that a margin M2 with respect to the level "0" when the level of the received light signal is lowered due to the indicator S is considerably large in comparison with the case of FIG. 39A (the S/N ratio is excellent).

Figure 40:
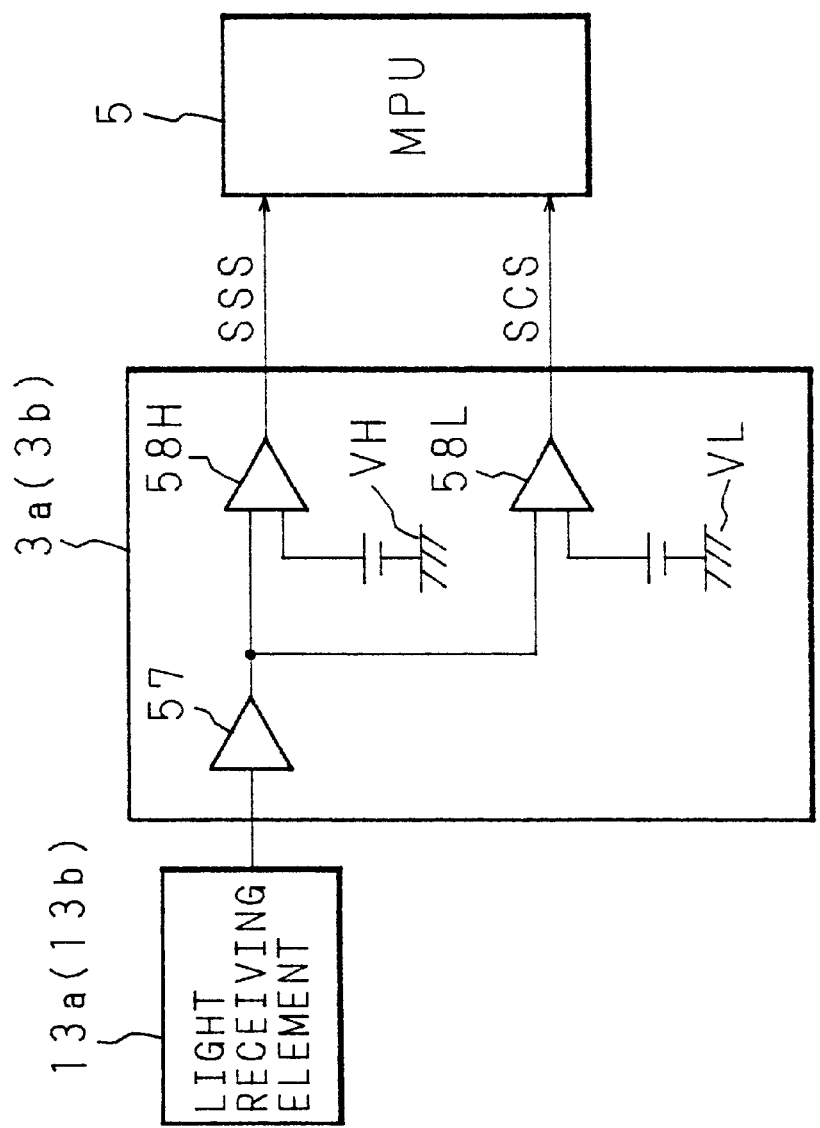
FIG. 40 is a block diagram showing an example of a constitution of a light receiving signal detector.

FIG. 40 is a block diagram showing an example of the constitution of the light receiving signal detector 3a (3b). After the light receiving signal from the light receiving element 13a (13b) is amplified by an amplifier 57 of the light receiving signal detector 3a (3b), the amplified signal is supplied to two comparators 58H and 58L. These comparators 58H and 58L have different comparing criteria. The comparator 58H has a comparatively high reference voltage VH, and its output is supplied to MPU 5 as a scanning start signal SSS. Meanwhile, the comparator 58H has a comparatively low reference voltage VL, and its output is supplied to the MPU as a scanning cut-off detecting signal SCS.

Figure 41:
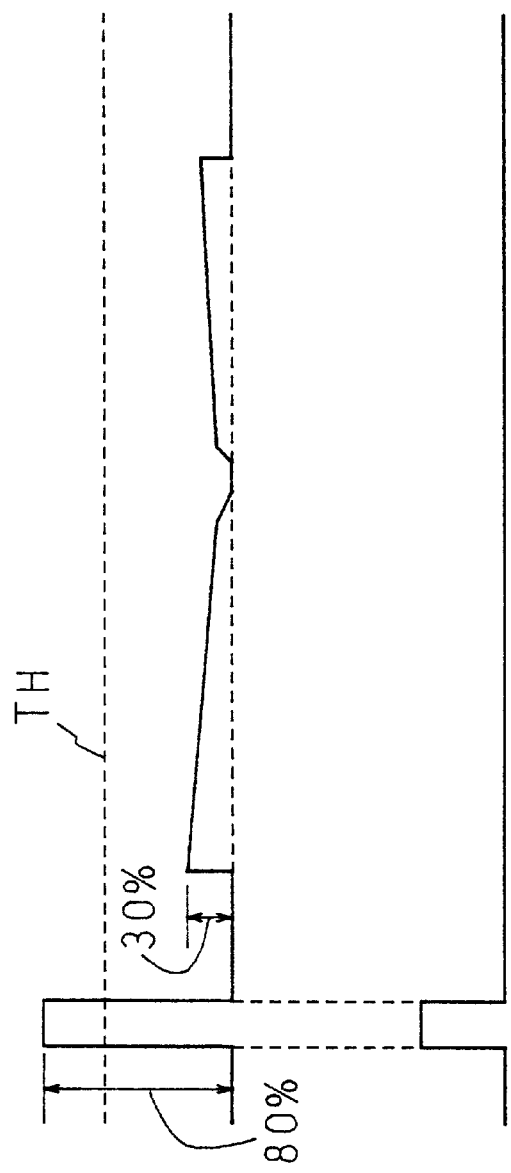
FIGS. 41A and 41B are timing charts of the light receiving signal level.

As mentioned above and as shown in FIG. 2, in the optical scanning-type touch panel of the present invention, the arrangement of the light send/receive units 1a and 1b provides a timing at which the respective scanning lights enter directly to the light receiving elements 13a and 13b without going through the recurrence reflection sheet 7 at the time of starting the scanning, Therefore, as shown in the timing chart of the level of the light receiving signal in FIG. 41A, when the optical scanning is performed by rotating the polygon mirrors 16a and 16b, an incident light amount in the case where the scanning lights are reflected by the polygon mirrors 16a and 16b to enter directly the light receiving elements 13a and 13b is almost 80% of the projected light amount from the light emitting elements 11a and 11b.

On the contrary, as shown in FIG. 41(A), in the case where the scanning lights are once reflected by the recurrence reflection sheet 7 to enter the light receiving elements 13a and 13b, the incident light amount is almost 30% of the projected light amount from the light emitting elements 11a and 11b. From these view points, when the reference voltage VH in the comparator 58H is set to a value between 80% and 30% of the projected light amount from the light emitting elements 11a and 11b, a threshold value TH shown in FIG. 41A is set. For this reason, when a portion where the level is higher than the threshold value TH is detected, as shown in FIG. 41B, the projected lights from the light emitting elements 11a and 11b are reflected by the polygon mirrors 16a and 16b, and the directly reflected lights can be obtained as the scanning start signal.

Figure 42:
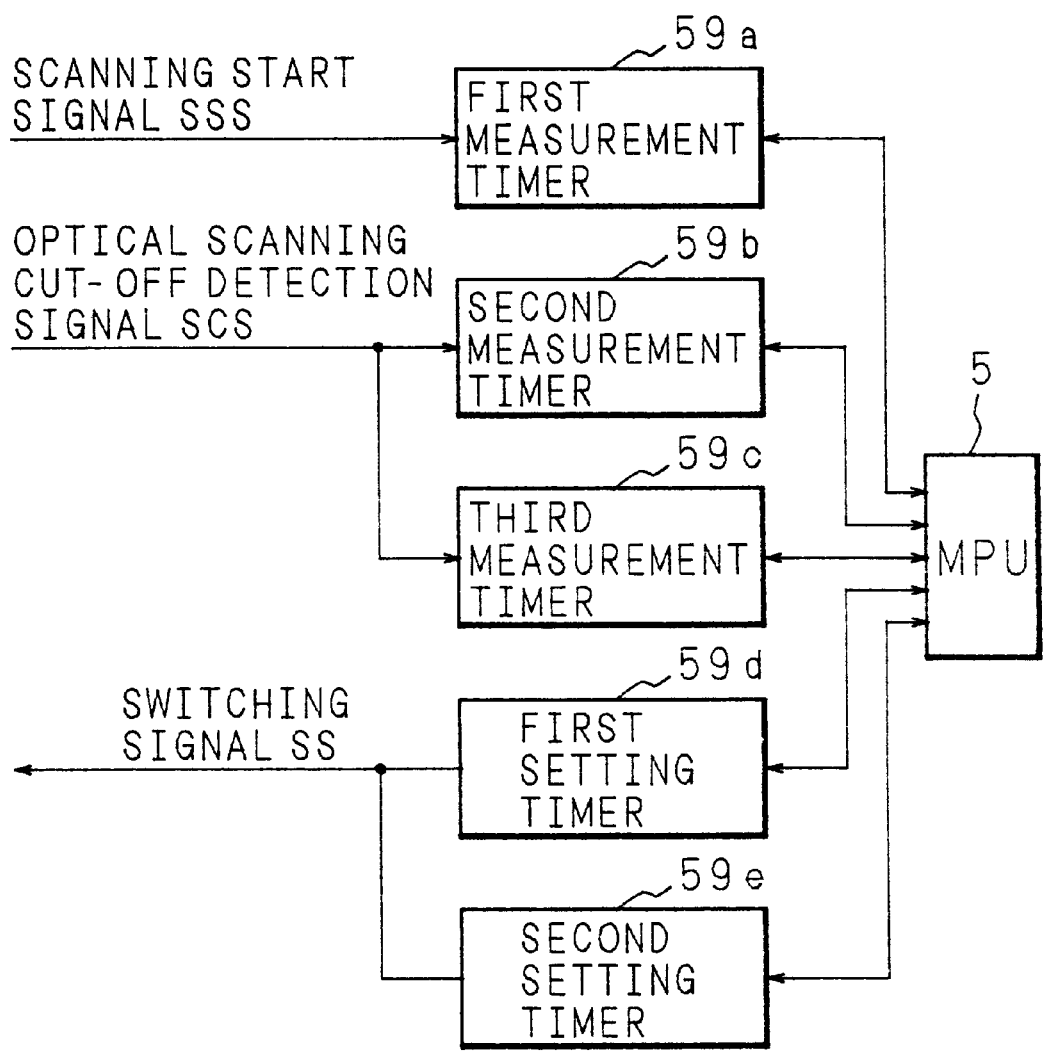
FIG. 42 is a block diagram showing an example of a constitution a time set/time measuring section of an optical scanning shielding time measuring system.

FIG. 42 is a block diagram of an example of the constitution of a time set/time measuring section of one scanning cut-off time measuring system. In this example, three timers for time measurement (first measurement timer 59a, second measurement timer 59b, third measurement timer 59c) and two timers for setting time (first setting timer 59d, second setting timer 59e) are provided, and the MPU 5 makes control such as reading the measuring time and setting time on the respective timers.

The scanning start signal SSS is inputted to the first measurement timer 59a, and interval time of the scanning start signal SSS is measured therein. The optical scanning cut-off detection signal SCS is inputted to the second measurement timer 59b and the third measurement timer 59c, and non-cut-off time and cut-off time are measured therein. The outputs of the first setting timer 59d and second setting timer 59e are, as shown in FIG. 38, supplied to the driving circuit 50a (50b) to become the emission strength switching signal SS.

FIGS. 43A–43C are timing charts showing a time relationship of the timing of one optical scanning. Here, in principle, various measurements are performed by the optical scanning-type touch panel of the present invention by using tx (x=1, 2 . . . ), but tx' or tx" can be substituted.

(1) Scanning Start Period (Measurement: t1)

In order to correct a change in rotation of the polygon mirrors 16a and 16b, i.e., of the motor for rotating them, a period of one optical scanning is measured. One of t1, t1' and t1" may be measured.

t1: time of L-level of the scanning start signal SSS t1': time of one period of the scanning start signal SSS t1": time from start to end of reflection of the scanning light by the recurrence reflection sheet 7

(2) Position of the Indicator S (Measurement: t2)

The time from the start of optical scanning to the position of the indicator S is measured. One of t2 and t2' may be measured.

t2: time from the start of the reflection of the scanning light by the recurrence reflection sheet 7 to the position of the indicator S t2': time from the scanning start signal SSS to the position of the indicator S (3) Width of the Indicator S (Measurement: t3)

The time of the width of the indicator S is measured. One of t3, t3' and t3" may be measured.

t3: time for which the scanning light is shielded by the indicator S t3': time from the start of the reflection of the scanning light by the recurrence reflection sheet 7 to the end of the light shielding by the indicator S t3": time from the scanning start signal SSS to the end of the light shielding by the indicator S (4) Laser Power Up (Output: t4)

The time from the start of the scanning to a rise of the power (emission strength) of the scanning light to a high level is measured. One of t4 and t4' may be measured.

t4: time from the start of measurement of the scanning start signal SSS as a trigger to the rise of the power t4': time from the start of measurement of the reflection of the scanning light by the recurrence reflection sheet 7 as a trigger to the rise of the power (5) Laser Power Down (Output: t5)

The time from the rise of the power (emission strength) of the scanning light to a high level to a fall to a low level is measured. One of t5, t5' and t5" may be measured.

t5: time from the start of measurement of the t4 end time as a trigger to the fall of the power t5': time from the start of measurement of the start of reflection of the scanning light by the recurrence reflection sheet 7 as a trigger to the fall of power t5": time from the start of measurement of the scanning start signal SSS as a trigger to the fall of power As for a change in the rotation of the polygon mirrors 16a and 16b, a correction is made by the method shown below.

(1) Time from the Start of Scanning to the Detection of the Indicator S t2(t2')/t1(t1' or t1")×k (k: constant)

(2) Time of the Width of the Indicator S t3((t3'-t2) or (t3"-t2'))/t1 (t1' or t1")×k (k: constant)

As mentioned above, in the optical scanning-type touch panel of the present invention, various time information can be obtained without using special detection means for detecting the start of scanning, and the cut-off region due to the indicator S, a size of the indicator S, etc. can be obtained from the information.

Sixth Embodiment

Figure 44:
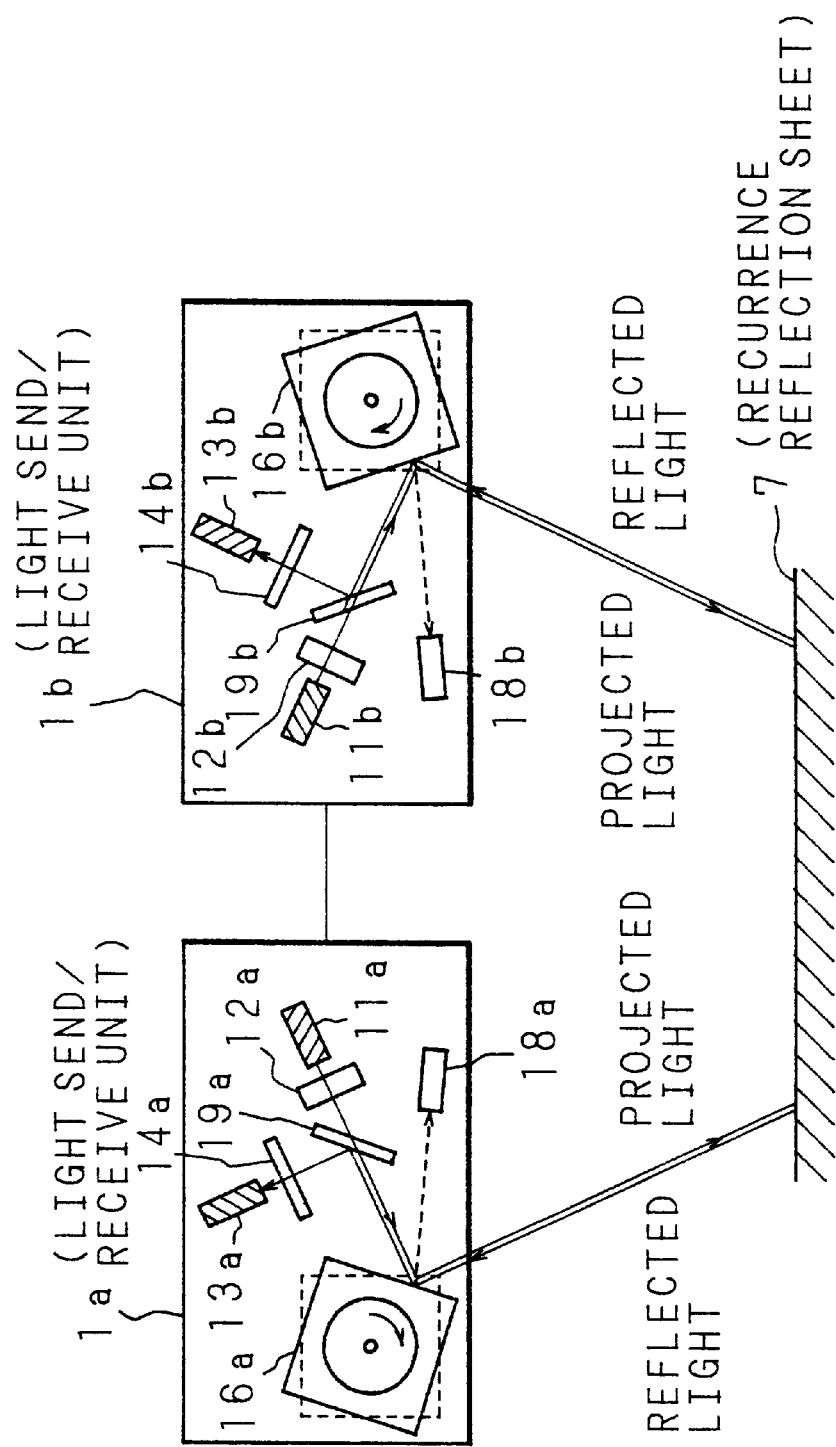
FIG. 44 is a schematic drawing showing an internal constitution and optical path of the light send/receive unit in an optical scanning-type touch panel (sixth embodiment) of the present invention.

FIG. 44 is a schematic diagram showing the internal constitution and optical path of the light send/receive units 1a and 1b in the optical scanning-type touch panel according to the sixth embodiment of the present invention. Here, the whole constitution of the sixth embodiment is the same as that in FIG. 1. Moreover, in FIG. 44, the same parts as FIG. 2 are represented by the same reference numerals.

The reference numerals 19a and 19b are beam splitters for guiding parallel lights from the collimating lenses 12a and 12b to the polygon mirrors 16a and 16b and for guiding the reflected lights from the polygon mirrors 16a and 16b to the light receiving elements 13a and 13b. Moreover, the reference numerals 18a and 18b are light receiving elements for timing detection, they determine a timing of a synchronous signal by receiving scanned laser beams from the polygon mirrors 16a and 16b at the time of the start of one scanning, and are utilized for generating information for correction of the rotating speed of the polygon mirrors 16a and 16b.

The laser beams emitted from the light emitting elements 11a and 11b are made to be parallel lights by the collimating lenses 12a and 12b, and after they pass through openings (aperture) 193a and 193b (see FIG. 47) of the beam splitters 19a and 19b, mentioned later, they are scanned angularly by the rotation of the polygon mirrors 16a and 16b in a plane which is substantially parallel with the display screen 10 to be projected onto the recurrence reflection sheet 7. Then, after the reflected lights from the recurrence reflection sheet 7 are reflected by the polygon mirrors 16a and 16b and beam splitters 19a and 19b, they pass through the visible light cut filters 14a and 14b to enter the light receiving elements 13a and 13b.

The optical path from the light emitting elements 11a and 11b to the polygon mirrors 16a and 16b is the same as the optical path from the polygon mirrors 16a and 16b to the light receiving elements 13a and 13b, and in the case where a light isolator such as a half mirror is arranged in the midway of the optical path, since the lights which are received from the light emitting elements 11a and 11b directly to the light receiving elements 13a and 13b exist, the lights become noises and thus they possibly influence the measured results, but in the sixth embodiment, since the beam splitters 19a and 19b as the light isolator are provided, this does not occur.

In the optical scanning-type touch panel of the sixth embodiment, as for the light send/receive unit 1b, for example, the projected light from the light send/receive unit 1b is scanned from a position where it enters the light receiving element 18b for timing detection through a position where it is shielded by the light shielding member 70 in the counterclockwise direction in FIG. 1, and the projected light reaches the position (Ps) where it is reflected by the point of the recurrence reflection sheet 7 and comes to the scanning start position. The light is reflected by the recurrence reflection sheet 7 until it comes to the position (P1) of the one end of the indicator S, but the light is cut off by the indicator S until it comes to the position (P2) of the other end of the indicator S, and the light is reflected by the recurrence reflection sheet 7 until it comes to the scanning end position (Pe).

Figure 45:
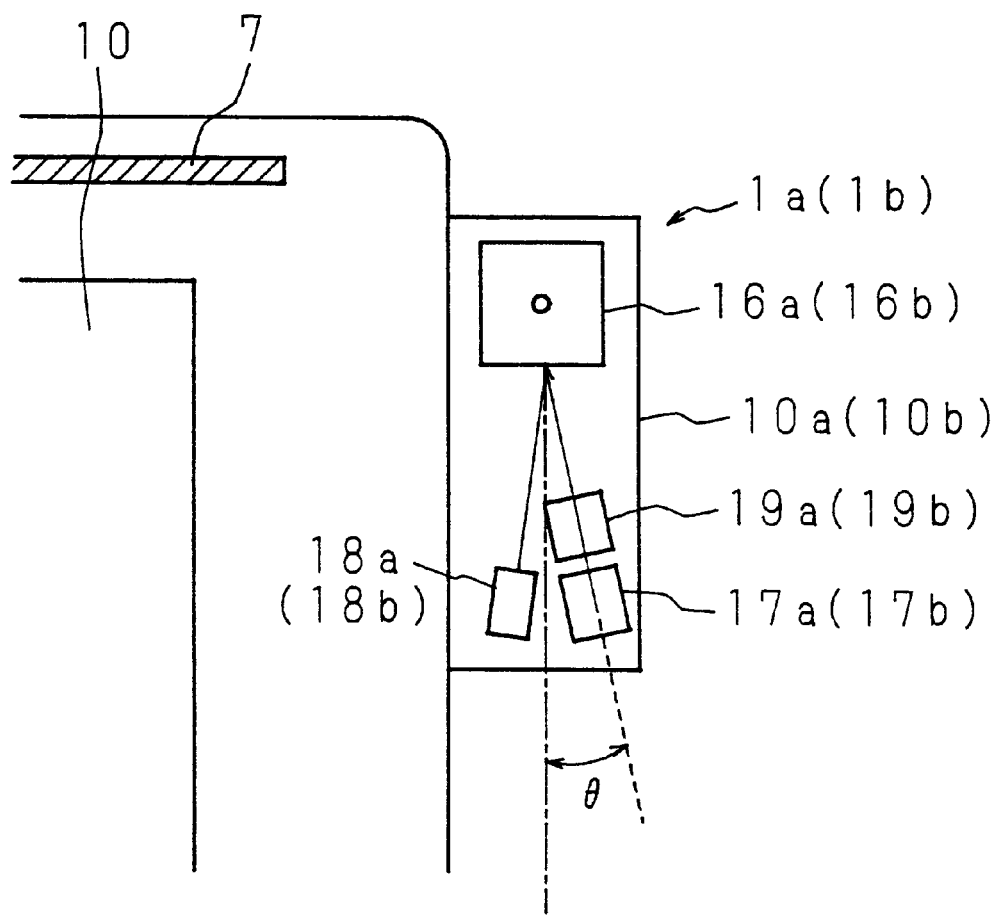
FIG. 45 is a schematic plane view showing an example of a constitution of the light send/receive unit.
Figure 46:
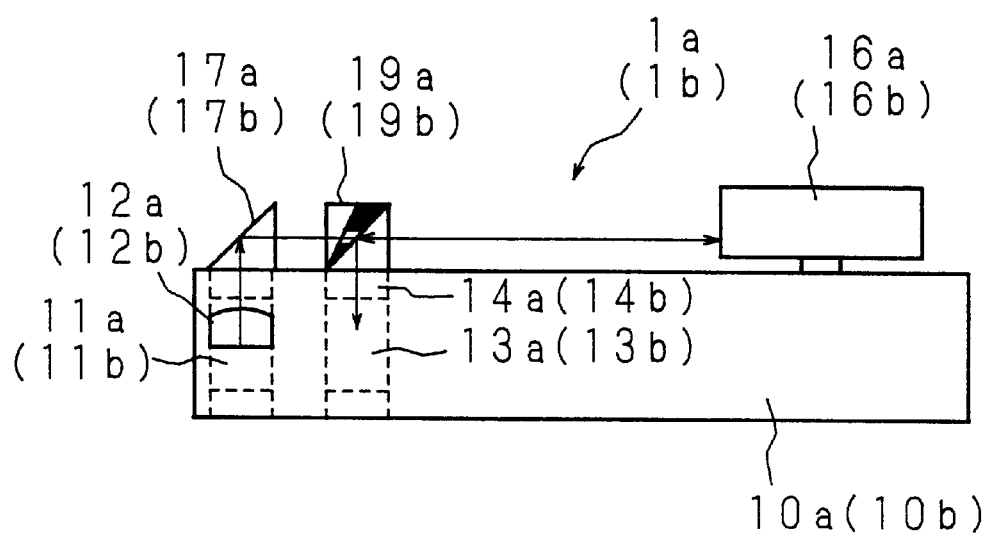
FIG. 46 is a schematic side view showing an example of the constitution of the light send/receive unit.

FIGS. 45 and 46 are a plane view and a side view of the light send/receive unit 1a (1b) in the optical scanning-type touch panel of the sixth embodiment. In FIGS. 45 and 46, the same parts as FIGS. 3 and 4 are represented by the same numerals. The collimating lens 12a (12b) is arranged between the light emitting element 11a (11b) and the prism mirror 17a (17b), and the visible light cut filter 14a (14b) is arranged between the beam splitter 19a (19b) and the light receiving element 13a (13b).

Figure 47:
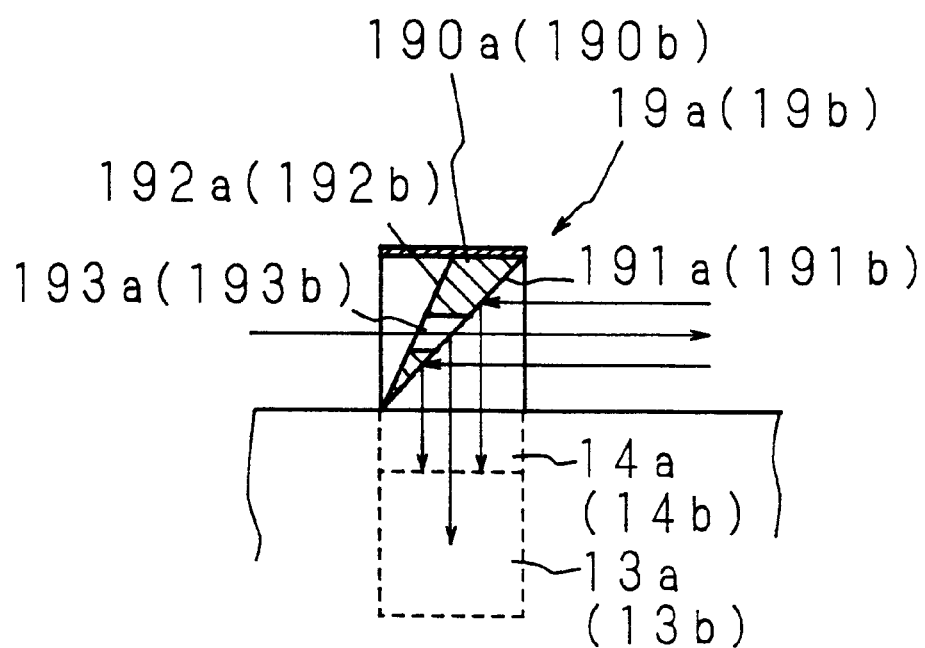
FIG. 47 is a schematic side view showing an example of concrete constitution of a beam splitter.

FIG. 47 is a side view showing a concrete constitution of the beam splitter 19a (19b). A reflector 190a (190b) of the beam splitter 19a (19b) is formed on a V-shaped side cross section so that its reflecting surface 191a (191b) which faces the polygon mirror 16a (16b) (hereinafter, referred to as a main reflecting surface) makes an angle of 45° and its reflecting surface 192a (192b) which faces the prism mirror 17a (17b) (hereinafter, referred to as a sub reflecting surface) makes an angle of other than 45° (about 50° in the example shown in FIG. 47) with respect to the optical path of a laser beam between the prism mirror 17a (17b) and the polygon mirror 16a (16b).

The reflector 190a (190b) has an opening 193a (193b), in the optical path of a laser beam between the prism mirror 17a (17b) and the polygon mirror 16a (16b), which makes an angle of 45° with respect to the main reflecting surface 191a (191b). A diameter of the opening 193a (193b) is about 1 mm in this example.

According to the above constitution of the light send/receive unit 1a (1b), the laser beam emitted from the light emitting element 11a (11b) is made to be parallel light by the collimating lens 12a (12b), and the light is refracted by the prism mirror 17a (17b) and passes through the opening 193a (193b) of the beam splitter 19a (19b) and is reflected by the polygon mirror 16a (16b) to be projected onto the recurrence reflection sheet 7.

A part of the laser beam which does not pass through the opening 193a (193b) is reflected by the sub reflecting surface 192a (192b) of the beam splitter 19a (19b). At this time, since the sub reflecting surface 192a (192b) is positioned at an angle of other than 45° with respect to an optical axis of the laser beam projected from the prism mirror 17a (17b), even if the reflected laser beam from the sub reflecting surface 192a (192b) is reflected by a top surface of the casing of the beam splitter 19a (19b), there is a very weak possibility that the laser beam enters the light receiving element 13a (13b). This is effective in preventing mixture of noises with the light receiving signal of the light receiving element 13a (13b).

The reflected light from the recurrence reflection sheet 7 is returned to the polygon mirror 16a (16b) to be reflected thereby, and the reflected light enters the main reflecting surface 191a (191b) of the beam splitter 19a (19b) to be reflected to the side of the light receiving element 13a (13b), and the light passes through the visible light cut filter 14a (14b) to be finally received by the light receiving element 13a (13b). At this time, the light which enters the opening 193a (193b) of the main reflecting surface 191a (191b) passes directly towards the prism mirror 17a (17b) so it is not reflected towards the light receiving element 13a (13b). However, since a small amount of light passes directly through the opening 193a (193b), there does not arise a practical problem.

Figure 48:
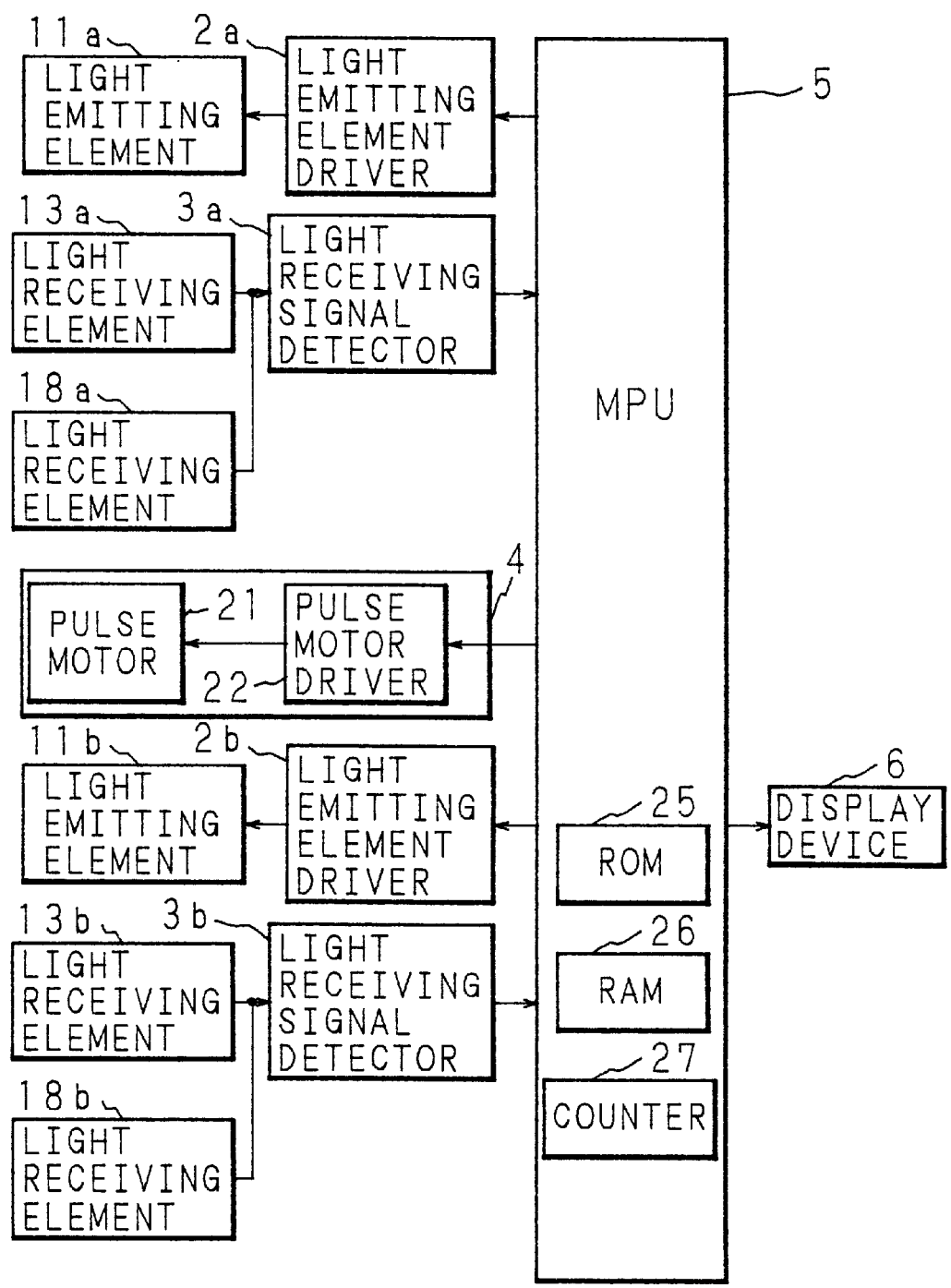
FIG. 48 is a schematic block diagram of the optical scanning-type touch panel (sixth embodiment) of the present invention.

FIG. 48 is a block diagram showing a relationship between the MPU 5 and another circuit in the optical scanning-type touch panel of the sixth embodiment. In FIG. 48, parts represented by the same reference numerals as FIG. 6 have the same functions. In the sixth embodiment, the light receiving signal detectors 3a and 3b transmit the light receiving signals of the reflected lights on the light receiving elements 13a and 13b and the light receiving elements 18a and 18b for timing detection to the MPU 5.

Figure 49:
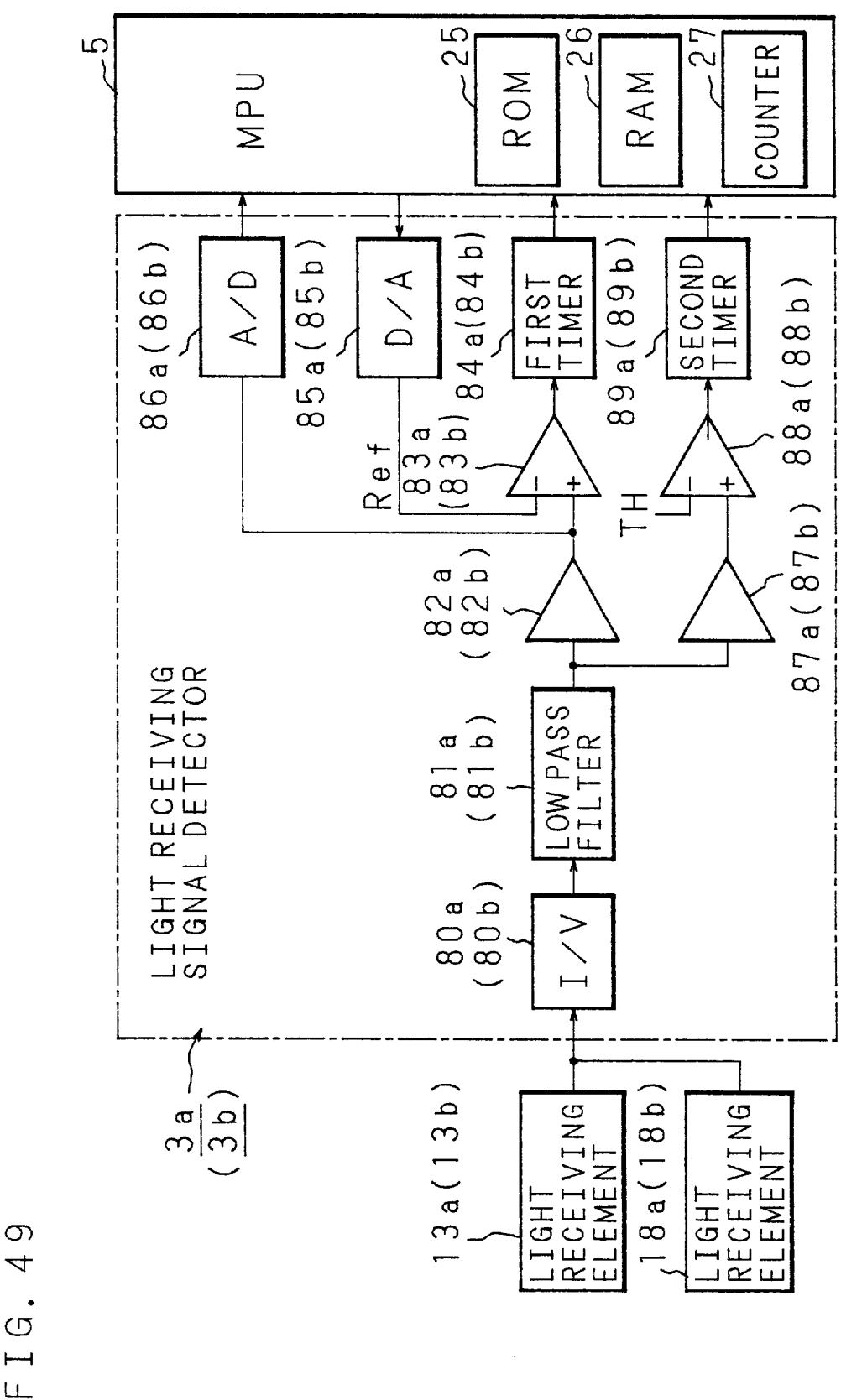
FIG. 49 is a block diagram showing an example of a configuration of a light receiving signal detector.

FIG. 49 is a block diagram showing an example of the constitution of the light receiving signal detector 3a (3b) in FIG. 48. Since the light receiving elements 13a and 18a (13b and 18b) output a received light amount as a light receiving signal which is in proportion to a current value, the output signals (currents) from the light receiving elements 13a and 18a (13b and 18b) are converted into a voltage signal by a current/voltage (I/V) converter 80a (80b). The voltage signal outputted from the current/voltage converter 80a (80b) passes through a low pass filter 81a (81b) to be inputted from an amplifier 82a (82b) to one input terminal of a comparator 83a (83b) as a signal to be compared. The output of the comparator 83a (83b) is inputted to a first timer 84a (84b), and the output of the first timer 84a (84b) is inputted to the MPU 5. The output of the amplifier 82a (82b) is supplied also to an A/D converter 86a (86b), and it is converted into a digital signal to be inputted to the MPU 5. The digital signal outputted from the MPU 5 is converted into an analog signal by a D/A converter 85a (85b) to be inputted to the other terminal of the comparator 83a (83b) as a threshold value for comparison.

Further, the output of the low pass filter 81a (81b) is inputted to one input terminal of a comparator 88a (88b) through an amplifier 87a (87b) as a signal to be compared. The output of the comparator 88a (88b) is inputted to a second timer 89a (89b), and its output is inputted to the MPU 5. Here, the threshold value for comparison in the comparator 88a (88b) is set to a suitable threshold value TH between the maximum output of the light receiving element for timing detection 18a (18b) and the maximum output of the light receiving element 13a (13b). Therefore, the comparator 88a (88b) outputs a signal "1" only for a period where the light receiving element for timing detection 18a (18b) receives a scanning light from the light send/receive unit 1a (1b), and outputs a signal "0" in a period other than the above period. The second timer 89a (89b) counts a time interval for which the output signal of the comparator 88a (88b) rises from "0" to "1", for example, to monitor the rotation of the polygon mirror 16a (16b).

According to such a constitution of the light receiving signal detector 3a (3b), the MPU 5 can perform the following process.

Since the output of the amplifier 82a (82b) is converted into a digital signal by the A/D converter 86a (86b) to be inputted to the MPU 5, the MPU 5 can monitor a synthesized waveform of the output signals of the light receiving elements 13a and 18a (13b and 18b) for a constant period as a digital signal. Moreover, the MPU 5 can detect the rotation state of the polygon mirror 16a (16b), namely, a timing at which one scanning is started from the counted result of the second timer 89a (89b). Therefore, the MPU 5 can detect the minimum value of the light receiving signal during one scanning from the signal inputted from the A/D converter 86a (86b).

Meanwhile, the MPU 5 outputs a digital signal to the D/A converter 85a (85b), which converts it into an analog signal therein so as to be able to supply the analog signal to the other input terminal of the comparator 83a (83b) as a signal of a threshold value. Therefore, the comparator 83a (83b) can slice the output of the amplifier 82a (82b) using an arbitrary value supplied from the MPU 5 as a threshold value (if the output of the amplifier 82a (82b) is not less than the threshold value, the comparator 83a (83b) outputs "1", and if not, outputs "0"). The first timer 84a (84b) counts a continuous time of the outputs "1" and "0" from the comparator 83a (83b).

Figure 50:
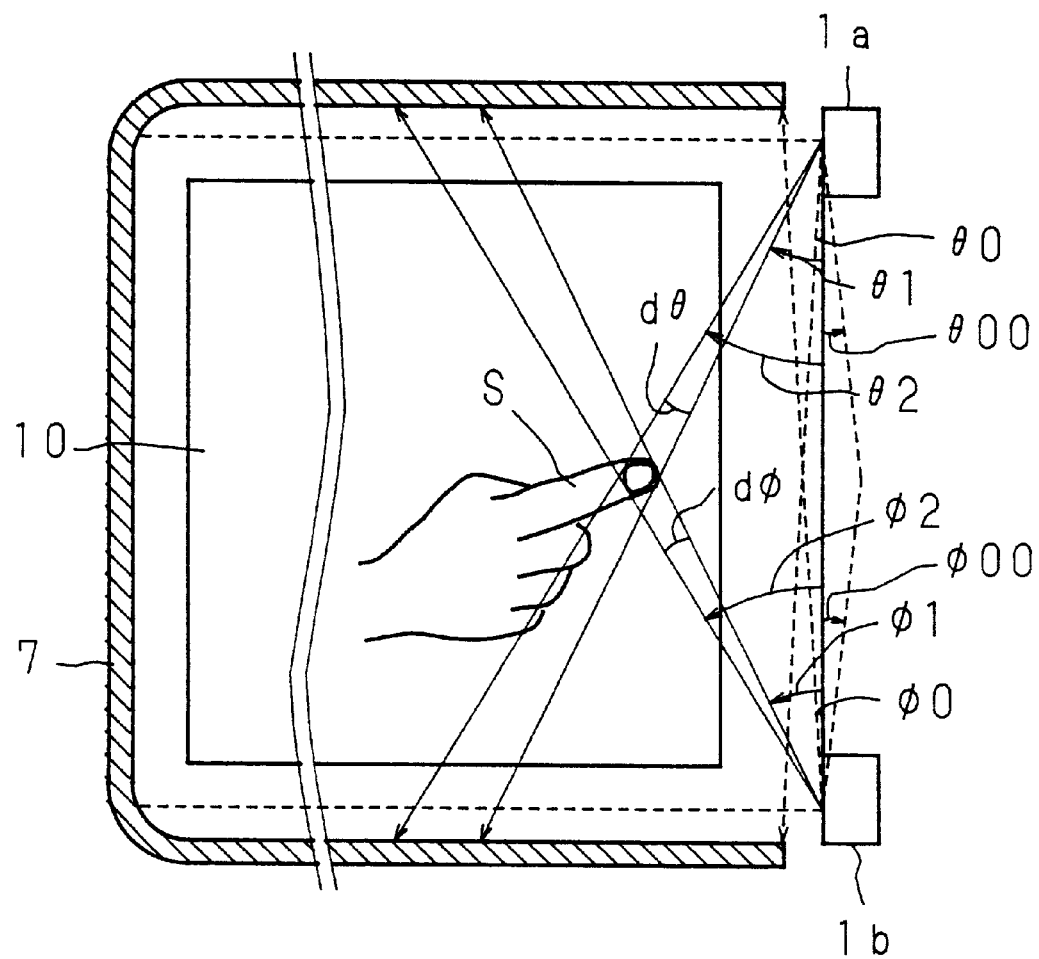
FIG. 50 is a schematic diagram showing an applied state of the optical scanning-type touch panel (sixth embodiment) of the present invention.

The following describes the operation for detecting a position by means of the optical scanning-type touch panel of the sixth embodiment on reference with the schematic drawing of FIG. 50 showing its principle. However, in FIG. 50, components other than the light send/receive units 1a and 1b, recurrence reflection sheet 7 and display screen 10 are omitted. Moreover, FIG. 50 shows the case where a finger is used as the indicator.

The MPU 5 controls the polygon controller 4 to rotate the polygon mirrors 16a and 16b in the light send/receive units 1a and 1b, and scans laser beams from the light emitting elements 11a and 11b angularly. As a result, the lights from the polygon mirrors 16a and 16b enter directly the light receiving elements for timing detection 18a and 18b, the reflected lights from the recurrence reflection sheet 7 through the polygon mirrors 16a and 16b enter the light receiving elements 13a and 13b. A received light amount of the lights, which enter the light receiving elements 18a and 18b for timing detection and the light receiving elements 13a and 13b in such a manner, is obtained as light receiving signals which are the outputs of the light receiving signal detectors 3a and 3b.

In FIG. 50, θ00 and φ00 represent an angle between a reference line connecting the light send/receive units 1a and 1b and the light receiving elements for timing detection 18a and 18b, θ0 and φ0 represent an angle between the reference line connecting the light send/receive units 1a and 1b and the end portion of the recurrence reflection sheet 7, θ1 and φ1 represent an angle between the reference line and the end portion of the indicator on the reference line side, and θ2 and φ2 represent an angle between the reference line and the end portion of the indicator which is opposite to the reference line side.

FIGS. 51A and 51B show a waveform of the light receiving signal (FIG. 51A) from the light receiving element 13a (13b) and the light receiving element for timing detection 18a (18b), and a waveform of the comparison output signal from the comparator 83a (83b) (FIG. 51B) in the case where the indicator S does not exist.

In this case, the light receiving element for timing detection 18a (18b) receives a light directly from the polygon mirror 16a (16b) at the scanning angle θ00 (φ00). This state is detected as a timing at which the output signal of the comparator 88a (88b) is changed from "0" to "1", and its period is counted by the second timer 89a (89b). As a result, since the MPU 5 can monitor a rotating period of the polygon mirror 16a (16b), the rotation of the pulse motor 21 which rotates the polygon mirror 16a (16b) is corrected by controlling the polygon controller 4 as the need arises.

In the case where the polygon mirror 16a (16b) has four surfaces, namely, regular polygon shape like the present embodiment, the polygon mirror 16a (16b) rotates by ¼ during one period which is counted by the second timer 89a (89b).

I the case where the indicator S does not exist on the optical path of the scanning light, the light enters directly the light receiving element for timing detection 18a (18b) and the reflected light from the recurrence reflection sheet 7 enters the light receiving element 13a (13b) at the timing θ00 (φ00) shown in FIG. 51A. As shown in FIG. 51A, an amount of the reflected light from the recurrence reflection sheet 7 becomes maximum at the first angle of θ0 (φ0) because the reflected light from the portion of the recurrence reflection sheet 7 which is the most closest is received at this angle, and the amount is decreased thereafter gradually. The amount of the reflected light becomes minimum once at the corner portion in the diagonal direction of the recurrence reflection sheet 7 which is the farthest, and thereafter the amount is increased gradually until an angle of 90°, and the scanning for one period is ended.

The MPU 5 takes an incident light amount to the light receiving element 13a (13b) for at least one period from the A/D converter 86a (86b) as a digital signal, and obtains a minimum value (lowest voltage). Next, the MPU 5 adds a predetermined value (margin voltage) to the obtained minimum value and outputs a digital value of this result to the D/A converter 85a (85b). The D/A converter 85a (85b) converts the digital signal outputted from the MPU 5 into an analog signal, and sets it as a threshold value (reference voltage Ref) for comparison output by the comparator 83a (83b).

The aforementioned margin voltage may be previously set to a suitable value according to the light receiving characteristic of the light receiving element 13a (13b) and the reflecting characteristic of the recurrence reflection sheet 7, but the lowest value of the reflected light amount from the recurrence reflection sheet 7, more specifically, a voltage, which is obtained from the reflected light from the corner portion in the diagonal direction of the recurrence reflection sheet 7 which is the farthest, is also detected, and the margin voltage can be set to a value between the obtained voltage and the lowest voltage such as a value of ½.

As mentioned above, in the optical scanning-type touch panel of the seventh embodiment, since the threshold value (reference voltage Ref) of the comparator 83a (83b) is set based on the lowest voltage which is obtained from a light receiving amount of the light receiving element 13a (13b) in at least one scanning, an influence of a change in sensitivity of the light receiving element 13a (13b) due to a change in temperature, etc. is eliminated and thus more accurate detection can be performed.

In the above example, the reference voltage Ref of the comparator 83a (83b) is set for one scanning, but needless to say it may be set from the results of scanning plural times.

When the threshold value (reference voltage Ref) is set in the comparator 83a (83b) as mentioned above, the MPU 5 counts a time for which the output signal of the comparator 83a (83b) is "1", namely, the voltage of the input signal to the comparator 83a (83b) is not less than the reference voltage. In the case where the function is normal, the output "1" for comparatively short time due to the incident light to the light receiving element for timing detection 18a (18b) and the output "1" for comparatively long time due to the reflected light from the recurrence reflection sheet 7 are obtained as output signals of the comparator 83a (83b). However, since the output "1" for comparatively short time due to the incident light to the light receiving element for timing detection 18a (18b) is synchronized with the counting period by the second timer 89a (89b), as shown in FIG. 51(B), the MPU 5 stores only the continuous time of the output "1" for comparatively long time due to the reflected light from the recurrence reflection sheet 7 into the RAM 26 as a reference time RT.

The MPU 5 performs the aforementioned initializing process at the time of actuation in the case where the indicator S does not exist on the display screen 10 or at a predetermined timing such as a timing where a prescribed instruction is given from the outside.

When the initializing process is completed, the optical scanning-type touch panel can be used actually.

Figure 52A:
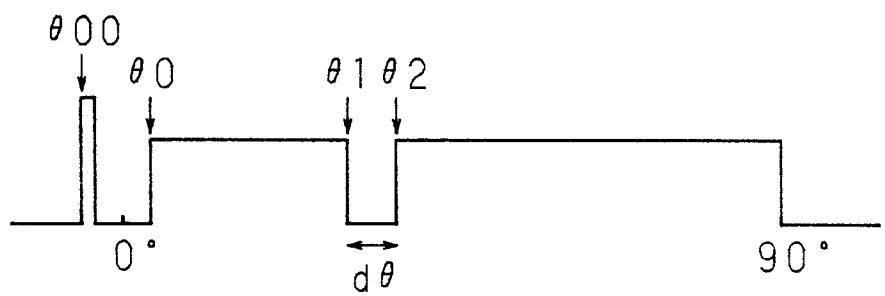
FIGS. 52A and 52B are timing charts showing a level change of the light receiving signal.
Figure 52B:
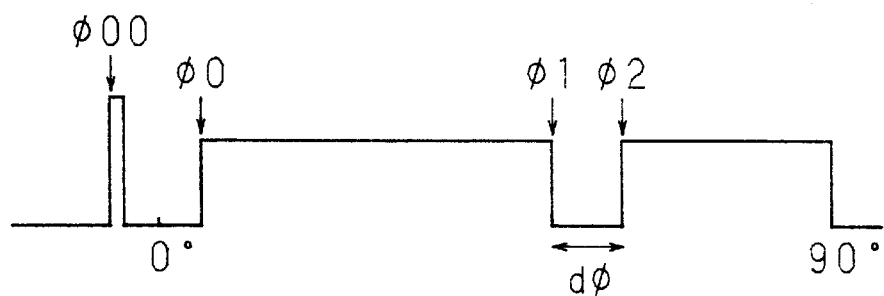

FIGS. 52A and 52B are timing charts showing waveforms of the light receiving signals in the light receiving elements 13a and 13b and the light receiving elements for timing detection 18a and 18b in the case where the indicator S exists. First, the light receiving elements for timing detection 18a and 18b receive lights directly from the polygon mirrors 16a and 16b at the scanning angles of θ00 and φ00. As a result, the signals outputted from the light receiving signal detectors 3a and 3b are used for correcting the rotation of the polygon mirrors 16a and 16b, namely, the rotation of the pulse motor 21 for rotating the polygon mirrors 16a and 16b. In the present example, since the polygon mirrors 16a and 16b have a regular polygon shape with four surfaces, when the light receiving elements for timing detection 18a and 18b output signals four times, the polygon mirrors 16a and 16b rotates fully once.

In the case where the indicator S exists on the display screen 10, when the indicator S does not exist on the optical path of the scanning lights from the light send/receive units 1a and 1b, the reflected lights from the recurrence reflection sheet 7 enter the light receiving elements 13a and 13b, and when the indicator S exists on the optical path, the reflected lights from the recurrence reflection sheet 7 and the reflected lights from the indicator S do not enter the light receiving elements 13a and 13b.

Therefore, in the state shown in FIG. 50, the reflected light does not enter the light receiving element 13a (13b) between the scanning angles of 0° to θ0 (0° to θ0), and the reflected light enters the light receiving element 13a (13b) between the scanning angles of θ0 to θ1 (θ0 to θ1), and the reflected light does not enter the light receiving element 13a (13b) between the scanning angles of θ1 to θ2 (θ1 to θ2). Such angles can be obtained from the timing of the rise or fall of the light receiving signal (see FIGS. 52A and 52B). Therefore, the cut-off region due to a human finger as the indicator S can be obtained as dθ=θ2−θ1 and dφ=φ2−φ1.

Next, a coordinate of the central position (indicated position) of the indicator S (finger in the present example) and a cross section length of the indicator S (finger in the present example) are obtained from the cut-off region obtained in such a manner. The process for obtaining the coordinate and cross section length is the same as that in the first embodiment (see FIGS. 9 through 13), so the description thereof is omitted.

Figure 53A:
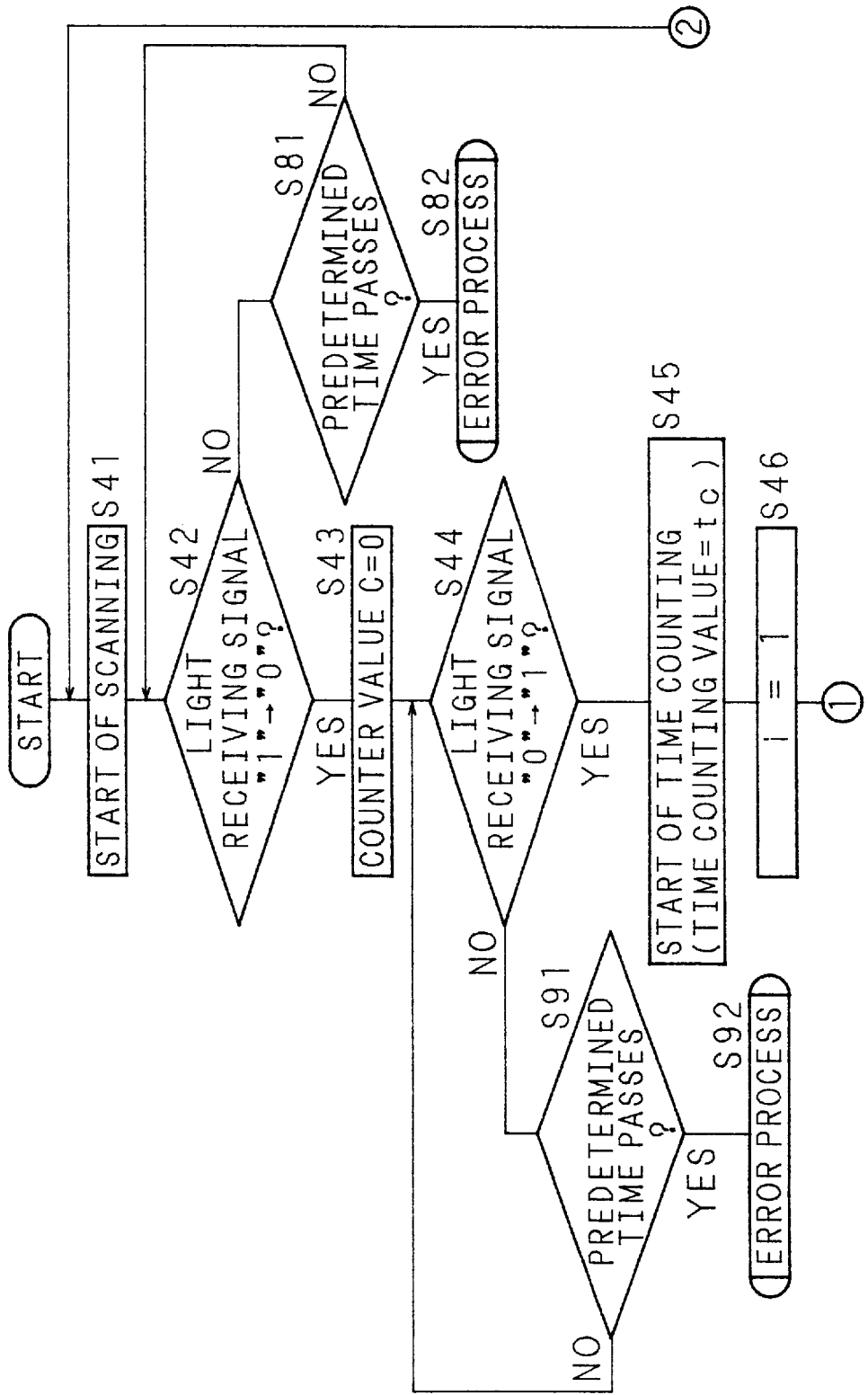
FIGS. 53A and 53B are flow charts showing algorithm for processing the light receiving signal.
Figure 53B:
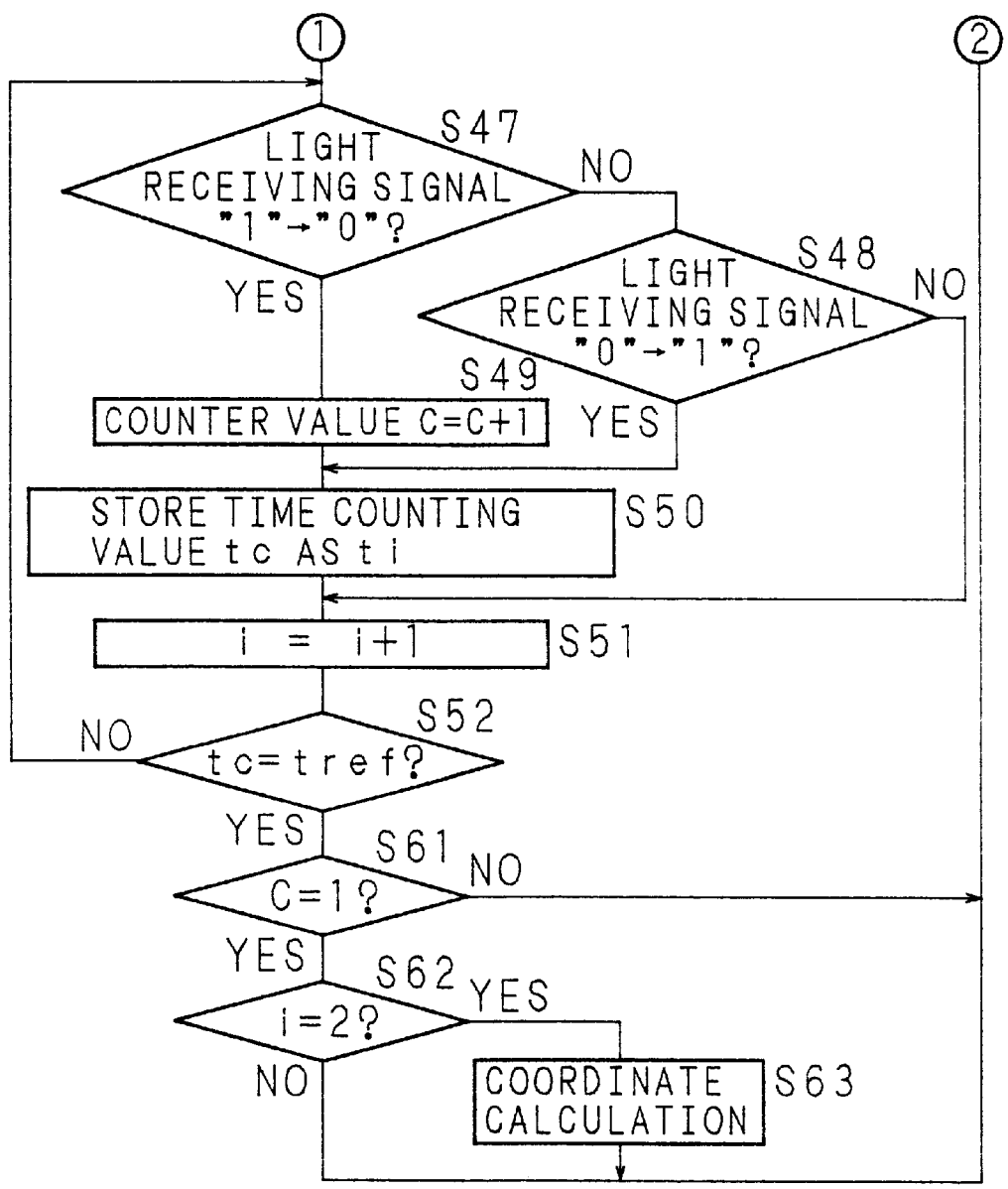

FIGS. 53A and 53B are flow charts showing algorithm for the process of the light receiving process by the MPU 5 based on the counted value of the first timer 84a (84b). FIGS. 54A and 54B show a waveform of the light receiving signal (FIG. 54(A)) from the light receiving element 13a (13b) and light receiving element for timing detection 18a (18b), and a waveform (FIG. 54(B)) of the comparison output signal from the comparator 83a (83b) in the case where the two indicators S exist on the display screen 10.

First, when the scanning light enters directly the light receiving element for timing detection 18a (18b), one scanning is started (S41). Next, when the light receiving signal from the light receiving element 13a (13b) is changed from "1" to "0" ("YES" at S42), a counter value C of the counter 27 is cleared to "0" (S43). However, in the case where predetermined time passes without changing the light receiving signal from the light receiving element 13a (13b) from "1" to "0" ("NO" at S42) ("YES" at S81), an error process is performed (S82).

When the reflected light from the recurrence reflection sheet 7 starts to enter the light receiving element 13a (13b), the light receiving signal from the light receiving element 13a (13b) is changed from "0" to "1" ("YES" at S44), so the first timer 84a (84b) starts the time counting (S45), and the counter i is initialized to "1" (S46). Here, the time counting value of the first timer 84a (84b) is tc. However, in the case where the predetermined time passes ("YES" at S91) with the receiving signal from the light receiving element 13a (13b) not being from "0" to "1" ("NO" at S44), namely, the reflected light from the recurrence reflection sheet 7 not entering the light receiving element 13a (13b), an error process is performed (S92).

Thereafter, in the case where the indicator S does not exist on the display screen 10, the light receiving signal of the light receiving element 13a (13b) does not change, so the process goes to "NO" at S47 and goes to "NO" at S48. Then, a judgment is made as to whether or not the time counting value tc of the first timer 84a (84b) reaches the reference time tref stored in the RAM 26 in the previous initializing process (S52). When the time counting value tc of the first timer 84a (84b) reaches the reference time tref ("YES" at S52), one scanning is completed so that the process goes to S61.

However, in the case where the indicator S exists on the display screen 10, the light receiving signal of the light receiving element 13a (13b) is normally changed from "1" to "0" and from "0" to "1") until the time counting value tc of the first timer 84a (84b) reaches the reference time tref. More specifically, when the scanning light is shielded by the indicator S, the light receiving signal of the light receiving element 13a (13b) is first changed from "1" to "0" ("YES" at S47). In this case, as shown in FIG. 54, the counter value C of the counter 27 is increased by "1" (S49), and the time counting value tc of the first timer 84a (84b) at this time is stored in the RAM 26 as data ti (t1 at first) (S50).

Thereafter, the counter is increased by "1" (S51), and since the time counting value tc of the first timer 84a (84b) does not reach the reference time tref normally ("NO" at S52), the process is returned to S47. The light receiving signal of the light receiving element 13a (13b) is changed from "0" to "1") ("NO" at S47 and "YES" at S48). In this case, the time counting value tc of the first timer 84a (84b) at this time is stored in the RAM 26 as data ti (t2 for second time) (S50). Thereafter, the counter i is increased by "1" (S51), and since the time counting value tc of the first timer 84a (84b) does not reach the reference time tref normally, the process is returned to S47.

Since a number of indicator S is normally one, the time counting value tc of the first timer 84a (84b) reaches the reference time tref and the process goes to S61. However, in the case where a plurality of the indicators S exist on the display screen 10, the aforementioned process is repeated so that a counter value C of the counter 27 shows not less than 2 and 3 or more data ti of the time counting value tc of the first timer 84a (84b) can be obtained.

When the time counting value tc of the first timer 84a (84b) reaches the reference time tref, the counter value C of the counter 27 is first checked (S61). As mentioned above, since a number of the indicator existing on the display screen 10 is normally one, the counter value C of the counter 27 is "1" ("YES" at S61), and the value of the counter i is "2" ("YES" at S62). In this case, the aforementioned calculation of coordinate is made (S63). However, as shown in FIG. 54, in the case where the counter value C of the counter 27 is not "1" ("NO" at S61, this case includes the case where the indicator S does not exist on the display screen 10) or in the case where the counter i does not show "2" ("N0" at S62, this case includes the case where the indicator S does not exist on the display screen 10), the calculation of coordinate is not made and the process is returned to S41.

The aforementioned process eliminates an influence due to the ambient temperature of the light receiving element 13a (13b), and in the case where one indicator S on the display screen 10 is detected, the calculation of coordinate is made based on an actual rotational speed of the polygon mirror 16a (16b). Therefore, in the case where a plurality of indicators S on the display screen 10 are detected and thus the accurate calculation of coordinate cannot be made, the calculation of coordinate is not performed so that useless confusion is avoided. However, since in most cases such a state is continued for extremely short time, there arises no practical problem. In the case where the state that the calculation of coordinate is not made is continued for the time not less than some degree, it is needless to say that any error message is displayed.

That the cross section length of the indicator S can be obtained in the aforementioned manner means that in the case where a character is written on the display screen 10 by using a pen, for example, a thickness of a line to be changed subtly and an ink mark such as blur can be reproduced. In order to do so, it is necessary to scan a laser beam on a position as close as possible to the surface of the display screen 10. In other words, in the case where a laser beam is scanned on a position separated from the surface of the display screen 10 to not less than certain degree, a portion where a thickness of the point of a pen is not changed is detected.

From this viewpoint, when the inventors of the present application made tests by using various pens on the market, it was found that the laser beam should be scanned on a position which is separated up to 5 mm from the surface of the display screen 10, preferably a position which is separated up to 3 mm therefrom. Moreover, it was found that the width of the laser beam used at this time is desirably not more than ½ of the height (size in the direction perpendicular to the surface of the display screen 10) from the viewpoint of the resolution.

The aforementioned tests are made by the inventors of the present application using pens on the market, but they are not limited to them, so it is needless to say that in the case where tools having the same characteristics, namely, whose a touch area on the surface is changed according to the strength of a pen stroke, or tools exclusive for the optical scanning-type touch panel of the present invention which are modeled on a pen are used, the same effect can be obtained.

Seventh Embodiment

Figure 55:
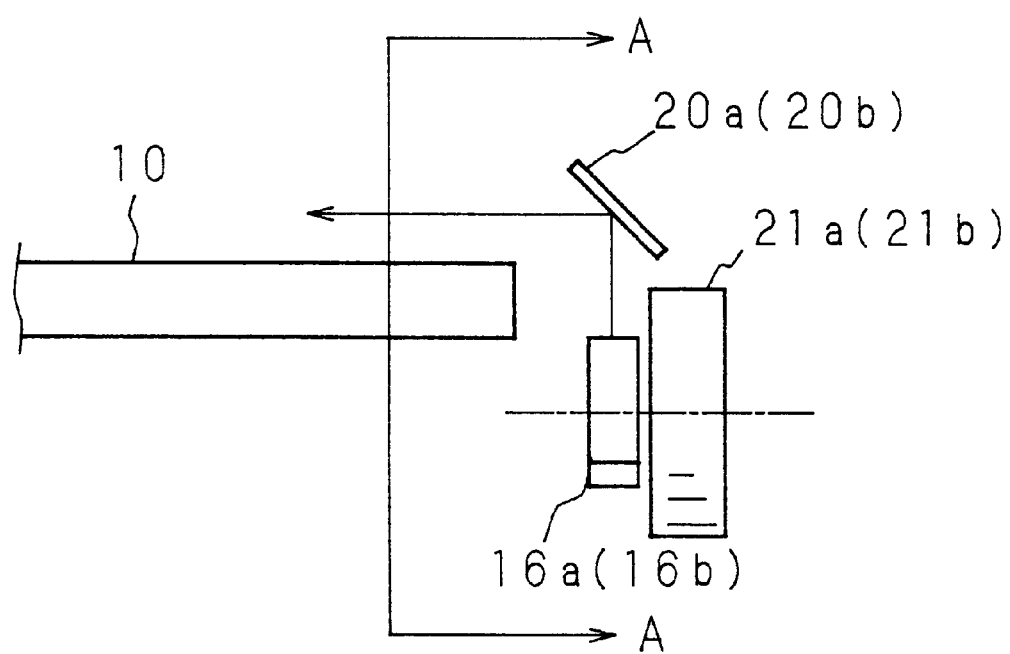
FIG. 55 is a schematic diagram showing an example of another constitution of the light send/receive unit.
Figure 56:
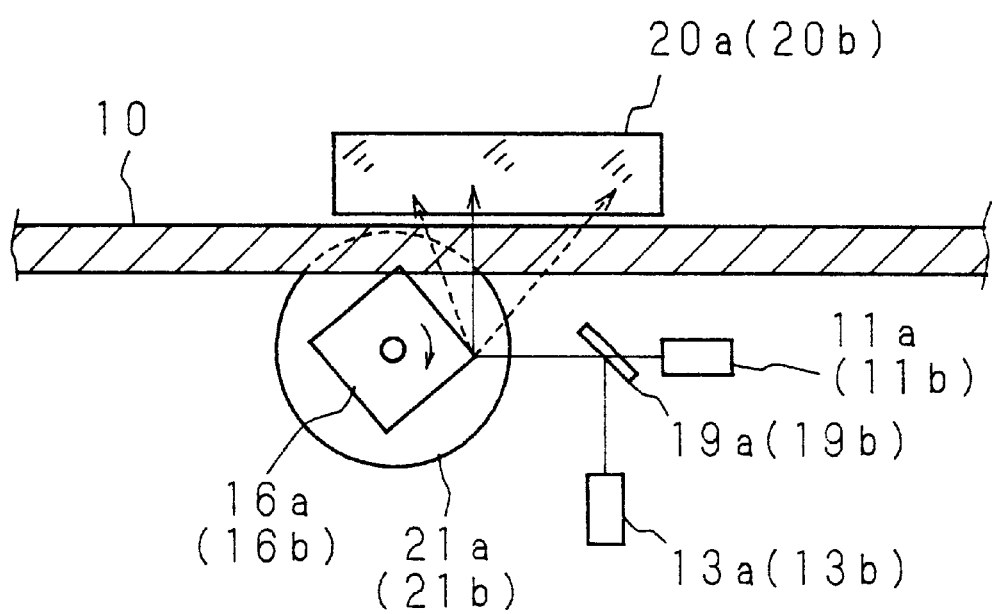
FIG. 56 is a schematic diagram showing an example of another constitution of the light send/receive unit.

FIGS. 55 and 56 show example of the constitution of the light send/receive unit 1a (1b) in the optical scanning-type touch panel according to the seventh embodiment of the present invention, and FIG. 56 is a cross sectional view taken along a line of an arrow A—A of FIG. 55.

In the light send/receive unit 1a (1b) of the seventh embodiment, the light emitting element 11a (11b), light receiving element 13a (13b), beam splitter 19a (19b) and polygon mirror 16a (16b) are arranged in a position lower than the display screen 10, and the polygon mirror 16a (16b) is arranged so that its rotational axis becomes parallel with the display screen 10. Moreover, the optical path between the light emitting element 11a (11b) and the beam splitter 19a (19b) is arranged so as to intersect perpendicularly to the rotational axis of the polygon mirror 16a (16b) and be parallel with the display screen 10. Further, the reflecting mirror 20a (20b) is arranged between the polygon mirror 16a (16b) and the display screen 10 so that its surface makes an angle of 45° with the surface of the display screen 10.

In such a constitution, the laser beam reflected from the light emitting element 11a (11b) passes through the beam splitter 19a (19b) to be scanned by the polygon mirror 16a (16b) in a plane which intersects perpendicularly to the display screen 10, and the laser beam is scanned by the reflecting mirror 20a (20b) in a plane which is parallel with the surface of the display screen 10. Moreover, the reflected light from the recurrence reflection sheet 7 is reflected by the surface of the reflecting mirror 20a (20b) which intersects perpendicularly to the surface of the display screen 10, and after the reflected light is reflected by the polygon mirror 16a (16b) and the beam splitter 19a (19b), the reflected light enters the light receiving element 13a (13b).

Figure 57:
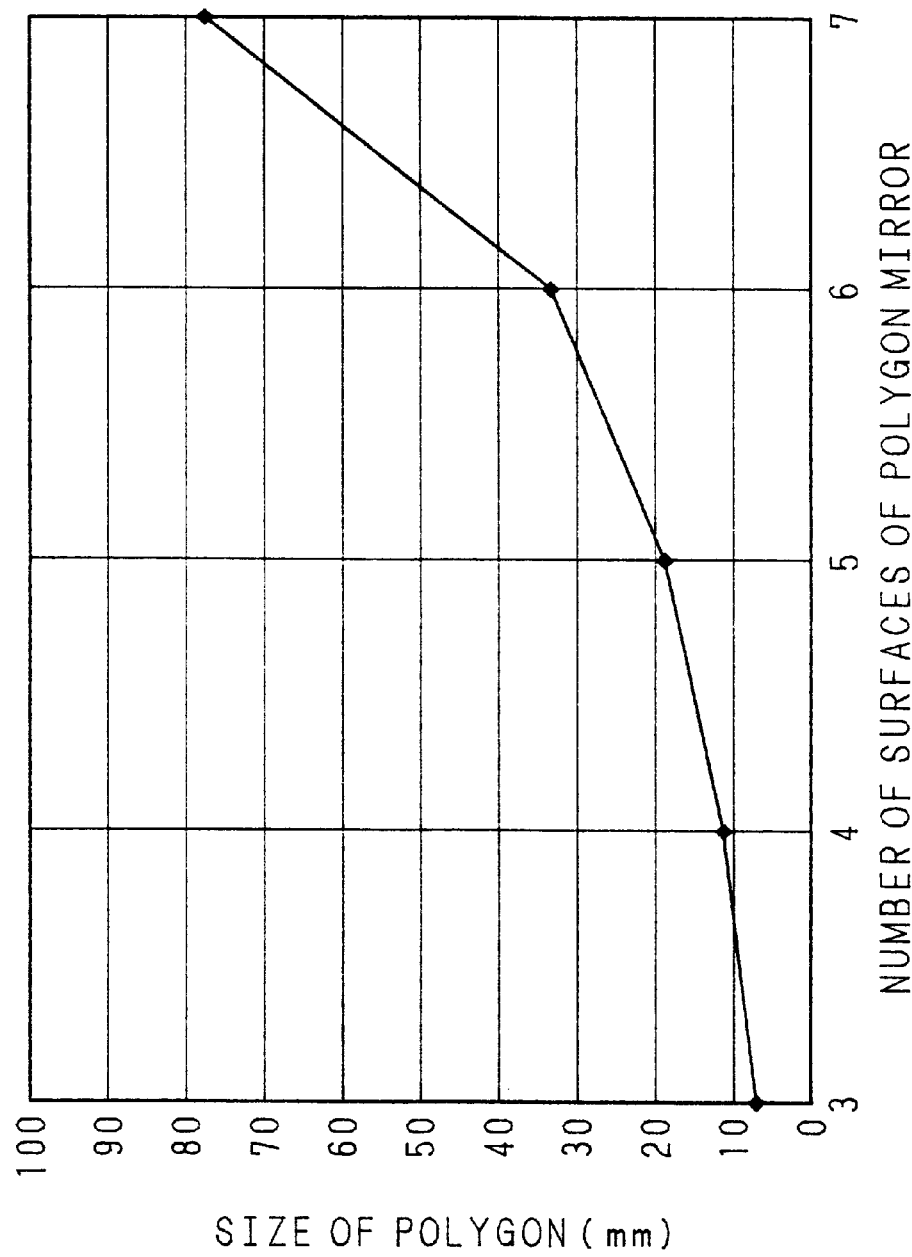
FIG. 57 is a graph showing a relationship between a number of surfaces and size of a polygon mirror.

Such a constitution of the light send/receive unit 1a (1b) according to the seventh embodiment shown in FIGS. 56 and 57 is effective in miniaturizing the light send/receive unit 1a (1b) when a flat disc-shaped motor is used as the pulse motor 21a (21b).

Finally, the description will be given as to a number of surfaces of the polygon mirrors 16a and 16b in the optical scanning-type touch panel of the present invention. As mentioned above, in order to perform a triangulation on the display screen 10 from the two light send/receive units 1a and 1b, scanning at the respective angle of at least 90° is required. From such a viewpoint, a relationship between a number of surfaces and a size of the polygon mirrors 16a and 16b in the case where the scanning at the angle of 90° is performed on the display screen 10 is shown in the graph of FIG. 57. It is needless to say that the polygon mirrors 16a and 16b have a regular polygon shape. When considering this result and the size of the display screen 10 of the present example, the size of the polygon mirrors 16a and 16b which can be provided actually to the light send/receive units 1a and 1b is about 30 to 40 mm, so it is preferable that the polygon mirrors 16a and 16b have three to six surfaces.

As described in detail above, in the optical scanning-type touch panel of the present invention, since the cut-off region of the scanning light caused by the indicator is measured, the present invention produces excellent effects such that a correct indicated position considering a size of the indicator can be detected accurately, and a type of the indicator is judged so that defective detection due to an object other than a predetermined indicator can be prevented.

In addition, according to the optical scanning-type touch panel of the present invention, since the arrangement of the light emitting element and light receiving element is considered so that the scanning light from the optical scanning element is not shielded by a component of the light emitting element and light receiving element, the scanning light from the optical scanning element is scanned sufficiently in the direction of a scanning region.

Further, according to the optical scanning-type touch panel of the present invention, since the arrangement of the light emitting element and light receiving element is considered so that the emission direction of the light emitting element intersects the scanning surface by the optical scanning element, and so that the directivity of the light receiving of the light receiving element intersects the scanning surface by the optical scanning element, the present invention is effective in miniaturizing light send/receive members.

Furthermore, according to the optical scanning-type touch panel of the present invention, when a number of surfaces of the reflecting surface of the polygon mirror composing the optical scanning element is set to 3 through 6, the optical scanning element can be miniaturized.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical scanning-type touch panel in which a region of a plane specified as an object is to be touched is touched by an indicator so that information is inputted, said touch panel, comprising:

light recurrence reflection means provided at the outside of said plane;

at least two sets of light send/receive means having light emitting means, optical scanning means for periodically scanning a light emitted from said light emitting means angularly in a plane which is substantially parallel with said plane and light receiving means for receiving a reflected light of the light scanned by said optical scanning means from said light recurrence reflection means;

comparison means for comparing a light receiving signal by each of said light receiving means with a predetermined threshold value so as to detect a cut-off timing in the case where the indicator exists within the region of said plane;

measuring means for measuring a cut-off region of a scanning light by said indicator within the region of said plane based on a scanning angle of each of said optical scanning means and the compared result of said comparison means; and calculating means for calculating a position and size of said indicator within the region of said plane according to the measured result by said measuring means.

2. The optical scanning-type touch panel according to claim 1, wherein said plane is rectangular, wherein said light recurrence reflection means is arranged on the outside of at least three sides of said plane so that its light reflecting surface is substantially perpendicular to the light scanning surface, and wherein said two sets of light send/receive means are arranged on the outside of one side of said screen where said light recurrence reflection means is not arranged.

3. The optical scanning-type touch panel according to claim 2, wherein said plane is rectangular and said two sets of light send/receive means are arranged along one of short sides of said plane.

4. The optical scanning-type touch panel according to claim 2, wherein a change in a reflected light amount at the end portion of said light recurrence reflection means which faces one side of said plane where said light recurrence reflection means is not arranged is a timing of start/end of optical scanning for one period on said plane.

5. The optical scanning-type touch panel according to claim 1, further comprising indicated position calculating means for calculating an indicated position by said indicator using a specified point on the cut-off region measured by said measuring means.

6. The optical scanning-type touch panel according to claim 5, further comprising cross section length calculating means for calculating a cross section length of said indicator based on the cut-off region measured by said measuring means and the indicated position calculated by said indicated position calculating means.

7. The optical scanning-type touch panel according to claim 6, further comprising:

size information storage means for storing information about size of plural types of objects;

comparison means for comparing the information about size of said indicator obtained from the cross section length calculated by said cross section length calculating means and the information about size of plural types of objects stored in said size information storage means; and judging means for judging a type of said indicator according to the compared result of said comparison means.

8. The optical scanning-type touch panel according to claim 1, further comprising:

at least two light receiving elements provided in the vicinity of said plane for receiving the scanning light from said optical scanning means, wherein a timing at which said light receiving elements receive the scanning light is a timing of start/end of optical scanning on said plane.

9. The optical scanning-type touch panel according to claim 1, further comprising:

reflecting means provided in the vicinity of said plane for reflecting the scanning light from said optical scanning means towards said light receiving means, wherein a timing at which said light receiving means receives the reflected light from said reflecting means is a timing of start/end of optical scanning on said plane.

10. The optical scanning-type touch panel according to claim 1, wherein a cross sectional shape of the light scanned by said optical scanning means is flat.

11. The optical scanning-type touch panel according to claim 1, wherein a cross sectional shape of the light scanned by said optical scanning means is flat in a direction parallel with said plane.

12. The optical scanning-type touch panel according to claim 1, further comprising a light shielding member for prevents the light scanned by the optical scanning means of one of said two sets of light send/receive means from entering the light receiving means of the other one of said two sets of light send/receive means.

13. The optical scanning-type touch panel according to claim 1, further comprising received light amount control means for controlling a received light amount by the respective light receiving means of said two sets of light send/receive means to make it constant.

14. The optical scanning-type touch panel according to claim 13, wherein said received light amount control means controls intensity of the light scanned by said optical scanning means so that a received light amount of said light receiving means becomes constant.

15. The optical scanning-type touch panel according to claim 13, wherein said received light amount control means controls an amplification factor of a level of a light receiving signal of said light receiving means so that a received light amount of said light receiving means becomes constant.

16. The optical scanning-type touch panel according to claim 1, further comprising:

storage means for storing information about a received light amount in an initial state in the light receiving means of said two sets of light send/receive means; and comparison means for comparing information about a received light amount stored in said storage means with a received light amount in said light receiving means.

17. The optical scanning-type touch panel according to claim 1, further comprising:

storage means for storing information about a received light amount in an initial state in the light receiving means of said two sets of light send/receive means by a digital signal;

converting means for converting the digital signal stored in said storage means into an analog signal; and comparison means for comparing a received light amount in said light receiving means with the analog signal converted by said converting means.

18. The optical scanning-type touch panel according to claim 1, further comprising:

switching means for switching intensity of the light scanned by said optical scanning means between at least two steps, wherein said switching means is controlled according to a scanning angle of the light scanned by said optical scanning means.

19. An optical scanning-type touch panel in which a region of a plane specified as an object to be touched is touched by an indicator so that information is inputted, said touch panel comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein said plane is rectangular, wherein said light recurrence reflection means is arranged on the outside of at least three sides of said display screen so that its light reflecting surface is substantially perpendicular to the light scanning surface, wherein said two sets of light sent/receive means are arranged on the outside of one side of said display screen where said light recurrence reflection means is not arranged, and wherein a distance d between a segment of a line connecting the centers of said two sets of light send/receive means and one side of said plane where said two sets of light send/receive means are arranged is set so as to satisfy the following equation:

$$d \geq d\theta \times L^2 / 4\delta$$

Here, dθ: measuring accuracy
δ: detecting accuracy
L: length of a reference line (a distance between said two sets of light send/receive means).

20. The optical scanning-type touch panel according to claim 19, wherein said plane is a quadrilateral display screen.

21. An optical scanning-type touch panel in which a region of a plane specified as an object to be touched is touched by an indicator so that information is inputted, said touch panel comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein said plane is a quadrilateral display screen, wherein said light recurrence reflection means is arranged on the outside of at least three sides of said display screen so that its light reflecting surface is substantially perpendicular to the light scanning surface, wherein said two sets of light sent/receive means are arranged on the outside of one side of said display screen where said light recurrence reflection means is not arranged, and wherein a part or whole of said light recurrence reflection means is arranged in a sawtooth form to be more perpendicular to light projected from said two sets of light send/receive means.

22. An optical scanning-type touch panel in which a region of a plane specified as an object to be touched is touched by an indicator so that information is inputted, said touch panel, comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means;

measuring means for measuring a cut-off region of a scanning light in said plane which is formed by said indicator based on a scanning angle of said optical scanning means and the result of receiving light by said light receiving means;

indicated position calculating means for calculating an indicated position by said indicator using a specified point on the cut-off region measured by said measuring means;

cross section length calculating means for calculating a cross section length of said indicated based on the cut-off region measured by said measuring means and the indicated position calculated by said indicated position calculating means;

size information storage means for storing information about size of plural types of objects;

comparison means for comparing the information about size of said indicator obtained from the cross section length calculated by said cross section length calculating means and the information about size of plural types of objects stored in said size information storage means;

judging means for judging a type of said indicator according to the compared result of said comparison means; and invalidating means for when said indicator is judged by said judging means as an indicator other than a specified one, invalidating the cut-off region measured by said measuring means and the indicated position calculated by said indicated position calculating means.

23. An optical scanning-type touch panel in which a region of a plane specified as an object to be touched is touched by an indicator so that information is inputted, said touch panel comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein a region where said indicator cannot enter is provided between said plane and said light recurrence reflection means.

24. An optical scanning-type touch panel in which a region of a plane specified as an object to be touched is touched by an indicator so that information is inputted, said touch panel comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein said scanning light is a pulse light, and wherein said optical scanning means includes control means for controlling pulse emission.

25. The optical scanning-type touch panel according to claim 24, wherein said scanning light is a pulse light whose period is enough short for necessary resolution.

26. The optical scanning-type touch panel according to claim 24, wherein said control means includes means for adjusting at least one parameter of an emission time of said scanning light for once, an emission strength of said scanning light for once and an emission period of said scanning light.

27. The optical scanning-type touch panel according to claim 24, wherein said control means includes means for adjusting the timing of the start of the optical scanning.

28. An optical scanning-type touch panel in which a region of a plane specified as an object to be touched is touched by an indicator so that information is inputted, said touch panel comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein the light scanned by said optical scanning means enters directly said light receiving means without going by way of said recurrence reflection means at the start of scanning, wherein first comparison means for comparing a received light amount signal by said light receiving means with a first reference value which is comparatively large and second comparison means for comparing the received light amount signal with a second reference value which is comparatively small are provided, and wherein an output of the compared result by said first comparison means is a timing of the start of scanning.

29. The optical scanning-type touch panel according to claim 28, further comprising:

at least two time counting means, wherein the timing of the start of scanning which is the output of the compared result by said first comparison means is an actuating trigger of said time counting means, and said switching means is switched at the time where said time counting means counts a predetermined time.

30. The optical scanning-type touch panel according to claim 28, further comprising:

at least four time counting means in which the timing of the start of scanning which is the output of the compared result by said first comparison means is an actuating trigger, wherein two of said four time counting means are stopped at a timing where the output of said second comparison means is changed from true to false, and the other two time counting means are stopped at a timing where the output of said second comparison means is changed from false to true.

31. The optical scanning-type touch panel according to claim 30, further comprising:

at least two time counting means for counting an interval of the timing of the start of scanning which is the output of the compared result by said first comparison means, wherein counted results by said four time counting means are corrected by the counted results by said at least two time counting means.

32. The optical scanning-type touch panel according to claim 28, further comprising:

four time counting means in which a timing where the output of said second comparison means is changed from false to true is an actuating trigger, wherein two of said four time counting means are stopped at a timing where the output of said second comparison means is changed from true to false, and the other two time counting means are stopped at a timing where the output of said second comparison means is changed from false to true.

33. The optical scanning-type touch panel according to claim 32, further comprising:

at least two time counting means for counting an interval of the timing of the start of scanning which is the output of the compared result by said first comparison means, wherein the counted results by said four time counting means are corrected by the counted result by said at least two time counting means.

34. An optical scanning-type touch panel in which a display screen of a flat display is touched by an indicator so that information is inputted, comprising:

light recurrence reflection means arranged to the outside of three sides of said display screen;

at least two sets of light send/receive means arranged on the outside of one side of said display screen where said light recurrence reflection means is not arranged, having light emitting means, optical scanning means for periodically scanning a light emitted from said light emitting means angularly in a plane which is substantially parallel with said display screen, and light receiving means for receiving a reflected light of the light scanned by said optical scanning means from said light recurrence reflection means;

comparison means for comparing a light receiving signal by each of said light receiving means with a predetermined threshold value so as to detect a cut-off timing in the case where the indicator exists within the region of said plane;

measuring means for measuring a cut-off region of a scanning light by said indicator within the region of said plane based on a scanning angle of each of said optical scanning means and the compared result of said comparison means; and calculating means for calculating a position and size of said indicator within the region of said plane according to the measured result by said measuring means.

35. The optical scanning-type touch panel according to claim 34, wherein said flat display is a plasma display.

36. An optical scanning-type touch panel in which a region of a plane specified as an object to be touched is touched by an indicator so that information is inputted, said touch panel comprising:

light recurrence reflection means provided to the outside of said plane;

at least two sets of light send/receive means having light emitting means, optical scanning means for scanning a light emitted from said light emitting means angularly in a plane which is substantially parallel with said plane, and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein said light emitting means is arranged so that an optical axis of a light emitted therefrom intersects a scanning surface of the light of said optical scanning means, and said light receiving means is arranged so that directivity of a light received thereby intersects the scanning surface of the light of said optical scanning means.

37. An optical scanning-type touch panel in which a region of a plane specified as an object to be touched is touched by an indicator so that information is inputted, said touch panel comprising:

light recurrence reflection means provided to the outside of said plane;

at least two sets of light send/receive means having light emitting means, optical scanning means for scanning a light emitted from said light emitting means angularly in a plane which is substantially parallel with said plane, and light receiving means for receiving a reflected light of the light scanned by said optical-scanning means from said light recurrence reflection means; and measuring means for measuring a cut-off region of a scanning light in said plane which is formed by said indicator based on a scanning angle of said optical scanning means and the result of receiving light by said light receiving means, wherein said light emitting means is arranged so that a path of a light emitted therefrom to said optical scanning means goes away from the edge of said plane in a portion closer to said light emitting means, and said light receiving means is arranged so that directivity of a light received thereby goes away from the edge of said plane in a portion closer to said light receiving means.

38. An optical scanning-type touch panel in which a region of a plane specified as an object to be touched is touched by an indicator so that information is inputted, said touch panel comprising:

light recurrence reflection means provided to the vicinity of the region of said plane;

at least two sets of light send/receive means having light emitting means, optical scanning means for scanning a light emitted from said light emitting means angularly in a plane which is substantially parallel with the region of said plane, and light receiving means for receiving a reflected light of the light scanned by said optical scanning means from said light recurrence reflection means;

comparison means for comparing a light receiving signal by said light receiving means with a predetermined threshold value so as to detect a cut-off timing in the case where the indicator exists within the region of said plane;

measuring means for measuring a cut-off region of a scanning light by said indicator within the region of said plane based on a scanning angle of said optical scanning means and the compared result of said comparison means;

calculating means for calculating a position and size of said indicator within the region of said plane according to the measured result by said measuring means;

signal level detecting means for detecting a lowest level of a light receiving signal of said light receiving means;

adding means for adding a predetermined value to the signal level detected by said signal level detecting means; and threshold value setting means for setting the add value obtained by said adding means in said comparison means as a threshold value.

39. The optical scanning-type touch panel according to claim 38, wherein:

said signal level detecting means detects the lowest level of the light receiving signal of said light receiving means and a lowest level of the light receiving signal in the case where said light receiving means receives a scanning light with the indicator not existing within the region of said plane, said adding means adds a value between the two levels detected by said signal level detecting means to the lowest level of the receiving signal of said light receiving means.

40. An optical scanning-type touch panel in which a region of a plane specified as an object to be touched is touched by an indicator so that information is inputted, said touch panel comprising:

light recurrence reflection means provided to the vicinity of the region of said plane;

at least two sets of light send/receive means having light emitting means, optical scanning means for scanning a light emitted from said light emitting means angularly in a plane which is substantially parallel with the region of said plane, and light receiving means for receiving a reflected light of the light scanned by said optical scanning means from said light recurrence reflection means;

comparison means for comparing a light receiving signal by said light receiving means with a predetermined threshold value so as to detect a cut-off timing in the case where the indicator exists within the region of said plane;

measuring means for measuring a cut-off region of a scanning light by said indicator within the region of said plane based on a scanning angle of said optical scanning means and the compared result of said comparison means;

calculating means for calculating a position and size of said indicator within the region of said plane according to the measured result by said measuring means; and time counting means for counting a continuous time of a level of a light receiving signal of said light receiving means in the case where the indicator does not exist on said plane, wherein said measuring means measures a cut-off region in the case where the compared result of said comparison means is changed within the time counted by said time counting means.

41. The optical scanning-type touch panel according to claim 40, wherein the time counting by said time counting means is performed automatically at the time of actuation.

42. The optical scanning-type touch panel according to claim 40, wherein the time counting by said time counting means is performed in the case where a predetermined instruction is given.

43. An optical scanning-type touch panel in which a region of a plane specified as an object to be touched is touched by an indicator so that information is inputted, said touch panel comprising:

light recurrence reflection means provided to the vicinity of the region of said plane;

at least two sets of light send/receive means having light emitting means, optical scanning means for scanning a light emitted from said light emitting means angularly in a plane which is substantially parallel with the region of said plane, and light receiving means for receiving a reflected light of the light scanned by said optical scanning means from said light recurrence reflection means;

comparison means for comparing a light receiving signal by said light receiving means with a predetermined threshold value so as to detect a cut-off timing in the case where the indicator exists within the region of said plane;

measuring means for measuring a cut-off region of a scanning light by said indicator within the region of said plane based on a scanning angle of said optical scanning means and the compared result of said comparison means;

calculating means for calculating a position and size of said indicator within the region of said plane according to the measured result by said measuring means; and counting means for counting the number of times every time when said comparison means detects cut-off timings by the indicator existing on said plane, wherein said measuring means does not measure the cut-off region in the case where a counted value of said counting means is not less than two.

44. An optical scanning-type touch panel in which a region of a plane specified as an object to be touched is touched by an indicator so that information is inputted, said touch panel comprising:

light recurrence reflection means provided at the outside of said plane;

at least two sets of light send/receive means having optical scanning means for periodically scanning a light angularly in a plane which is substantially parallel with said plane and light receiving means for receiving a reflected light of the light scanned by said optical scanning means from said light recurrence reflection means; and measuring means for measuring a cut-off region of a scanning light in said plane which is formed by said indicator based on a scanning angle of said optical scanning means and the result of receiving light by said light receiving means, wherein said optical scanning means is composed of a polygon mirror having three through six reflecting surfaces.

* * * * *